United States Patent [19]
Fukushima

[11] Patent Number: 5,384,647
[45] Date of Patent: Jan. 24, 1995

[54] IMAGE PROCESSING APPARATUS COMPRISING MEANS FOR JUDGING IMAGE AREA OF PSEUDO HALF-TONE IMAGE

[75] Inventor: Shigenobu Fukushima, Yokohama, Japan

[73] Assignee: Minolta Camera Kabushiki Kaisha, Osaka, Japan

[21] Appl. No.: 894,743

[22] Filed: Jun. 5, 1992

[30] Foreign Application Priority Data

| Jun. 10, 1991 | [JP] | Japan | 3-137616 |
| Jun. 10, 1991 | [JP] | Japan | 3-137617 |
| Jun. 10, 1991 | [JP] | Japan | 3-137618 |
| Jun. 10, 1991 | [JP] | Japan | 3-137619 |
| Jun. 10, 1991 | [JP] | Japan | 3-137620 |

[51] Int. Cl.$^6$ ............................ H04N 1/00; H04N 1/40
[52] U.S. Cl. ................................. 358/456; 358/457; 358/458
[58] Field of Search ............... 358/456, 37, 426, 283, 358/261.1–261.4, 298, 427, 457, 458, 261, 162; 382/56, 41

[56] References Cited

U.S. PATENT DOCUMENTS

| 4,032,978 | 6/1977 | Wong | 358/283 |
| 5,204,760 | 4/1993 | Murayama et al. | 358/456 |
| 5,282,059 | 1/1994 | Fukushima et al. | 358/456 |

Primary Examiner—Paul Ip
Attorney, Agent, or Firm—Burns, Doane, Swecker & Mathis

[57] ABSTRACT

In an image processing apparatus for processing inputted binary image data including a pseudo half-tone area in which data are binarized by a pseudo half-tone binarizing method and a non-half-tone area in which data are binarized using a predetermined threshold value, an image area judgment section performs an image area judgment process for judging whether each pixel of the inputted binary image data is included in the pseudo half-tone area or the non-half-tone area, based on the binary image data located in a predetermined first area including a plurality of pixels which includes a specified pixel and a plurality of pixels located in the periphery of the specified pixel and which are selected among the inputted binary image data. A first judgment section judges what is the kind of minor pixels in the first area based on the binary image data located in the first area, and a second judgment section judges whether or not at least one of the minor pixels as judged is included in a predetermined second area which is located within the first area and which is smaller than said first area. The area judgment section invalidates result data of the image area judgment process with respect to the specified pixel when the second judgment section judges that none of the minor pixels is included in the second area.

11 Claims, 58 Drawing Sheets

Fig. 15 Second calculation section 105b of Adjacent state judgment section 105

Fig. 18 Judgment data counting section 108
X = A, B, C, D, E

Second calculation section 113b of Black pixel within window counting section 113

Third calculation section 113c of Black pixel within window counting section 113

First calculation section 111a of Edge emphasis amount calculation section 111

Edge area judgment section 109

Edge area judgment amount

Fig. 30

| j\i | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| 0 | D000 | D001 | D002 | D003 | D004 | D005 | D006 | D007 | D008 | D009 | D010 | D011 | D012 | D013 | D014 | D015 | D016 | D017 | D018 | D019 | D020 |
| 1 | D100 | D101 | D102 | D103 | D104 | D105 | D106 | D107 | D108 | D109 | D110 | D111 | D112 | D113 | D114 | D115 | D116 | D117 | D118 | D119 | D120 |
| 2 | D200 | D201 | D202 | D203 | D204 | D205 | D206 | D207 | D208 | D209 | D210 | D211 | D212 | D213 | D214 | D215 | D216 | D217 | D218 | D219 | D220 |
| 3 | D300 | D301 | D302 | D303 | D304 | D305 | D306 | D307 | D308 | D309 | D310 | D311 | D312 | D313 | D314 | D315 | D316 | D317 | D318 | D319 | D320 |
| 4 | D400 | D401 | D402 | D403 | D404 | D405 | D406 | D407 | D408 | D409 | D410 | D411 | D412 | D413 | D414 | D415 | D416 | D417 | D418 | D419 | D420 |
| 5 | D500 | D501 | D502 | D503 | D504 | D505 | D506 | D507 | D508 | D509 | D510 | D511 | D512 | D513 | D514 | D515 | D516 | D517 | D518 | D519 | D520 |
| 6 | D600 | D601 | D602 | D603 | D604 | D605 | D606 | D607 | D608 | D609 | D610 | D611 | D612 | D613 | D614 | D615 | D616 | D617 | D618 | D619 | D620 |
| 7 | D700 | D701 | D702 | D703 | D704 | D705 | D706 | D707 | D708 | D709 | D701 | D711 | D712 | D713 | D714 | D715 | D716 | D717 | D718 | D719 | D720 |
| 8 | D800 | D801 | D802 | D803 | D804 | D805 | D806 | D807 | D808 | D809 | D810 | D811 | D812 | D813 | D814 | D815 | D816 | D817 | D818 | D819 | D820 |
| 9 | D900 | D901 | D902 | D903 | D904 | D905 | D906 | D907 | D908 | D909 | D910 | D911 | D912 | D913 | D914 | D915 | D916 | D917 | D918 | D919 | D920 |

W1021

Fattening type ordered dither image
(Screen angle = 0°)

Fattening type ordered dither image
(Screen angle = 0°)

Fig. 37

| i\j | 6 | 7 | 8 | 9 | 10 | 11 | 12 | 13 | 14 |
|---|---|---|---|---|---|---|---|---|---|
| 0 |   | S10 | S11 | S12 | S13 | S14 | S15 | S16 | S17 |
| 1 |   |   |   |   |   |   |   |   |   |
| 2 |   |   |   |   |   |   |   |   |   |
| 3 |   |   |   |   | * |   |   |   |   |
| 4 |   |   |   |   |   |   |   |   |   |
| 5 |   |   |   |   |   |   |   |   |   |
| 6 |   |   |   |   |   |   |   |   |   |

Fig. 38

| i\j | 6 | 7 | 8 | 9 | 10 | 11 | 12 | 13 | 14 |
|---|---|---|---|---|---|---|---|---|---|
| 0 |   | \multicolumn{8}{S20} |
| 1 |   | S21 |
| 2 |   | S22 |
| 3 |   |   |   |   | * | S23 |
| 4 |   | S24 |
| 5 |   | S25 |
| 6 |   | S26 |
| 7 |   | S27 |

Fig. 47

| j=0 | 1 | 2 | 3 | 4 | 5 | 6 | 7 | 8 | 9 | 10 |
|---|---|---|---|---|---|---|---|---|---|---|
| i=3 J300 | J301 | J302 | J303 | J304 | J305 | J306 | J307 | J308 | J309 | J310 |
| 4 J400 | J401 | J402 | J403 | J404 | J405 | J406 | J407 | J408 | J409 | J410 |
| 5 J500 | J501 | J502 | J503 | J504 | J505 | J506 | J507 | J508 | J509 | J510 |
| 6 J600 | J601 | J602 | J603 | J604 | J605 | J606 | J607 | J608 | J609 | J610 |
| 7 J700 | J701 | J702 | J703 | J704 | J705 | J706 | J707 | J708 | J709 | J710 |

Fig. 50

|  j  i | 0 | 1 | 2 | 3 | 4 | 5 | 6 | 7 | 8 | 9 | 10 |
|---|---|---|---|---|---|---|---|---|---|---|---|
| 0 | | | | | | | | | | | |
| 1 | | | | | | | | | | | |
| 2 | | | 1 | 1 | 1 | 1 | 1 | 1 | 1 | | |
| 3 | | | 1 | 1 | 1 | 1 | 1 | 1 | 1 | | |
| 4 | | | 1 | 1 | 1 | 1 | 1 | 1 | 1 | | |
| 5 | | | 1 | 1 | 1 | 1 | 1 | 1 | 1 | | |
| 6 | | | 1 | 1 | 1 | 1 | 1 | 1 | 1 | | |
| 7 | | | 1 | 1 | 1 | 1 | 1 | 1 | 1 | | |
| 8 | | | 1 | 1 | 1 | 1 | 1 | 1 | 1 | | |
| 9 | | | | | | | | | | | |
| 10 | | | | | | | | | | | |

F11 labels the top. W7 labels the inner region.

Fig. 51

|  j  i | 0 | 1 | 2 | 3 | 4 | 5 | 6 | 7 | 8 | 9 | 10 |
|---|---|---|---|---|---|---|---|---|---|---|---|
| 0 | | | | | | | | | | | |
| 1 | | 1 | 1 | 1 | 1 | 1 | 1 | 1 | 1 | 1 | |
| 2 | | 1 | 1 | 1 | 1 | 1 | 1 | 1 | 1 | 1 | |
| 3 | | 1 | 1 | 1 | 1 | 1 | 1 | 1 | 1 | 1 | |
| 4 | | 1 | 1 | 1 | 1 | 1 | 1 | 1 | 1 | 1 | |
| 5 | | 1 | 1 | 1 | 1 | 1 | 1 | 1 | 1 | 1 | |
| 6 | | 1 | 1 | 1 | 1 | 1 | 1 | 1 | 1 | 1 | |
| 7 | | 1 | 1 | 1 | 1 | 1 | 1 | 1 | 1 | 1 | |
| 8 | | 1 | 1 | 1 | 1 | 1 | 1 | 1 | 1 | 1 | |
| 9 | | 1 | 1 | 1 | 1 | 1 | 1 | 1 | 1 | 1 | |
| 10 | | | | | | | | | | | |

F12 labels the top. W9 labels the inner region.

| i\j | 0 | 1 | 2 | 3 | 4 | 5 | 6 | 7 | 8 | 9 | 10 |
|---|---|---|---|---|---|---|---|---|---|---|---|
| 0 | | | | | | | | | | | |
| 1 | | | -1 | -1 | -1 | -1 | -1 | -1 | -1 | | |
| 2 | | | -1 | -1 | -1 | -1 | -1 | -1 | -1 | | |
| 3 | | | -1 | -1 | -1 | -1 | -1 | -1 | -1 | | |
| 4 | | | 1 | 1 | 1 | 1 | 1 | 1 | 1 | | |
| 5 | | | 1 | 1 | 1 | 1 | 1 | 1 | 1 | | |
| 6 | | | 1 | 1 | 1 | 1 | 1 | 1 | 1 | | |
| 7 | | | | | | | | | | | |
| 8 | | | | | | | | | | | |
| 9 | | | | | | | | | | | |

Rows 1–3: W37b
Rows 4–6: W37a

| i\j | 0 | 1 | 2 | 3 | 4 | 5 | 6 | 7 | 8 | 9 | 10 |
|---|---|---|---|---|---|---|---|---|---|---|---|
| 0 | | | | | | | | | | | |
| 1 | | | | | | | | | | | |
| 2 | | | | | | | | | | | |
| 3 | | | | | | | | | | | |
| 4 | | | 1 | 1 | 1 | 1 | 1 | 1 | 1 | | |
| 5 | | | 1 | 1 | 1 | 1 | 1 | 1 | 1 | | |
| 6 | | | 1 | 1 | 1 | 1 | 1 | 1 | 1 | | |
| 7 | | | -1 | -1 | -1 | -1 | -1 | -1 | -1 | | |
| 8 | | | -1 | -1 | -1 | -1 | -1 | -1 | -1 | | |
| 9 | | | -1 | -1 | -1 | -1 | -1 | -1 | -1 | | |

Rows 4–6: F37a
Rows 7–9: F37c

Fig. 58

|i\j|0|1|2|3|4|5|6|7|8|9|10|
|---|---|---|---|---|---|---|---|---|---|---|---|
|0||||||||||||
|1||||||||||||
|2|||-1|-1|-1|1|1|1||||
|3|||-1|-1|-1|1|1|1||||
|4|||-1|-1|-1|1|1|1||||
|5|||-1|-1|-1|1|1|1||||
|6|||-1|-1|-1|1|1|1||||
|7|||-1|-1|-1|1|1|1||||
|8|||-1|-1|-1|1|1|1||||
|9||||||||||||

|i\j|0|1|2|3|4|5|6|7|8|9|10|
|---|---|---|---|---|---|---|---|---|---|---|---|
|0||||||||||||
|1||||||||||||
|2|||||1|1|1|-1|-1|-1||
|3|||||1|1|1|-1|-1|-1||
|4|||||1|1|1|-1|-1|-1||
|5|||||1|1|1|-1|-1|-1||
|6|||||1|1|1|-1|-1|-1||
|7|||||1|1|1|-1|-1|-1||
|8|||||1|1|1|-1|-1|-1||
|9||||||||||||

|i\j|0|1|2|3|4|5|6|7|8|9|10|
|---|---|---|---|---|---|---|---|---|---|---|---|
|0| | | | | | |-1|-1| | | |
|1| | | | | |-1|-1|-1|1| | |
|2| | | | |-1|-1|-1|1|1|1| |
|3| | | |-1|-1|-1|1|1|1| | |
|4| | |-1|-1|-1|1|1|1| | | |
|5| |-1|-1|-1|1|1|1| | | | |
|6|-1|-1|-1|1|1|1| | | | | |
|7| |-1|1|1|1| | | | | | |
|8| | |1|1| | | | | | | |
|9| | | | | | | | | | | |

|i\j|0|1|2|3|4|5|6|7|8|9|10|11|
|---|---|---|---|---|---|---|---|---|---|---|---|---|
|0| | | | | | | | | | | | |
|1| | | | | | | | |1| | | |
|2| | | | | | | |1|1|1| | |
|3| | | | | | |1|1|1|-1|-1|-1|
|4| | | | | |1|1|1|-1|-1|-1| |
|5| | | | |1|1|1|-1|-1|-1| | |
|6| | | |1|1|1|-1|-1|-1| | | |
|7| |1|1|1|-1|-1|-1| | | | | |
|8| |1|1|-1|-1|-1| | | | | | |
|9| | |-1|-1|-1| | | | | | | |

|   | j | 0 | 1 | 2 | 3 | 4 | 5 | 6 | 7 | 8 | 9 | 10 |
|---|---|---|---|---|---|---|---|---|---|---|---|----|
| i |   |   |   |   |   |   |   |   |   |   |   |    |
| 0 |   |   |   |   |   |   |   |   |   |   |   |    |
| 1 |   |   |   |   |   |   |   |   |   |   |   |    |
| 2 |   |   |   |   |   |   |   |   |   |   |   |    |
| 3 |   |   |   |   |   |   |   |   |   |   |   |    |
| 4 |   |   |   | -1 | -1 | -1 | -1 | -1 | -1 | -1 |   |    |
| 5 |   |   |   | 1 | 1 | 1 | 1 | 1 | 1 | 1 |   |    |
| 6 |   |   |   |   |   |   |   |   |   |   |   |    |
| 7 |   |   |   |   |   |   |   |   |   |   |   |    |
| 8 |   |   |   |   |   |   |   |   |   |   |   |    |
| 9 |   |   |   |   |   |   |   |   |   |   |   |    |

F31; W17b (row 4); W17a (row 5)

Fig. 65

|   | j | 0 | 1 | 2 | 3 | 4 | 5 | 6 | 7 | 8 | 9 | 10 |
|---|---|---|---|---|---|---|---|---|---|---|---|----|
| i |   |   |   |   |   |   |   |   |   |   |   |    |
| 0 |   |   |   |   |   |   |   |   |   |   |   |    |
| 1 |   |   |   |   |   |   |   |   |   |   |   |    |
| 2 |   |   |   |   |   |   |   |   |   |   |   |    |
| 3 |   |   |   |   |   |   |   |   |   |   |   |    |
| 4 |   |   |   |   |   |   |   |   |   |   |   |    |
| 5 |   |   |   | 1 | 1 | 1 | 1 | 1 | 1 | 1 |   |    |
| 6 |   |   |   | -1 | -1 | -1 | -1 | -1 | -1 | -1 |   |    |
| 7 |   |   |   |   |   |   |   |   |   |   |   |    |
| 8 |   |   |   |   |   |   |   |   |   |   |   |    |
| 9 |   |   |   |   |   |   |   |   |   |   |   |    |

F32; W17a (row 5); W17c (row 6)

Figures 70, 71:
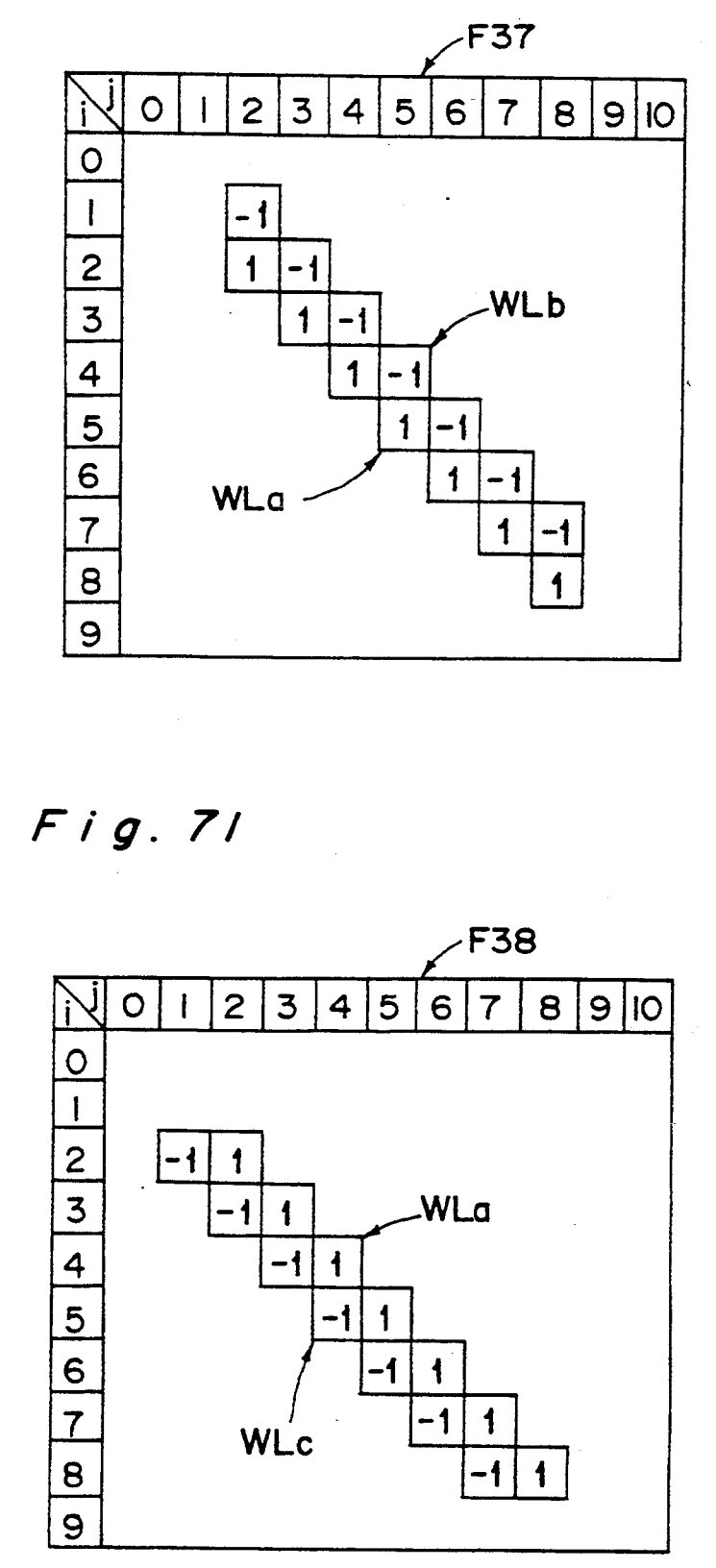

| i\j | 0 | 1 | 2 | 3 | 4 | 5 | 6 | 7 | 8 | 9 | 10 |
|---|---|---|---|---|---|---|---|---|---|---|---|
| 0 | | | | | | | | | | | |
| 1 | | | -1 | | | | | | | | |
| 2 | | | 1 | -1 | | | | | | | |
| 3 | | | | 1 | -1 | | | | | | |
| 4 | | | | | 1 | -1 | | | | | |
| 5 | | | | | | 1 | -1 | | | | |
| 6 | | | | | | | 1 | -1 | | | |
| 7 | | | | | | | | 1 | -1 | | |
| 8 | | | | | | | | | 1 | | |
| 9 | | | | | | | | | | | |

WLb (at row 3–4), WLa (at row 5–6)

| i\j | 0 | 1 | 2 | 3 | 4 | 5 | 6 | 7 | 8 | 9 | 10 |
|---|---|---|---|---|---|---|---|---|---|---|---|
| 0 | | | | | | | | | | | |
| 1 | | | | | | | | | | | |
| 2 | | -1 | 1 | | | | | | | | |
| 3 | | | -1 | 1 | | | | | | | |
| 4 | | | | -1 | 1 | | | | | | |
| 5 | | | | | -1 | 1 | | | | | |
| 6 | | | | | | -1 | 1 | | | | |
| 7 | | | | | | | -1 | 1 | | | |
| 8 | | | | | | | | -1 | 1 | | |
| 9 | | | | | | | | | | | |

WLa (at row 3–4), WLc (at row 5–6)

Fig. 72

| i\j | 0 | 1 | 2 | 3 | 4 | 5 | 6 | 7 | 8 | 9 | 10 |
|---|---|---|---|---|---|---|---|---|---|---|---|
| 0 | | | | | | | | | | | |
| 1 | | | -1 | -1 | -1 | -1 | -1 | -1 | -1 | | |
| 2 | | | -1 | -1 | -1 | -1 | -1 | -1 | -1 | | |
| 3 | | | -1 | -1 | -1 | -1 | -1 | -1 | -1 | | |
| 4 | | | -1 | -1 | -1 | -1 | -1 | -1 | -1 | | |
| 5 | | | 1 | 1 | 1 | 1 | 1 | 1 | 1 | | |
| 6 | | | 1 | 1 | 1 | 1 | 1 | 1 | 1 | | |
| 7 | | | 1 | 1 | 1 | 1 | 1 | 1 | 1 | | |
| 8 | | | 1 | 1 | 1 | 1 | 1 | 1 | 1 | | |
| 9 | | | | | | | | | | | |

| i\j | 0 | 1 | 2 | 3 | 4 | 5 | 6 | 7 | 8 | 9 | 10 |
|---|---|---|---|---|---|---|---|---|---|---|---|
| 0 | | | | | | | | | | | |
| 1 | | | | | | | | | | | |
| 2 | | | 1 | 1 | 1 | 1 | -1 | -1 | -1 | -1 | |
| 3 | | | 1 | 1 | 1 | 1 | -1 | -1 | -1 | -1 | |
| 4 | | | 1 | 1 | 1 | 1 | -1 | -1 | -1 | -1 | |
| 5 | | | 1 | 1 | 1 | 1 | -1 | -1 | -1 | -1 | |
| 6 | | | 1 | 1 | 1 | 1 | -1 | -1 | -1 | -1 | |
| 7 | | | 1 | 1 | 1 | 1 | -1 | -1 | -1 | -1 | |
| 8 | | | 1 | 1 | 1 | 1 | -1 | -1 | -1 | -1 | |
| 9 | | | | | | | | | | | |

| i\j | 0 | 1 | 2 | 3 | 4 | 5 | 6 | 7 | 8 | 9 | 10 | 11 |
|---|---|---|---|---|---|---|---|---|---|---|---|---|
| 0 |   |   |   |   |   |   |   | 1 |   |   |   |   |
| 1 |   |   |   |   |   |   | 1 | 1 | 1 |   |   |   |
| 2 |   |   |   |   |   | 1 | 1 | 1 | -1 |   |   |   |
| 3 |   |   |   |   | 1 | 1 | 1 | 1 | -1 | -1 | -1 | -1 |
| 4 |   |   |   | 1 | 1 | 1 | -1 | -1 | -1 | -1 |   |   |
| 5 |   |   | 1 | 1 | 1 | -1 | -1 | -1 | -1 |   |   |   |
| 6 |   | 1 | 1 | 1 | 1 | -1 | -1 | -1 |   |   |   |   |
| 7 |   | 1 | 1 | 1 | -1 | -1 | -1 | -1 |   |   |   |   |
| 8 |   |   | 1 | -1 | -1 | -1 | -1 |   |   |   |   |   |
| 9 |   |   |   | -1 | -1 | -1 |   |   |   |   |   |   |

WMa (upper right region of shape), WMb (right edge near row 4–5)

| i\j | 0 | 1 | 2 | 3 | 4 | 5 | 6 | 7 | 8 | 9 | 10 |
|---|---|---|---|---|---|---|---|---|---|---|---|
| 0 |   |   |   | -1 | -1 |   |   |   |   |   |   |
| 1 |   |   | -1 | -1 | -1 | -1 |   |   |   |   |   |
| 2 |   | 1 | 1 | -1 | -1 | -1 | -1 |   |   |   |   |
| 3 | 1 | 1 | 1 | 1 | -1 | -1 | -1 | -1 |   |   |   |
| 4 |   | 1 | 1 | 1 | -1 | -1 | -1 | -1 |   |   |   |
| 5 |   | 1 | 1 | 1 | 1 | -1 | -1 | -1 | -1 |   |   |
| 6 |   |   | 1 | 1 | 1 | 1 | -1 | -1 | -1 | -1 |   |
| 7 |   |   |   |   | 1 | 1 | 1 | 1 | -1 |   |   |
| 8 |   |   |   |   |   | 1 | 1 | 1 | 1 |   |   |
| 9 |   |   |   |   |   | 1 | 1 |   |   |   |   |

WMd (right side near row 4), WMc (lower right near row 8)

IMAGE PROCESSING APPARATUS COMPRISING MEANS FOR JUDGING IMAGE AREA OF PSEUDO HALF-TONE IMAGE

BACKGROUND OF THE INVENTION

1. Field of the Invention

The present invention relates to an image processing apparatus, and more particularly, to an image processing apparatus comprising means for judging whether each pixel of image data is included in a first area of pseudo half-tone image or a second area of non-half-tone image.

2. Description of the Prior Art

In a conventional facsimile apparatus, in order to transmit an image signal through a public telephone line, a transmitter converts image data of non-half-tone image such as characters into binary image data of non-half-tone image by binarizing them using a predetermined threshold value and then transmits the converted binary image data to a receiver of the other party, and also the transmitter converts multi-value image data of half-tone-image into binary image data of pseudo half-tone image by binarizing them using a dither method and then transmits the converted binary image data to the receiver of the other party. It is to be noted that the multi-value image data means image data of multi-gradation stages in the specification. On the other hand, the receiver of the other party performs different processes depending on the kind of the image of the received image data such as non-half-tone image, pseudo half-tone image or the like. Namely, it is necessary for the receiver to perform the following processes:

(a) a process for extracting each kind of binary image data;

(b) a process for switching over the method for converting the pixel density thereof; and (c) a process for switching over the decoding method such as the method for compressing image data or the like.

Therefore, it is necessary to automatically judge whether or not the received image data are binary image data of non-half-tone image or binary image data of pseudo half-tone image, and there is disclosed in the Japanese Patent examined publication No. 63-11832, a method for judging the kind of the received image data and generating an image area signal having the judgment result (referred to as a first conventional method hereinafter). The first conventional method is provided for judging whether or not respective pixels of an image signal having both of a dot photograph area and a document area of characters are included in the dot photograph area or the document area, and for generating an image area signal for representing the judged image area. Namely, the first conventional method includes the following steps:

(a) setting a mask for surrounding a plurality of pixels including a specified pixel;

(b) taking out a pixel pattern formed based on values of a plurality of pixels within the mask;

(c) generating an image area signal corresponding to the above-mentioned pixel pattern according to a table of image area signals on the pixel patterns previously stored in a storage unit dividing all the pixel patterns which may be caused into the dot photograph area and the document area; and (d) outputting the generated image area signal as the image area signal corresponding to the specified pixel. Concretely, the respective pixel patterns are previously stored in a table ROM by dividing the pixel pattern into the dot photograph area and the document area, and when an image signal to be processed is inputted to an address terminal of the table ROM, resulting in the image area signal in the data terminal of the table ROM.

Further, there is suggested in Yoshinobu MITA et al, "Higher fine multi-value recovery of binary image by Neural Network", Japan Hard copy, '90, NIP-24, pp 233-236, 1990, an apparatus for automatically judging whether or not inputted binary image data are binary image data of non-half-tone image or binary image data of pseudo half-tone image (referred to as a second conventional apparatus hereinafter). In the second conventional apparatus, by using a back propagation method for Neural Network, there is performed not only a process for converting inputted binary image data into multi-value image data using a Neural Network but also a process for dividing inputted binary image data into predetermined kinds of image area and for converting them into multi-value image data depending on the divided image area using the Neural Network. The Neural Network of the second conventional apparatus has a three-layer structure comprising an input layer, an intermediate layer and an output layer. In the input layer, there are provided a number of units corresponding to a number of pixels included in a window provided close to a specified pixel, and there is provided in the output layer one unit for outputting multi-value image data.

However, in the first conventional method, since there is provided the pixel pattern table ROM for judging image areas, as the area to be judged for area judgment increases, the manufacturing cost thereof increases. Further, in the second conventional apparatus, the composition of the apparatus is complicated, and the processing speed is extremely low.

Further, when there is within a window for the area judgment, for example, an end of a line-shaped image including the same kind of pixels which are smaller pixels within an area for the area judgment, there is a possibility of erroneously judging the image areas in the conventional method and apparatus.

Furthermore, in the case of judging whether binary image data of a specified pixel are binary image data of a half-tone image or binary image data of a non-half-tone image based on an adjacent state between respective pixels located within an area for the area judgment, there is a possibility of erroneously judging that binary pseudo half-tone image data binarized by a Fattening type dither binarizing method are binary image data of a non-half-tone image.

Furthermore, in a conventional facsimile apparatus, in order to transmit an image signal through a public telephone line, a transmitter converts a half-tone image such as a photograph image or the like into binary image data of pseudo half-tone image by binarizing them using a dither method or the like, and then, transmits the converted image data to a receiver of the other party. On the other hand, the receiver recovers multi-value image data from the received binary image data of pseudo half-tone.

Further, recently, there has been put into practice a color laser printer for recording an image of multi-value image data at a high speed and with a high resolution, however, there have been widely used binary printers for recording binary image data, generally. In order to store multi-value image data in a storage unit, it is necessary to provide the storage unit having a relatively large capacity.

In order to solve the above problems, the following method is suggested. Namely, the multi-value image data are converted into binary image data, and then, the converted binary image data are stored in the storage unit. Furthermore, upon processing the binary image data or recording the binary image data, after reading out the above binary image data from the storage unit, multi-value image data are recovered from the read binary image data.

Furthermore, there is disclosed in the Japanese Patent laid-open publication No. 62-114377, an image processing method for converting binary image data of pseudo half-tone image into multi-value image data (referred to as a third conventional method hereinafter). In this publication, the following three methods are suggested.

(1) After dividing binary image data into respective blocks, a number of black pixels within each block is counted, a density level of each block is presumed based on the number of black pixels, and then, multi-value image data are recovered based on the presumed density level thereof.

(2) After dividing binary image data into respective unit areas, a number of black pixels within each unit area is counted, and there is obtained the dispersion of the number of black pixels within a predetermined block area composed of not only a specified unit area but also a predetermined number of unit areas adjacent to the specified unit area. Then, when the dispersion thereof is relatively small, an arrangement of black pixels is obtained using a density matrix pattern having a relatively larger size, and then, multi-value image data are recovered based on the arrangement of black pixels. On the other hand, when the dispersion thereof is relatively large, an arrangement of black pixels is obtained using a density matrix pattern having a relatively small size, and then, multi-value image data are recovered based on the arrangement of black pixels.

(3) There is prepared a scanning opening having a size of $N \times N$ pixels for binary image data, a number of black pixels within each scanning opening is counted shifting the scanning opening by one pixel. Thereafter, the counted number of black pixels is set as a density level, sequentially, and then, multi-value image data are recovered based on the set density level. This method corresponds to a convolution process for binary image data using a spatial filter comprising all the pixels of one or black within a $4 \times 4$ window.

Further, the above-mentioned publication of the third conventional method discloses as follows: simultaneously when performing (3) the convolution process, an image emphasis process is performed using a Laplacian filter for performing a filtering process by multiplying binary image data of a specified pixel by four so as to obtain a first product, multiplying four binary image data of the peripheral pixels in the main scan and sub-scan directions by ($-1$) so as to obtain a second product and adding the first product to the second product.

Furthermore, there has been known to those skilled in the art, a conventional method for multi-value image data corresponding to the original image data based on a smoothed value and an edge emphasis value (referred to as a fourth conventional method hereinafter). Namely, a smoothing process is performed for binary image data within the window as described in the above-mentioned process (1) so as to calculate a smoothed value therefor. On the other hand, after calculating the edge emphasis amount within the window, multi-value image data corresponding to the original image data are recovered based on the calculated smoothed value and the edge emphasis value.

However, in the third conventional method, upon recovering multi-value image data having, for example, a natural number N or more of gradation stages, it is necessary to recover multi-value image data based on a natural number N or more of pixels. Further, when a recovery process is performed using a window having one side of length larger than an interval of the period of the original binary image data of pseudo half-tone image, a texture of the pseudo half-tone image may influence the recovered image. In order to solve the above-mentioned problems, it is necessary to use a relatively large window, and then, a circuit for counting the number of black pixels within the window becomes large-sized. Further, when there is an edge portion within the above-mentioned window, the edge portion is smoothed by the smoothing process of the third conventional method, so that the original image data may not be often recovered.

As described above, the edge emphasis amount used in the edge emphasis process and the edge judgment amount used upon judging whether or not there is an edge portion can be calculated based on an edge component amount or a relative amount of the edge component which is detected using the above-mentioned Laplacian filter. However, when using the above-mentioned Laplacian filter, a high frequency component amount can not be accurately detected based on an image having a period of ($7 \times 2$) dots, namely, the high frequency components of the edge portion are lowered. Further, since the direction of the edge component can not be detected, the edge component amount having taken the direction thereof into consideration can not be detected. In this case, an image which is not the edge portion may be erroneously detected as an edge portion, or any edge portion may not be detected within an image including an edge portion. Therefore, when recovering multi-value image data based on the edge component amount calculated by the above-mentioned Laplacian filter using the fourth conventional method, multi-value image data corresponding to the original image data can not be recovered.

Further, an edge emphasis circuit for performing an edge emphasis process for relatively high spatial frequency components which are detected by a window having a width of about one pixel used for calculating an edge emphasis amount is essentially provided for performing an edge emphasis process for an image of a fine line. However, when a number of white pixels within a predetermined area including a specified pixel is nearly equal to a number of black pixels within the predetermined area, a particular image pattern of a pseudo half-tone image tends to become a line-shaped image in a manner similar to that of a fine line image. In this case, there is a possibility of erroneously performing an edge emphasis process for the pseudo half-tone image. Then, binary image data can not be accurately recovered into multi-value image data.

Furthermore, when, for example, a conventional area judgment circuit for judging whether or not inputted binary image data are binary image data binarized by a pseudo-half-tone binarizing method or binary image data binarized by a non-half-tone binarizing method using a predetermined threshold value is applied to an image recovery apparatus, there is a possibility of erroneously judging that binary image data of pseudo half-tone image having relatively low spatial frequency components which are binarized by a Fattening type dither method since the area judgment is performed by detecting the particular image pattern for binary image data of a pseudo half-tone image binarized by an error diffusion method or a Bayer type dither method. In this case, the edge emphasis process may be performed for binary image data of a pseudo half-tone image binarized by the Fattening type dither method, and then, the processed image becomes a lattice-shaped image which is completely different from the original image. In other words, the multi-value image data corresponding to the original image can not be accurately recovered.

Further, there is disclosed in the Japanese patent laid-open publication No. 2-165775, an image processing apparatus (referred to as a fifth conventional apparatus hereinafter) for converting binary image data of a pseudo image data into multi-value image data.

The fifth conventional apparatus is characterized in comprising:

(a) image identifying means for detecting presence or non-presence of a periodicity of pixel information and the period thereof based on a distribution of pixel information composed of an inputted pseudo half-tone image;

(b) change in density detecting means for detecting a change in the density of the pixel information; and (c) smoothing processing means for performing a smoothing process using a window having an opening size corresponding to the detected period for a portion where the density gradually changes which is detected by the change in density detecting means, for performing a smoothing process using a window having an opening size smaller than the detected period for a portion where the density often changes many times, and for performing a smoothing process using a window having a predetermined minimum opening size for a portion where there is detected no periodicity, thereby recovering and outputting multi-value image corresponding to the inputted pseudo half-tone image.

Namely, in the fifth conventional apparatus, the pseudo half-tone image are more faithfully recovered by altering the opening size of the window used for the smoothing process according to the detected change in the density of the pixel information and the detected presence or non-presence of the periodicity of the pixel information.

In practice, various kinds of image readers and various kinds of pseudo half-tone binarizing circuits are provided for various kinds of image processes. However, since the fifth conventional apparatus performs the recovery process for multi-value image data by selectively altering the opening size of the window used for the smoothing process according to the detected change in the density of the pixel information and the detected presence or non-presence of the periodicity of the pixel information, the fifth conventional apparatus can not be applied to a recovery process for image data read by various kinds of image reader or for image data of pseudo-half-tone images binarized by various kinds of pseudo half-tone binarizing circuits. Then, there is often caused errors in the above-mentioned detected results and in the results of the area judgments. Therefore, binary image data binarized by a non-half-tone binarizing method using a predetermined threshold value and binary image data binarized by a pseudo half-tone binarizing method can not be faithfully recovered into multi-value image data corresponding to the original image.

SUMMARY OF THE INVENTION

An object of the present invention is therefore to provide an image processing apparatus having a structure simpler than that of the conventional apparatus, capable of more accurately judging in a higher speed whether inputted image data are included an area of binary image data binarized by a pseudo half-tone binarizing method or an area of binary image data binarized by a non-half-tone binarizing method.

Another object of the present invention is to provide an image processing apparatus capable of more accurately judging whether inputted image data are included an area of binary image data binarized by a pseudo half-tone binarizing method or an area of binary image data binarized by a non-half-tone binarizing method, even though there is within a window for the area judgment, an end of an line-shaped image including the same kind of pixels which are smaller pixels within an area for the area judgment.

A further object of the present invention is to provide an image processing apparatus capable of more accurately judging whether inputted image data are included an area of binary image data binarized by a pseudo half-tone binarizing method or an area of binary image data binarized by a non-half-tone binarizing method, based on the adjacent state between respective pixels within an area for the area judgment.

A still further object of the present invention is to provide an image processing apparatus capable of prohibiting an edge emphasis process from being performed for a specified pixel of binary image data of a pseudo half-tone image among inputted binary image data, thereby more accurately recovering image data of an original image into multi-value image data.

A still more further object of the present invention is to provide an image processing apparatus capable of prohibiting an edge emphasis process from being performed for a specified pixel of binary image data of a pseudo half-tone image binarized by a Fattening type dither method among inputted binary image data, thereby more accurately recovering image data of an original image into multi-value image data A more still further object of the present invention is to provide an image processing apparatus capable of recovering various kinds of inputted binary image data into multi-value image data corresponding to an original image, more faithfully, as compared with the conventional apparatuses.

In order to achieve the aforementioned objective, according to one aspect of the present invention, there is provided an image processing apparatus for processing inputted binary image data including a pseudo half-tone area in which data are binarized by a pseudo half-tone binarizing method and a non-half-tone area in which data are binarized using a predetermined threshold value, comprising:

image area judgment means for performing an image area judgment process for judging whether each pixel of said inputted binary image data is included in said pseudo half-tone area or said non-half-tone area, based on said binary image data located in a predetermined first area including a plurality of pixels which includes a specified pixel and a plurality of pixels located in the periphery of said specified pixel and which are selected among said inputted binary image data;

first judgment means for judging what is the kind of minor pixels in said first area based on said binary image data located in said first area;

second judgment means for judging whether or not at least one of the minor pixels judged by said first judgment means is included in a predetermined second area which is located within said first area and which is smaller than said first area; and control means for invalidating result data of said image area judgment process with respect to said specified pixel when said second judgment means judges that none of the minor pixels is included in said second area.

According to another aspect of the present invention, there is provided an image processing apparatus for recovering inputted binary image data, pixels of which are composed of white pixels and black pixels, into multi-value image data, comprising:

edge emphasis means for performing an edge emphasis process for emphasizing a density difference between a specified pixel and each of a plurality of pixels located in the periphery of said specified pixel; and prohibition means for prohibiting said edge emphasis process from being performed by said edge emphasis means, when a ratio of a number of white pixels to a number of black pixels which are located in a predetermined area including said specified pixel is larger than a first threshold value smaller than one and is smaller than a second threshold value larger than one.

According to a further aspect of the present invention, there is provided an image processing apparatus for processing inputted binary image data including a pseudo half-tone area in which data are binarized by a pseudo half-tone binarizing method and a non-half-tone area in which data are binarized using a predetermined threshold value, comprising:

judgment means for calculating a judgment value representing at least one of a degree of a predetermined pseudo half-tone image and a degree of a predetermined non-half-tone image of each specified pixel of said inputted binary image data based on said binary image data;

first recovery means for recovering binary image data of said specified pixel into multi-value image data using a first recovery process for said predetermined pseudo half-tone image;

second recovery means for recovering binary image data of said specified pixel into multi-value image data using a second recovery process for said predetermined non-half-tone image based on said inputted binary image data; and mixing means for mixing said multi-value image data recovered by said first recovery means with said multi-value image data recovered by said second recovery means with a mixing ratio corresponding to said judgment value calculated by said judgment means and outputting said mixed multi-value image data.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 30 is a front view showing respective pixel data located within a 10×21 window used in the present preferred embodiment;

FIG. 37 is a front view showing pixel number data S10 to S17 of respective windows used in the dither judgment section shown in FIG. 3;

FIG. 38 is a front view showing pixel number data S20 to S27 of respective windows used in the dither judgment section shown in FIG. 3;

FIG. 47 is a front view showing detection signals of respective pixels used in the 5×11 matrix memory shown in FIG. 3;

FIG. 50 is a front view showing a spatial filter for counting a number of black pixels within a 7×7 window W7 which is used in the smoothed value calculation section shown in FIG. 3;

FIG. 51 is a front view showing a spatial filter for counting a number of black pixels within a 9×9 window W9 which is used in the smoothed value calculation section shown in FIG. 3;

FIG. 52 is a front view showing a modification of a spatial filter for calculating a smoothed value;

FIG. 53 is a front view showing one example of a spatial filter for a smoothing process which is provided for explaining a necessity for calculating an edge emphasis amount;

FIG. 54 is a front view showing another example of a spatial filter for a smoothing process which is provided for explaining a necessity for calculating an edge emphasis amount;

FIG. 56 is a front view showing a spatial filter F21 for calculating an edge emphasis amount which is used in the edge emphasis amount calculation section shown in FIG. 3;

FIG. 57 is a front view showing a spatial filter F22 for calculating an edge emphasis amount which is used in the edge emphasis amount calculation section shown in FIG. 3;

FIG. 58 is a front view showing a spatial filter F23 for calculating an edge emphasis amount which is used in the edge emphasis amount calculation section shown in FIG. 3;

FIG. 59 is a front view showing a spatial filter F24 for calculating an edge emphasis amount which is used in the edge emphasis amount calculation section shown in FIG. 3;

FIG. 60 is a front view showing a spatial filter F25 for calculating an edge emphasis amount which is used in the edge emphasis amount calculation section shown in FIG. 3;

FIG. 61 is a front view showing a spatial filter F26 for calculating an edge emphasis amount which is used in the edge emphasis amount calculation section shown in FIG. 3;

FIG. 64 is a front view showing a spatial filter F31 for calculating an edge emphasis amount which is used in the edge emphasis amount calculation section shown in FIG. 3;

FIG. 65 is a front view showing a spatial filter F32 for calculating an edge emphasis amount which is used in the edge emphasis amount calculation section shown in FIG. 3;

FIG. 66 is a front view showing a spatial filter F33 for calculating an edge emphasis amount which is used in the edge emphasis amount calculation section shown in FIG. 3;

FIG. 67 is a front view showing a spatial filter F34 for calculating an edge emphasis amount which is used in the edge emphasis amount calculation section shown in FIG. 3;

FIG. 68 is a front view showing a spatial filter F35 for calculating an edge emphasis amount which is used in the edge emphasis amount calculation section shown in FIG. 3;

FIG. 69 is a front view showing a spatial filter F36 for calculating an edge emphasis amount which is used in the edge emphasis amount calculation section shown in FIG. 3;

FIG. 70 is a front view showing a spatial filter F37 for calculating an edge emphasis amount which is used in the edge emphasis amount calculation section shown in FIG. 3;

FIG. 71 is a front view showing a spatial filter F38 for calculating an edge emphasis amount which is used in the edge emphasis amount calculation section shown in FIG. 3;

FIG. 72 is a front view showing a spatial filter F41 for calculating an edge judgment amount which is used in the edge emphasis area judgment section shown in FIG. 3;

FIG. 73 is a front view showing a spatial filter F42 for calculating an edge judgment amount which is used in the edge emphasis area judgment section shown in FIG. 3;

FIG. 74 is a front view showing a spatial filter F43 for calculating an edge judgment amount which is used in the edge emphasis area judgment section shown in FIG. 3;

FIG. 75 is a front view showing a spatial filter F44 for calculating an edge judgment amount which is used in the edge emphasis area judgment section shown in FIG. 3;

DETAILED DESCRIPTION OF THE PREFERRED EMBODIMENT

Figure 2:
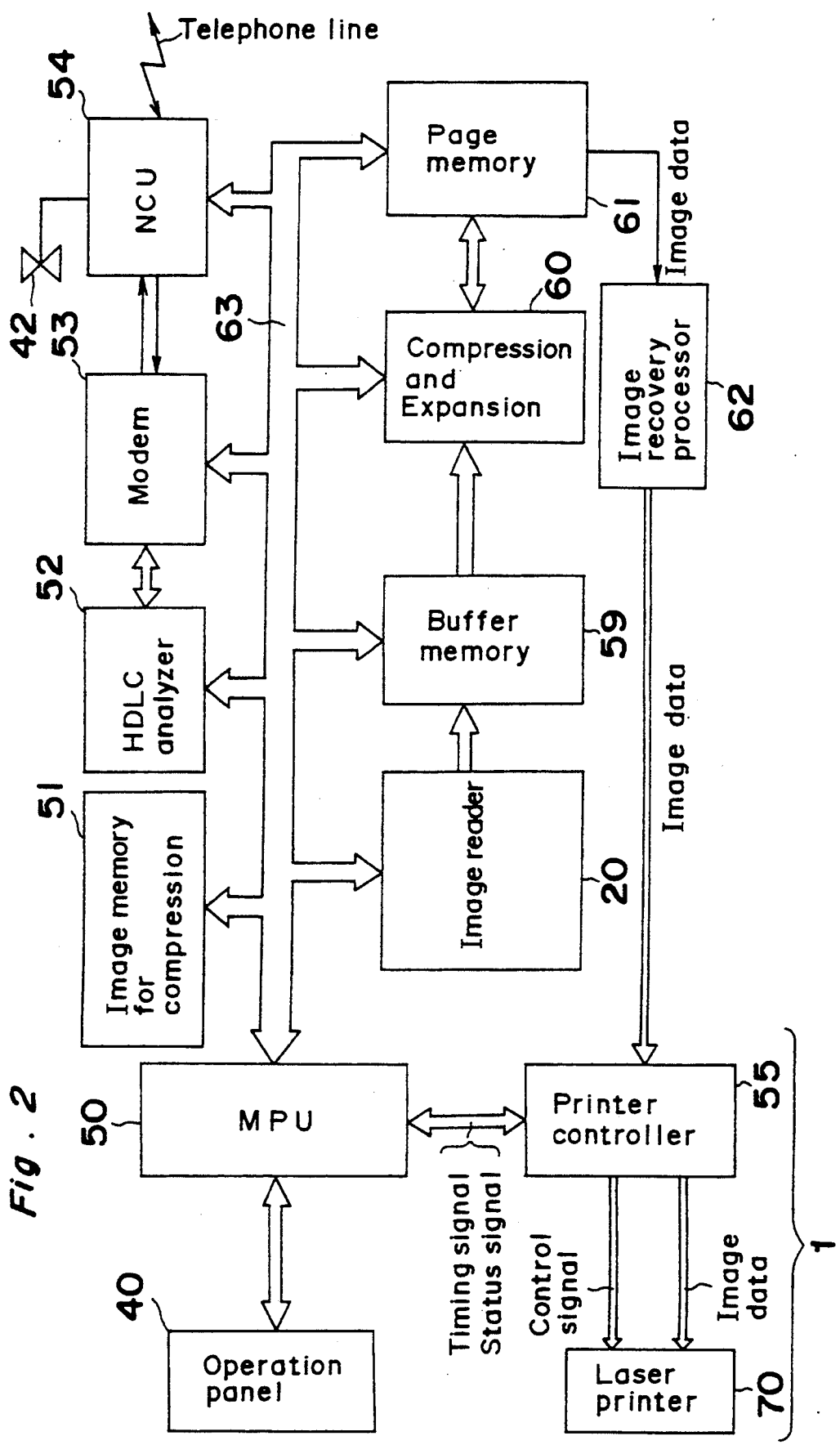
FIG. 2 is a schematic block diagram showing a signal processing section of the facsimile apparatus shown in FIG. 1.

A facsimile apparatus of a preferred embodiment according to the present invention will be described below with reference to the attached drawings. The facsimile apparatus of the preferred embodiment comprises an image recovery processor 62 for recovering multi-value image data from received binary image data, as shown in FIG. 2.

In the description of the preferred embodiments, "a half-tone image" and "a half-tone area" means a pseudo half-tone image obtained by binarizing multi-value image data of half-tone image such as photograph image or the like using a pseudo half-tone binarizing method such as a dither method or the like, and an area of the image thereof, respectively. On the other hand, "a non-half-tone image" and "a non-half-tone area" means a non-half-tone image such as character image or the like, and an area of the image thereof, respectively.

It is to be noted that a number of adjacencies is referred to as an adjacency number hereinafter in the specification and Figures.

The facsimile apparatus of the first preferred embodiment according to the present invention will be described in an order of the following items.

Figure 3:
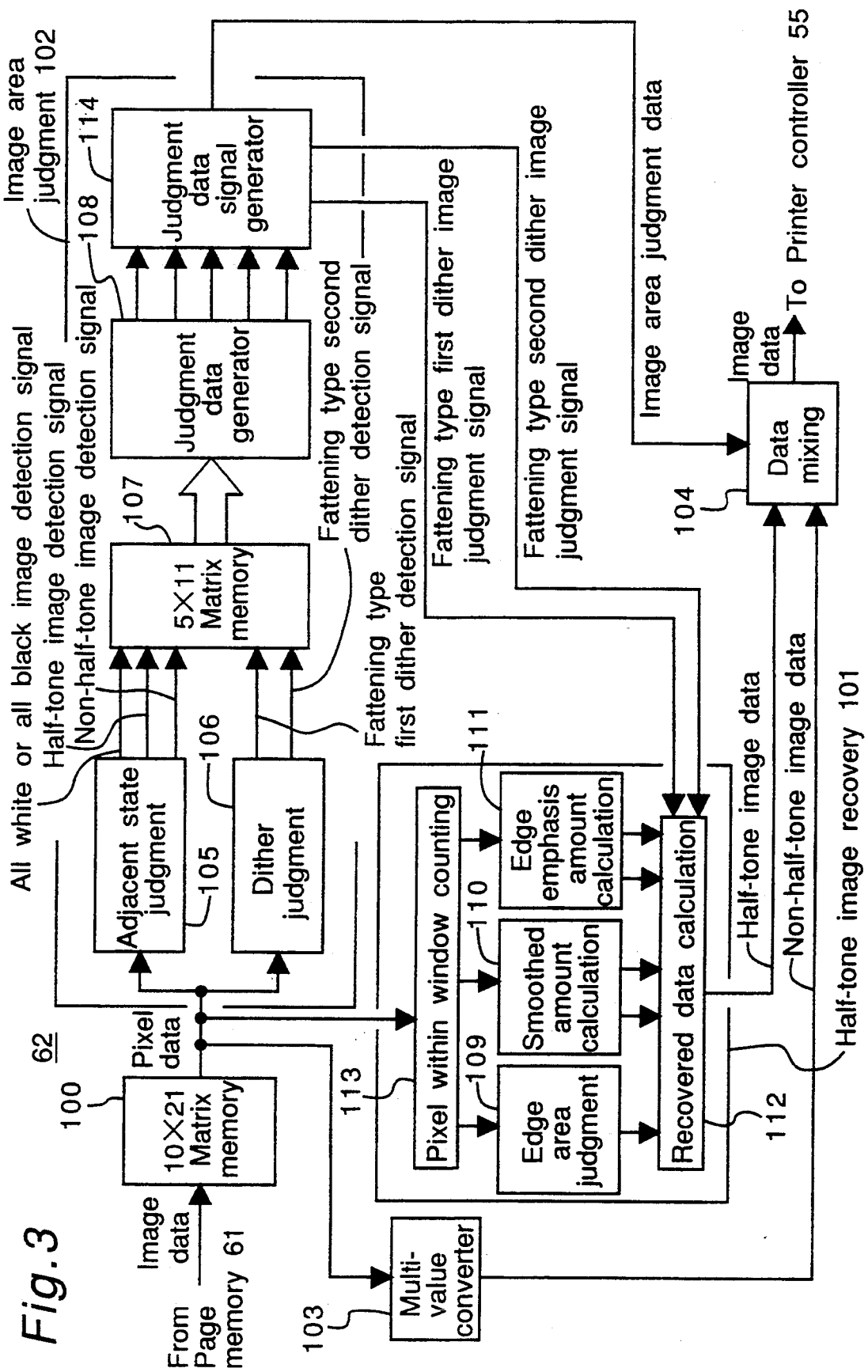
FIG. 3 is a schematic block diagram showing an image recovery processor shown in FIG. 2.

(1) Features of Present preferred embodiment
(2) Composition and Action of Facsimile apparatus
(3) Image recovery processor
(4) 10×21 Matrix memory
(5) Image area judgment section
   (5-1) Composition and Action of Respective sections
   (5-2) Dither judgment section
   (5-3) Adjacent state judgment section
   (5-4) 5×11 Matrix memory
   (5-5) Judgment data generator
   (5-6) judgment data signal generator
(6) Half-tone data recovery section
   (6-1) Composition and Action of Respective sections
   (6-2) Black pixel within window counting section
   (6-3) Smoothed amount calculation section
   (6-4) Edge emphasis amount calculation section
   (6-5) Edge area judgment section
   (6-6) Recovered data calculation section
(7) Other modifications (1) Features of Present Preferred Embodiment The facsimile apparatus of the preferred embodiment is characterized in, as shown in FIG. 3, comprising:

(a) a half-tone data recovery section 101 for calculating a predetermined edge emphasis amount, a predetermined smoothed value and a predetermined edge judgment amount based on received binary image data including binary image data binarized by the pseudo half-tone binarizing method and binary image data binarized by the non-half-tone binarizing method using a predetermined threshold value, and recovering the inputted binary image data into multi-value half-tone data based on not only the above-calculated amounts but also a Fattening type first dither image judgment signal and a Fattening type second dither image judgment signal respectively indicating such judgment results that the inputted binary image data are predetermined Fattening type dither images, the Fattening type first and second dither image judgment signals being inputted from a judgment data signal generator 114 of an image area judgment processor 102 described in detail later;

(b) the image area judgment processor 102 for generating the Fattening type first and second dither image judgment signals by respective pixel for a predetermined area having a specified pixel in the center thereof based on the received binary image data, and for outputting area judgment data obtained by judging whether each specified pixel within each predetermined area is included in the half-tone image area or the non-half-tone image area based on the received binary image data;

(c) a multi-value converter 103 for simply converting binary image data binarized by a non-half-tone binarizing method using a predetermined threshold value into multi-value non-half-tone image data indicating white image or black image; and (d) a data mixing section 104 for generating multi-value image data by mixing the multi-value half-tone image data outputted from the half-tone image recovery section 101 and the multi-value non-half-tone image data outputted from the multi-value converter 103 with a mixing ratio indicated by the area judgment data, and outputting the generated multi-value image data to a printer controller 55.

In particular, the facsimile apparatus of the preferred embodiment is characterized by the half-tone data recovery section 101 and the image area judgment section 102, as follows. The half-tone data recovery section 101 comprises:

(a) a black pixel within window calculating section 113 for counting numbers of black pixels within a plurality of predetermined windows based on inputted pixel data and respectively outputting black pixel number data thereof (referred to as data hereinafter);

(b) an edge area judgment section 109 for calculating an edge area judgment amount used for judging an edge area based on the data outputted from the black pixel within the window calculating section 113 and outputting them;

(c) a smoothed amount calculation section 110 for calculating smoothed amounts of second data of 7×7 black pixel number and 9×9 black pixel number data to recover half-tone image data based on the data outputted from the black pixel within the window calculating section 113 and outputting them;

(d) an edge emphasis amount calculation section 111 for calculating first and second data of the edge emphasis amounts to perform an edge emphasis process based on the data outputted from the black pixel within the window calculating section 113 and outputting them; and (e) a recovered data calculation section 112 for recovering multi-value half-tone image data based on the data outputted from the respective sections 109 to 111 and the Fattening type first and second dither image judgment signals outputted from the judgment data signal generator 114 and outputting them.

Further, the image area judgment section 102 comprises:

(a) an adjacent state detection section 105 for, based on inputted pixel data, calculating an adjacent number in the main scan and subscan directions representing adjacent states of the same kind of smaller pixels positioned within a predetermined area in four directions of the main scan and subscan directions, calculating black pixel number data within a predetermined 3×3 window, and generating and outputting an all white or all black image detection signal representing there are all the white pixels or all the black pixels within the above-mentioned 7×7 window, a half-tone image detection signal representing that an image within a predetermined area having a specified pixel in the center thereof is a half-tone image, and a non-half-tone image detection signal representing that the image within the above-mentioned predetermined area is a non-half-tone image, based on the above-calculated data and the black pixel number data within a predetermined 7×7 window outputted from a dither judgment section 106;

(b) the dither judgment section 106 for, based on the inputted pixel data, detecting whether or not each pixel image is a Fattening type ordered dither image of a screen angle of zero degree, outputting the Fattening type first dither detection signal representing the detection result thereof, detecting whether or not each pixel image is a Fattening type ordered dither image of a screen angle of 45 degrees, and outputting the Fattening type second dither detection signal representing the detection result thereof;

(c) a 5×11 matrix memory 107 for simultaneously outputting respective five detection signals of five bits outputted in serial by each pixel data from the adjacent state judgment section 105 and the dither judgment section 106, which are within a predetermined 5×11 window having a specified pixel in the center thereof;

(d) a judgment data generator 108 for, based on the respective detection signal outputted from the matrix memory 107, generating respective judgment data obtained by adding the respective detection signals within the above-mentioned 5×11 window and outputting them; and (e) the judgment data signal generator 114 for, based on the respective judgment data outputted from the judgment data generator 108, judging whether or not the image within the area of the above-mentioned 5×11 window is the Fattening type ordered dither image of a screen angle of zero degree, generating and outputting the Fattening type first dither image judgment signal representing the judgment result thereof, judging whether or not the image within the area of the above-mentioned 5×11 window is the Fattening type ordered dither image of a screen angle of 45 degrees, generating and outputting the Fattening type second dither image judgment signal representing the judgment result thereof, and generating and outputting an area judgment data representing a result of judging whether or not each specified pixel within each predetermined area is included in the half-tone area or the non-half-tone area based on the received binary image data.

(2) Composition and Action of Facsimile Apparatus

Figure 1:
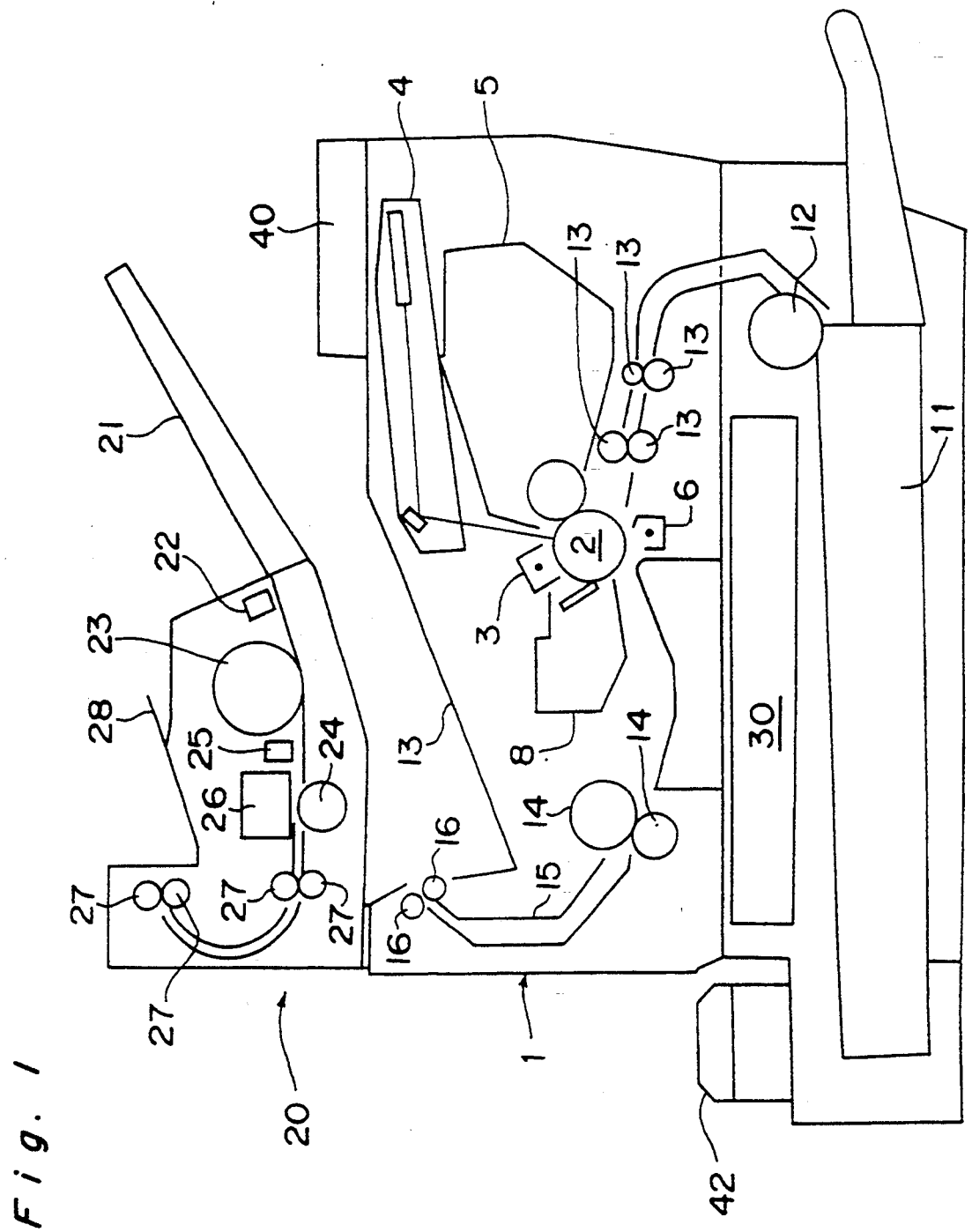
FIG. 1 is a longitudinal cross sectional view showing a mechanical section of a facsimile apparatus of a preferred embodiment according to the present invention.

FIG. 1 shows a mechanical section of the facsimile apparatus of the preferred embodiment according to the present invention, and FIG. 2 shows a signal processing section of the facsimile apparatus shown in FIG. 1. As shown in FIG. 1, the facsimile apparatus is mainly divided into a printer section 1 and an image reader 20 provided on the printer section 1. An operation panel 40 is provided on the printer section 1, and a telephone 42 is provided on the side surface of the printer section 1.

Referring to FIG. 1, the printer section 1 is an electrophotographic laser printer having a structure similar to that of the conventional laser printer. The composition and action thereof will be briefly described below.

First of all, a photoconductive layer formed on a photoconductive drum 2 rotated is uniformly electrified by a corona charger 3. Thereafter, a beam of laser light is projected onto the photoconductive drum 2 by an optical system 4 according to image data, so as to form an electrostatic latent image on the photoconductive drum 2, and then, the electrostatic latent image is developed with toner by a developing unit 5 so as to form a toner image thereon. On the other hand, there are set a number of cut papers on a paper feeding cassette 11, and after the cut papers are picked up one by one by a pick-up roller 13, the picked cut paper is sent to a transfer portion of the photoconductive drum 2 by the paper feeding roller 13. The toner image formed on the photoconductive drum 2 is transferred onto a piece of cut paper by a transfer charger 6, and the transferred toner image is fixed thereon by a fixing unit 12. The cut paper for which the fixing process has been completed is discharged through a paper discharging path 15 onto a paper discharging tray 13 by paper discharging rollers 14 and 16. The toner remaining on the photoconductive drum 2 is collected by a toner cleaner 8, and then, one printing process is completed.

Hereinbelow, the composition and action of the image reader 20 will be described.

A document set on the document tray 21 is detected by a document sensor 22, and the document is sent to a position of a paper sensor 25 one by one by a roller 23. Then, an image of the document (referred to as a document image hereinafter) is read by a contact type CCD linear image sensor 26 in synchronous with rotation of the roller 24 by a motor (not shown) and a reading operation of the image sensor 26, and the document image is converted into digital image data. Thereafter, the converted digital image data are outputted to a buffer memory 59 shown in FIG. 2, and are converted into compressed image data by a compression and expansion section 60. Then, the compressed image data are stored in a compressed image memory 51. After reading the document image, the document is discharged onto a document discharging tray 28 by a paper discharging roller 27.

As shown in FIG. 2, the facsimile apparatus further comprises:

(a) a micro processing unit (referred to as an MPU hereinafter) 50 for controlling the whole operation of the facsimile apparatus;

(b) an HDLC analyzer 52, a modulator and demodulator (referred to as a MODEM hereinafter) 53 and a network control unit (referred to as an NCU hereinafter) 54, each performing a signal processing of the facsimile and a communication process;

(c) the compressed image memory 51, the buffer memory 59 and a page memory 61, each temporarily storing image data of the facsimile or the like; and (d) the compression and expansion section 60 and the image recovery processor 62, each performing a predetermined process for processing an image signal. Respective sections 20, 51, 52, 53, 54, 59, 60 and 61 are connected through a bus 63 to the MPU 50. The operation panel 40 is directly connected to the MPU 50, and a printer controller 55 for controlling the laser printer 70 provided in the printer section 1 is connected to the MPU 50.

First of all, a receiving operation of the facsimile apparatus will be described below.

When there is caused an incoming call from the facsimile apparatus of the other party through the telephone line, an incoming call signal is inputted through the NCU 54 and the MODEM 53 to the MPU 50 and is detected, and then, a line connection process with the facsimile apparatus of the other party is performed according to a predetermined facsimile line connection procedure. After the line connection process, a compressed image signal transmitted from the facsimile apparatus of the other party is inputted through the NCU 54 to the MODEM 53, and is demodulated by the MODEM 53. Then, there is performed a predetermined HDLC inverse processing process for taking out only the compressed image data from HDLC frames of the demodulated image data by the HDLC analyzer 52, and then, the compressed image data are stored in the compressed image memory 51. After the compressed image signals of all the pages have been received, a line disconnection process with the facsimile apparatus of the other party is performed according to a predetermined facsimile line disconnection procedure. The image data stored in the compressed image memory 51 are expanded by one page so as to be developed into practical image data on the page memory 61 by the compression and expansion section 60. The image data developed on the page memory 61 are inputted to the image recovery processor 62, are converted into binary image data of high density by a process as described in detail later, and then the converted binary image data are outputted to the printer controller 55. A recording start signal is outputted from the MPU 50 to the printer controller 55 in synchronous with transfer operation of the image data to the printer controller 55, and then, the printer controller 55 transmits control signals and image data to the laser printer 70 so as to make the laser printer 70 print out the image data.

Next, the transmitting operation of the facsimile apparatus will be described below.

After all the above-mentioned image reading operations by the image reader 20 have been completed, a line connection process with the facsimile apparatus of the other party is performed. After the line connection process is completed, the compressed image data stored in the compressed image memory 51 are expanded so as to be developed on the page memory 61 by the compression and expansion section 60. Then, a compression process is performed again for the developed image data according to a performance of the facsimile apparatus of the other party, and then, the recompressed image data are stored in the compressed image memory 51. After a predetermined HDLC processing process is performed for the stored image data by the HDLC analyzer 52, a predetermined carrier signal is modulated by the MODEM 53 according to the image data after the HDLC processing process so as to generate a predetermined facsimile signal. Then, the facsimile signal modulated according to the image data is transmitted through the NCU 54 and the telephone line to the facsimile apparatus of the other party. After the transmission of the facsimile signal is completed, a line disconnection process with the facsimile apparatus of the other party is performed according to a predetermined line disconnection process, and then, the transmitting operation is completed.

The MPU 50 performs predetermined processes based on instructions inputted using the operation panel 40 by the operator, and outputs indication information to the operator and status information of the facsimile apparatus to the operation panel 40 and then displays them on the operation panel 40.

(3) Image recovery processor

The image recovery processor 62 comprises the half-tone data recovery section 101 for recovering multi-value half-tone data from the received binary image data, and the recovery process of the half-tone image has the following effects. Namely, half-tone image data of a photograph image are composed of multi-value image data of a plurality of bits per one pixel, generally. However, when communicating with the other party using a facsimile apparatus or when storing image data using an image data filing apparatus, the multi-value image data are binarized by a pseudo half-tone binarizing method, resulting in remarkable reduction of data amount thereof to be communicated or to be stored therein.

The recovery process of the half-tone image is effective in the case of, for example, storing or displaying a half-tone image data binarized by a pseudo half-tone binarizing method with different pixel densities. Namely, only a magnification or reduction process is not performed, or the magnification or reduction process is performed after recovering the multi-value image data once, and then, a Moire caused due to a periodicity of binary image data of an original half-tone image can be prevented from being generated. The recovered multi-value image data are binarized by a pseudo half-tone binarizing method, and then, they are outputted to an output unit such as a display unit, a printer or the like. In this case, when the output unit can process inputted data with a high pixel density, the performance of the output unit can be enough utilized. Further, for example, the recovery process of the half-tone image is effective in the case of recovering binary image data binarized by a pseudo half-tone binarizing method into the multi-value image data and outputting them to a multi-value display unit for displaying an image having multi-value gradations or a multi-value printer for printing out an image having multi-value gradations on a sheet of paper.

FIG. 3 shows the image recovery section 62 shown in FIG. 2.

Referring to FIG. 3, binary image data read out in serial from the page memory 61 are inputted to the 10×21 matrix memory 100. As shown in FIG. 30, the 10×21 matrix memory 100 generates respective pixel data D000 to D920 located at respective positions of a matrix of a 10×21 window W1021, and then, outputs them to the black pixel within the window counting section 113 of the half-tone image recovery section 101, the adjacent state detection section 105 and the dither judgment section 106 of the image area judgment section 102, and the multi-value converter 103.

In FIG. 30, an arrow MS denotes the main scan direction, and an arrow SS denotes the subscan direction. Further, i denotes a parameter for representing a position of the main scanning line within the window W1021, and j denotes a parameter for representing a position of the sub scanning line thereof.

The half-tone data recovery section 101 comprises the black pixel within the window counting section 113, the edge area judgment section 109, the smoothed amount calculation section 110, the edge emphasis amount calculation section 111, and the recovered data calculation section 112.

The black pixel within window calculating section 113 counts numbers of black pixels within a plurality of predetermined windows based on inputted pixel data thereof and respectively outputs black pixel number data to the edge area judgment section 109, the smoothed amount calculation section 110, and the edge emphasis amount calculation section 111. Further, the edge area judgment section 109 calculates an edge area judgment amount used for judging an edge area based on the data outputted from the black pixel within the window calculating section 113 and outputs them to the recovered data calculation section 112. Furthermore, the smoothed amount calculation section 110 calculates smoothed amounts of second data of 7×7 black pixel number and 9×9 black pixel number data to recover half-tone image data based on the data outputted from the black pixel within the window calculating section 113 and outputs them to the recovered data calculation section 112. The edge emphasis amount calculation section 111 calculates first and second data of the edge emphasis amounts to perform an edge emphasis process for emphasizing a density difference between a specified pixel and each of a plurality of pixels located in the periphery of the specified pixel, based on the data outputted from the black pixel within the window calculating section 113 and outputs them to the recovered data calculation section 112. Further, the recovered data calculation section 112 recovers multi-value half-tone image data based on the data outputted from the respective sections 109 to 111 and the Fattening type first and second dither image judgment signals outputted from the judgment data signal generator 114 and outputs them to the data mixing section 104.

The image area judgment section 102 comprises the adjacent state detection section 105, the dither judgment section 106, the 5×11 matrix memory 107, the judgment data generator 108, and the judgment data signal generator 114.

Based on the inputted pixel data, the adjacent state detection section 105 calculates an adjacent number in the main scan and subscan directions representing adjacent states of the same kind of smaller pixels positioned within a predetermined area in four directions of the main scan and subscan directions, calculates black pixel number data within the predetermined 3×3 window, and generates and outputs the all white or all black image detection signal representing there are all the white pixels or all the black pixels within the above-mentioned 7×window, the half-tone image detection signal representing that an image within a predetermined area having a specified pixel in the center thereof is a half-tone image, and the non-half-tone image detection signal representing that the image within the above-mentioned predetermined area is a non-half-tone image, based on the above-calculated data and the black pixel number data within a predetermined 7×7 window outputted from a dither judgment section 106. On the other hand, based on the inputted pixel data, the dither judgment section 106 detects whether or not each pixel image is a Fattening type ordered dither image of a screen angle of zero degree, outputs the Fattening type first dither detection signal representing the detection result thereof, detects whether or not each pixel image is a Fattening type ordered dither image of a screen angle of 45 degrees, and outputs the Fattening type second dither detection signal representing the detection result thereof.

The 5×11 matrix memory 107 simultaneously outputs to the judgment data generator 108, the respective five detection signals of five bits outputted in serial by each pixel data from the adjacent state judgment section 105 and the dither judgment section 106, which are within a predetermined 5×11 window having a specified pixel in the center thereof. Further, based on the respective detection signal outputted from the matrix memory 107, the judgment data generator 108 generates respective judgment data obtained by adding the respective detection signals within the above-mentioned 5×11 window and outputs them to the judgment data signal generator 114. Finally, based on the respective judgment data outputted from the judgment data generator 108, the judgment data signal generator 114 judges whether or not the image within the area of the above-mentioned 5×11 window is the Fattening type ordered dither image of a screen angle of zero degree, and generates and outputs the Fattening type first dither image judgment signal representing the judgment result thereof. The judgment data signal generator 114 also judges whether or not the image within the area of the above-mentioned 5×11 window is the Fattening type ordered dither image of a screen angle of 45 degrees, and generates and outputs the Fattening type second dither image judgment signal representing the judgment result thereof. Further, the judgment data signal generator 114 generates and outputs to the data mixing section 104, an area judgment data representing a result of judging whether or not each specified pixel within each predetermined area is included in the half-tone area or the non-half-tone area based on the received binary image data. It is to be noted that the area judgement data become zero when the image within the predetermined area is completely a half-tone image; on the other hand, the area judgment data are in a range from zero to one when the image within the predetermined area is completely a non-half-tone image.

Further, based on the pixel data outputted from the matrix memory 100, the multi-value converter 103 converts binary image data binarized by a non-half-tone binarizing method using a predetermined threshold value into multi-value non-half-tone image data representing a white image or a black image, and then, outputs the converted non-half-tone image data to the data mixing section 104.

Furthermore, the data mixing section 104 is constituted by a table ROM, and calculates the right side of the following equation (1) based on the multi-value half-tone image data from the half-tone image recovery section 101, the multi-value non-half-tone image data from the multi-value converter 103 and the area judgment data:

$$\text{(Multi-value image data)} = \text{(Half-tone image data)} \times \{1 - \text{(Area judgement data)}\} + \text{(Non-half-tone image data)} \times \text{(Area judgement data)}. \quad (1)$$

Namely, the data mixing section 104 mixes these inputted data according to a mixing ratio represented by the area judgment data according to the equation (1) so as to obtain the multi-value image data of six bits of the left side of the equation (1), and outputs the obtained multi-value image data to the printer controller 55.

In the present preferred embodiment, in order to prevent an error of the area judgment in an area where it is difficult to perform the area judgment, the half-tone image data are mixed with the non-half-tone image data by the data mixing section 104 according to the mixing ratio represented by the area judgment data representing the degree of the half-tone image and the degree of the non-half-tone image, thereby recovering the multi-value image data.

(4) 10×21 Matrix Memory

Figure 4:
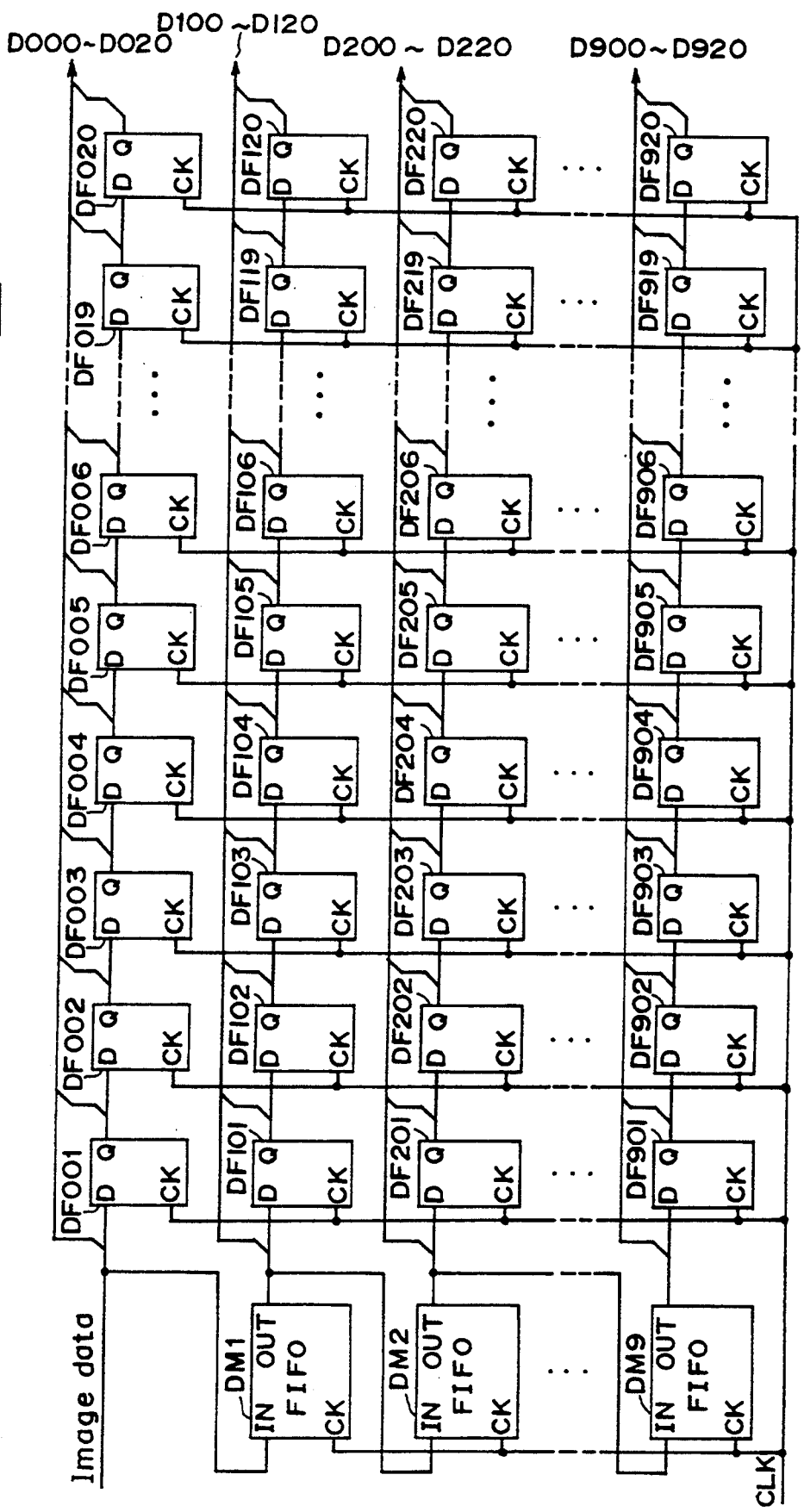
FIG. 4 is a schematic block diagram showing a 10×21 matrix memory shown in FIG. 3.

FIG. 4 shows the 10×21 matrix memory 100 shown in FIG. 3. Referring to FIG. 4, the 10×21 matrix memory 100 comprises:

(a) nine FIFO memories DM1 to DM9 each delaying the inputted image data by one horizontal scanning interval which is one scanning time in the main scan direction, based on a clock CLK having the same period as that of a transfer clock of the binary image data inputted from the page memory 61 or having a period of one dot of the inputted binary image data, and outputting them; and (b) 200 delay type flip-flops DF001 to DF020, DF101 to DF120, DF201 to DF220, . . . , and DF901 to DF920 each delaying image data inputted in synchronous with the clock CLK by one period of the clock CLK, and outputting them.

After the binary image data outputted from the page memory 61 in serial in a direction from the first pixel of the image of each page to the last pixel thereof are inputted to the flip flop DF001, the inputted binary image data are outputted through the 20 flip-flops DF001 to DF020 connected in series with each other. Also, after the binary image data outputted from the page memory 61 are inputted to the FIFO memory DM1, they are outputted through the nine FIFO memories DM1 to DM9 connected in series with each other. After the image data outputted from the FIFO memory DM1 are inputted to the flip-flop DF101, they are outputted through the flip-flops DF101 to DF120 connected in series with each other. Further, after the image data outputted from the FIFO memory DM2 are inputted to the flip-flop DF201, they are outputted through the flip-flops DF201 to DF220 connected in series with each other. In a manner similar to that of above, the image data outputted from the respective FIFO memories DM3 to DM9 are inputted to the flip-flops DF301 to DF901, respectively, they are outputted through the flip-flops DF301 to DF320, DF401 to DF420, . . . , and DF901 to DF920 respectively connected in series with each other.

In the 10×21 matrix memory 100 constituted as described above, the pixel data of one dot first inputted to the matrix memory 100 are outputted from the flip-flop DF920, and the image data then inputted are outputted as pixel data D000. Respective pixel data D001 to D020 on the main scanning line of i=0 within the 10×21 window are outputted from the respective flip-flops DF001 to DF020, respectively, respective pixel data D101 to D120 on the main scanning line of i=1 within the 10×21 window are outputted from the respective flip-flops DF101 to DF120, respectively, and respective pixel data D200 to D220 on the main scanning line of i=2 within the 10×21 window are outputted from the FIFO memory DM2 and the respective flip-flops DF201 to DF220, respectively. In a manner similar to that of above, respective pixel data D300 to D920 are outputted from the respective FIFO memories DM3 to DM9 and the respective flip-flops DF301 to DF920.

Figure 31:
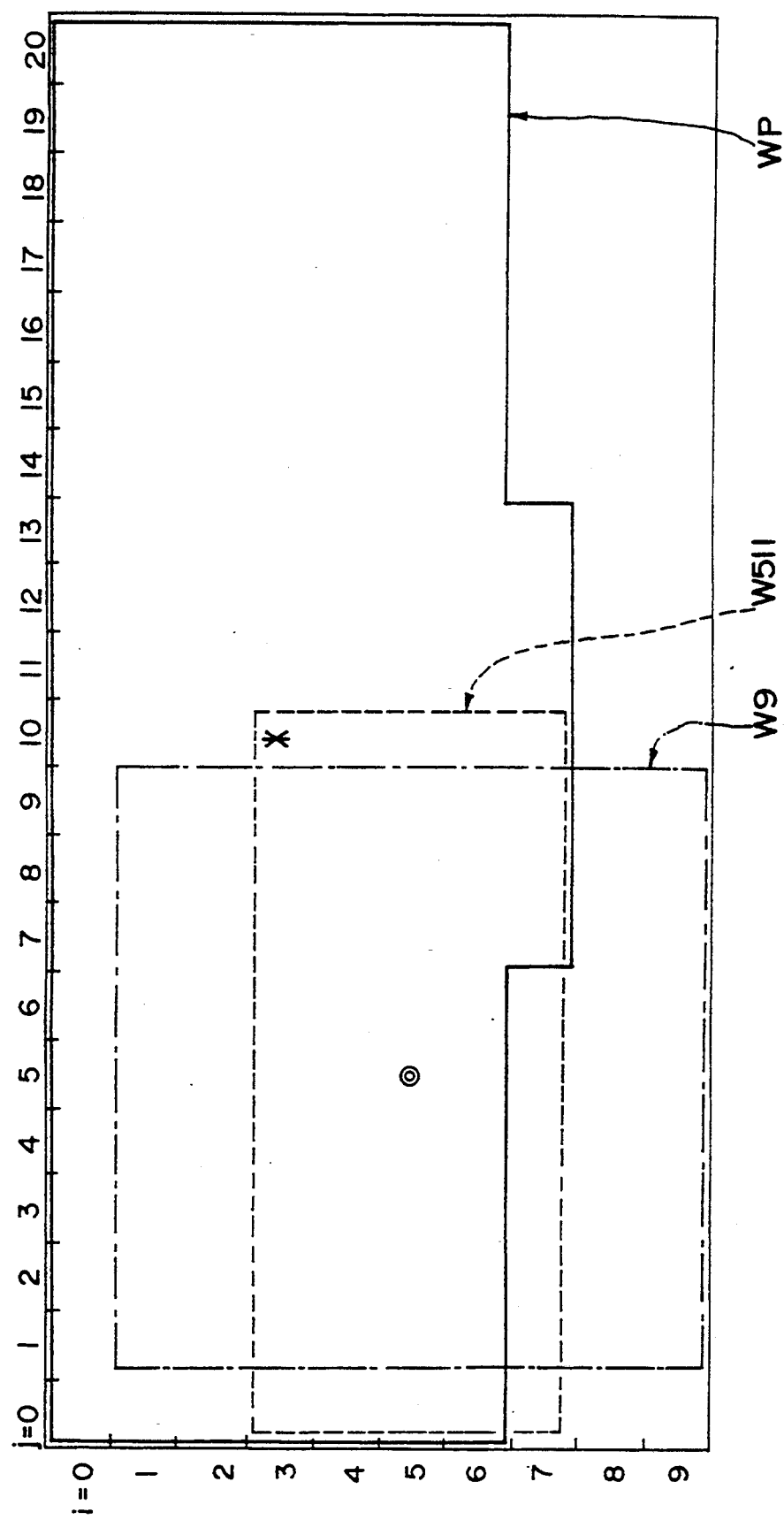
FIG. 31 is a front view showing an area of respective pixels to be referred when judging in the state judgment section and the dither judgment section shown in FIG. 3, an area of respective pixels to be referred when judging in the judgment data signal generator shown in FIG. 3, and an area of respective pixels to be referred when recovering a half-tone image in the half-tone image recovery section shown in FIG. 3

In FIG. 31, WP denotes an area of respective pixels to be referred when judging in the adjacent state judgment section 105 and the dither judgment section 106, and the specified pixel (i=3, j=10) used in the judgment is denoted by *. Further, W511 denotes an area of respective pixels to be referred when judging in the judgment data signal generator 114, and the specified pixel (i=5, j=5) used in the Judgment is denoted by ⊙. The area W511 to be referred is a 5×11 window having a specified pixel ⊙ in the center thereof. Further, W9 denotes an area of respective pixels to be referred upon the recovery process of the half-tone image recovery section 101, and the specified pixel (i=5, j=5) used in the above recovery process is denoted by ⊙. Furthermore, W9 denotes an area W9 to be referred being a 9×9 window having the specified pixel ⊙.

(5) Area Judgment Section

(5-1) Composition and Action of Respective Sections

FIGS. 5 to 19 show the area judgment section 102 shown in FIG. 3, which comprises the adjacent state judgment section 105, the dither judgment section 106, the 5×11 matrix memory 107, the judgment data generator 108, and the judgment data signal generator 114. The features of the processes of the area judgment section 102 are as follows.

Figure 32:
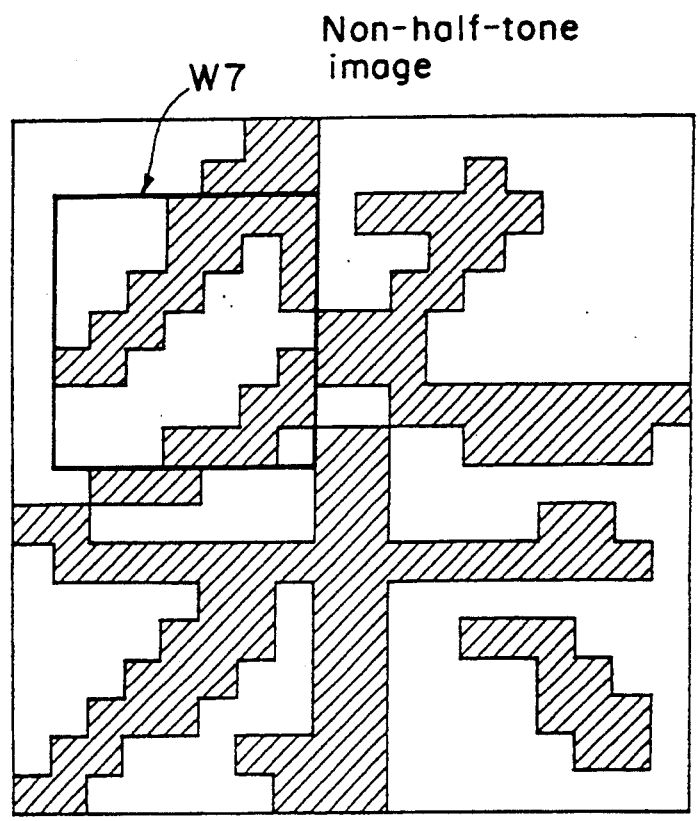
FIG. 32 is a front view showing one example of a non-half-tone image obtained when image data of character image are binarized using a predetermined threshold value.
Figure 33:
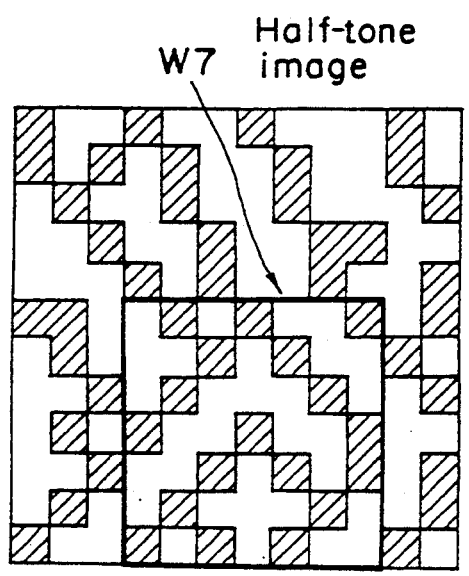
FIG. 33 is a front view showing one example of a pseudo half-tone image obtained when binarizing image data of a uniform density chart using an error diffusion method.

FIG. 32 shows one example of a non-half-tone image obtained when image data of character image are binarized using a predetermined threshold value, and FIG. 33 shows one example of a pseudo half-tone image obtained when binarizing image data of a uniform density chart using an error diffusion method. Further, FIG. 34 shows one example of a pseudo half-tone image obtained when binarizing image data of a photograph image using a Fattening type ordered dither method with a screen angle of zero degree, and FIG. 35 shows one example of a pseudo half-tone image obtained when binarizing image data of a photograph image using a Fattening type ordered dither method with a screen angle of 45 degrees.

Figure 34:
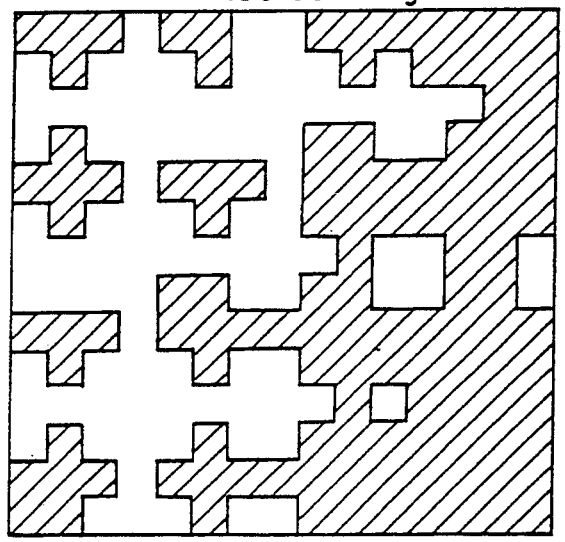
FIG. 34 is a front view showing one example of a pseudo half-tone image obtained when binarizing image data of a photograph image using a Fattening type ordered dither method with a screen angle of zero degree.
Figure 35:
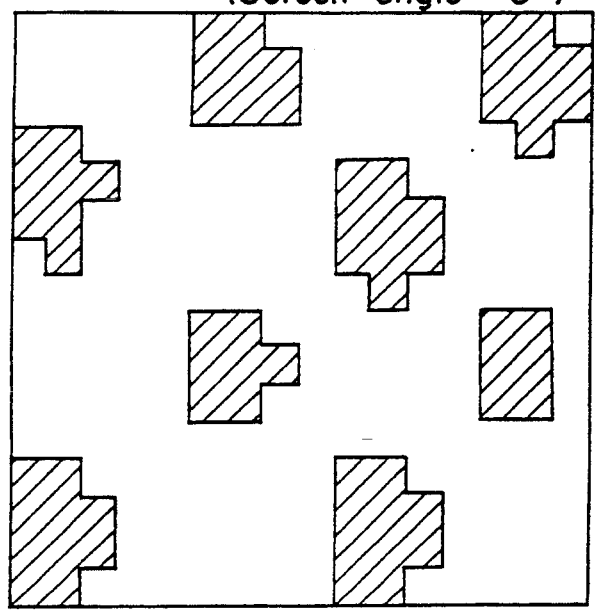
FIG. 35 is a front view showing one example of a pseudo half-tone image obtained when binarizing image data of a photograph image using a Fattening type ordered dither method with a screen angle of 45 degrees.

Hereinbelow, for a convenience of the explanation, the image shown in FIG. 33 is referred to as a Bayer type half-tone image, and each of the images shown in FIGS. 34 and 35 are referred to as a Fattening type half-tone image. Further, the image shown in FIG. 34 is referred to as a Fattening type first dither image, and the image shown in FIG. 35 is referred to as a Fattening type second dither image.

In the present preferred embodiment, a process for judging whether or not an image of inputted image data is the Bayer type half-tone image is performed by the adjacent state judgment section 105. On the other hand, a process for judging whether or not an image of inputted image data is the Fattening type half-tone image is performed by the dither judgment section 106. Further, the adjacent state judgment section 105 performs a process for distinguishing the image shown in FIG. 32 from the image shown in FIG. 33. Since there are the same numbers of black pixels as each other in respective windows W7 shown in FIGS. 32 and 33, it is considered that the image densities of the image within the windows W7 are the same as each other. Large differences between the respective images shown in the respective windows W7 is adjacent states of the smaller pixels in the main scan and subscan directions. The smaller or minor pixels mean the pixels of smaller or minor number among the black pixels and the white pixels. In the image examples shown in FIGS. 32 and 33, the smaller pixels are black pixels.

Figure 36:
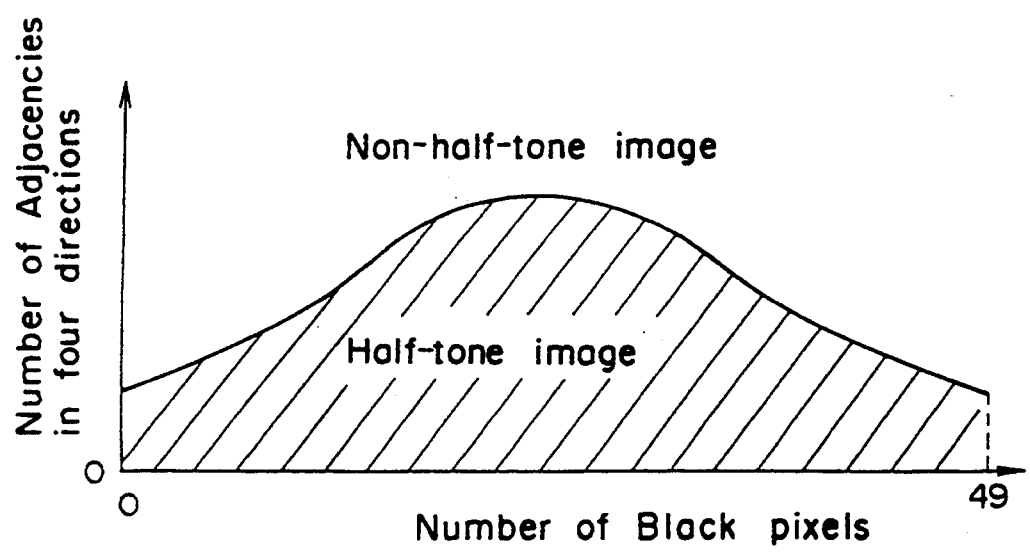
FIG. 36 is a graph showing an adjacency number in the main scan and subscan directions on a number of black pixels within a 7×7 window.

Further, a total number of smaller pixels connected to each other which are the same kinds of pixels as the smaller pixels, in either one of the four directions of the main scan and subscan directions (referred to as four directions hereinafter) from a specified pixel of a smaller pixel is referred to as an adjacent number in the four directions. As shown in FIG. 36, generally, the area of the half-tone image is distinguished from another area of the non-half-tone image in a graph representing the adjacent number in the four directions of the main scan and subscan directions on the number of black pixels within a predetermined 7×7 window.

As is apparent from FIG. 36, when the number of black pixels is equal to the number of white pixels within the predetermined 7×7 window, a threshold value of the adjacent number in the four directions on the boundary line between the respective image areas becomes the maximum. When the adjacent number in the four directions is larger than the above-mentioned threshold value, there is a non-half-tone image. On the other hand, when the adjacent number in the four directions is smaller than the above-mentioned threshold value, there is a half-tone image.

Figure 16:
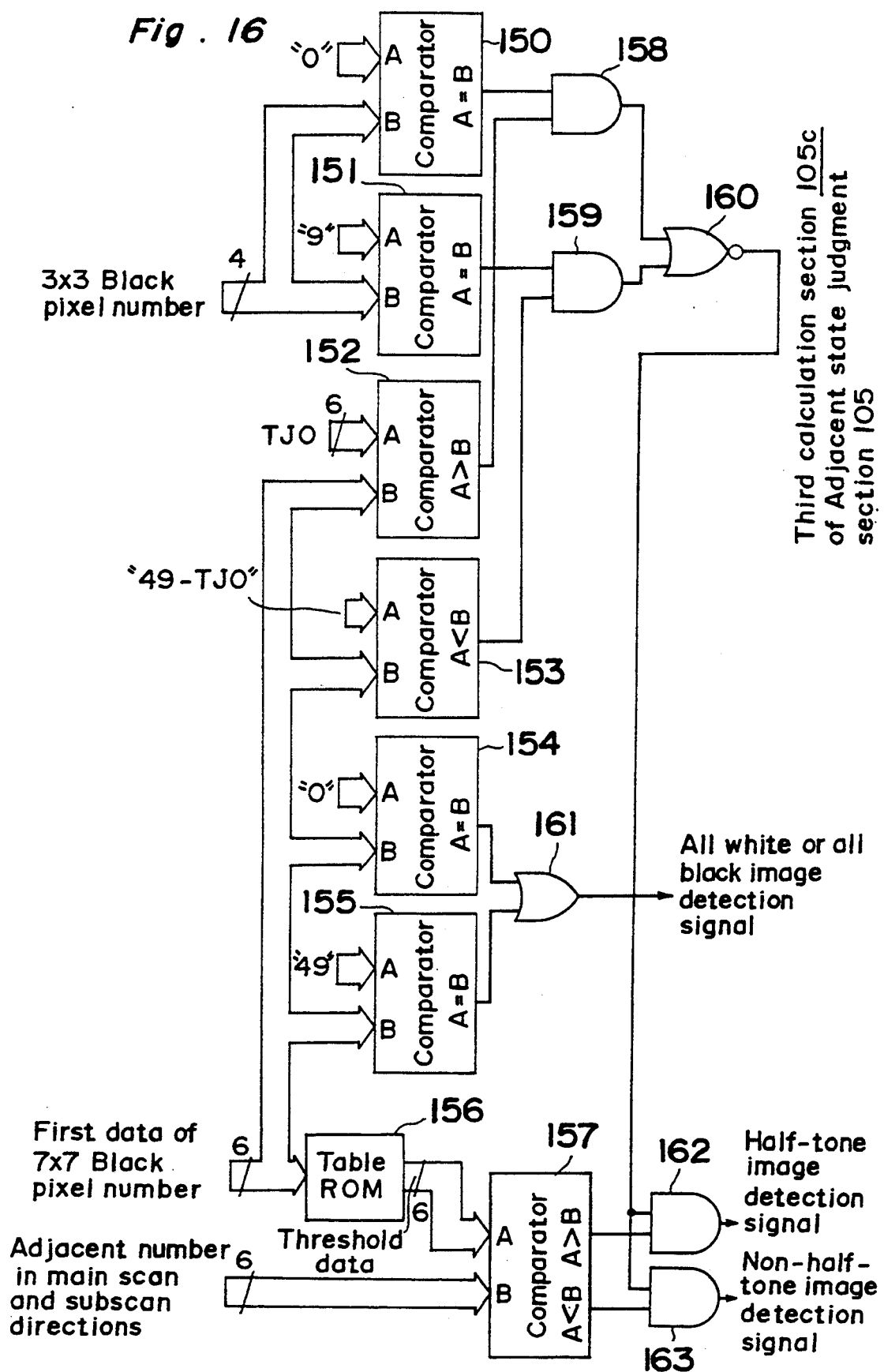
FIG. 16 is a schematic block diagram showing a third calculation section of the adjacent state judgment section shown in FIG. 3.

Therefore, in the present preferred embodiment, data of the above-mentioned threshold values are stored in a table ROM 156 shown in FIG. 16, and the area judgment is performed by comparing the adjacent number in the four directions of the main scan and subscan directions with the data of the threshold values outputted from the table ROM 156.

Further, in the present preferred embodiment, the Fattening type half-tone image is judged based on the periodicity of the change in the image density in the main scan direction or the subscan direction, namely, based on a peripheral distribution characteristic thereof. The number of the kinds of the Fattening type ordered dither methods is theoretically infinite, however, in practice, a limited number of kinds of dither methods have been used since a number of gradation steps of an image reader is limited to a finite value and a resolution of an image recording or printing unit is limited to a finite value. Therefore, the present preferred embodiment judges the Fattening type first dither image shown in FIG. 34 and the Fattening type second dither image shown in FIG. 35.

Figure 41:
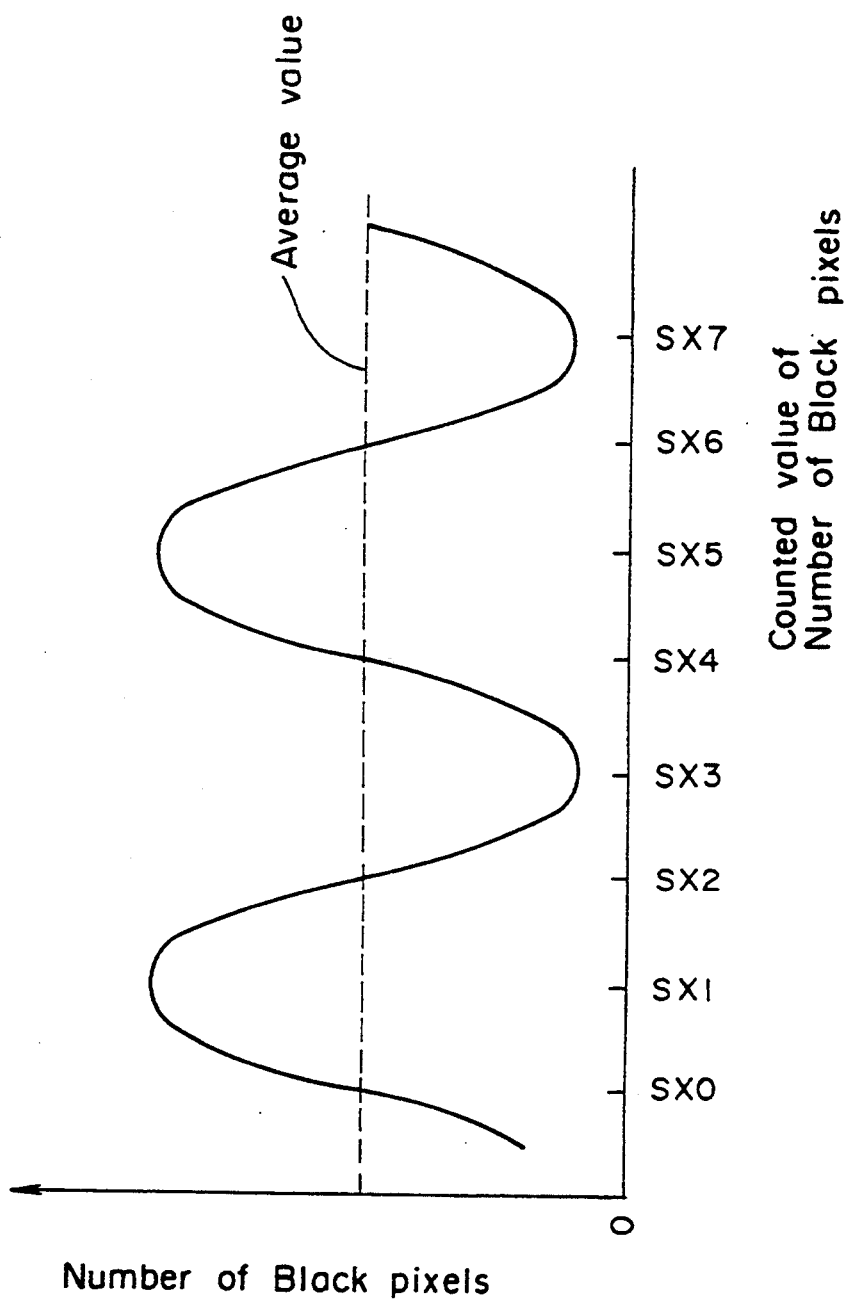
FIG. 41 is a graph showing a peripheral distribution of a number of black pixels on respective count values of numbers of black pixels within respective windows which are continuously aligned in the main scan or subscan direction.

In order to judge the former Fattening type first dither image, there are used eight windows shown in FIG. 37 and eight windows shown in FIG. 38. In FIGS. 37 and 38 and the other FIGS., * denotes a specified pixel to be processed. As shown in FIG. 37, data of the count value of the number of black pixels within seven pixel data D007 to D607 continuously aligned in the subscan direction are referred as data S10, and data of the count value of the number of black pixels within seven pixel data D008 to D608 continuously aligned in the subscan direction are referred as data S11. Similarly, data S12 to S17 are defined. Further, as shown in FIG. 38, data of the count value of the number of black pixels within seven pixel data D007 to D013 continuously aligned in the main scan direction are referred as data S20, and data of the count value of the number of black pixels within seven pixel data D107 to D113 continuously aligned in the main scan direction are referred as data S21. Similarly, data S22 to S27 are defined. A peripheral distribution characteristic of the number of the black pixels counted in the main scan or subscan direction based on these data is shown in FIG. 41, generally. It is to be noted that X is 1 or 2 in FIG. 41.

Figure 39:
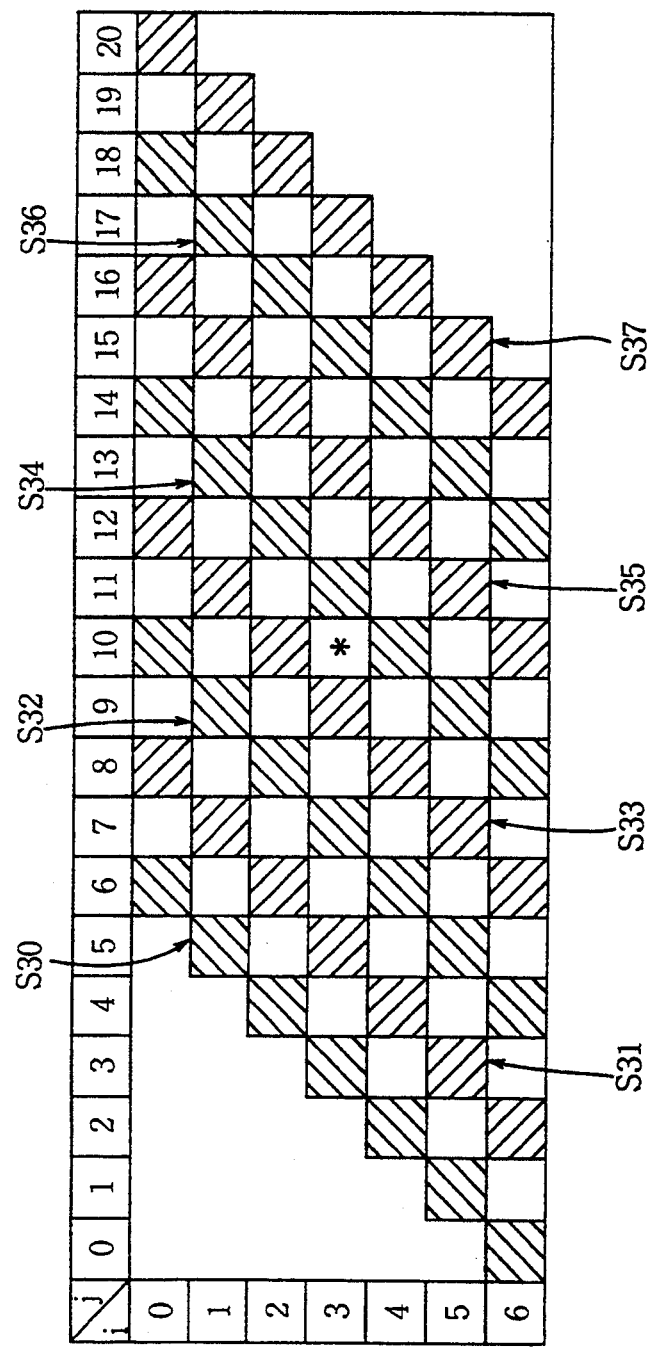
FIG. 39 is a front view showing pixel number data S30 to S37 of respective windows used in the dither judgment section shown in FIG. 3.
Figure 40:
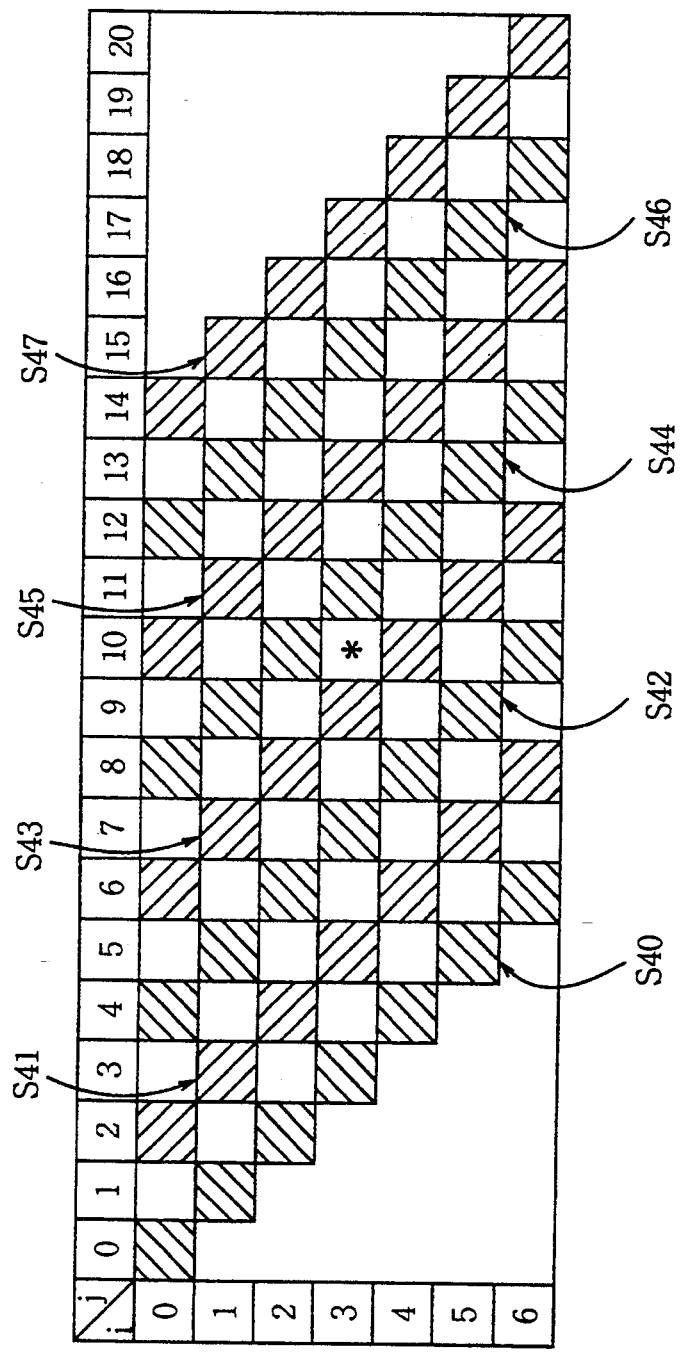
FIG. 40 is a front view showing pixel number data S40 to S47 of respective windows used in the dither judgment section shown in FIG. 3.

Further, in order to judge the latter Fattening type second dither image, there are used eight windows shown in FIG. 39 and eight windows shown in FIG. 40. As shown in FIG. 39, data of the count value of the number of black pixels within seven pixel data D006 to D600 continuously aligned in an oblique direction (referred to as a first oblique direction hereinafter) from the top right to the bottom left which is inclined by 45 degrees from both of the main scan and subscan directions are referred as data S30, and data of the count value of the number of black pixels within seven pixel data D008 to D602 continuously aligned in the first oblique direction are referred as data S31. Similarly, data S32 to S37 are defined. As shown in FIG. 40, data of the count value of the number of black pixels within seven pixel data D000 to D606 continuously aligned in an oblique direction (referred to as a second oblique direction hereinafter) from the top left to the bottom right which is inclined by 45 degrees from both of the main scan and subscan directions are referred as data S40, and data of the count value of the number of black pixels within seven pixel data D002 to D608 continuously aligned in the second oblique direction are referred as data S41. Similarly, data S42 to S47 are defined. The present preferred embodiment judges the Fattening type second dither image based on the peripheral distribution characteristic in a manner similar to that in the above-mentioned judgment of the Fattening first dither image.

(5-2) Dither Judgment Section

Figure 5:
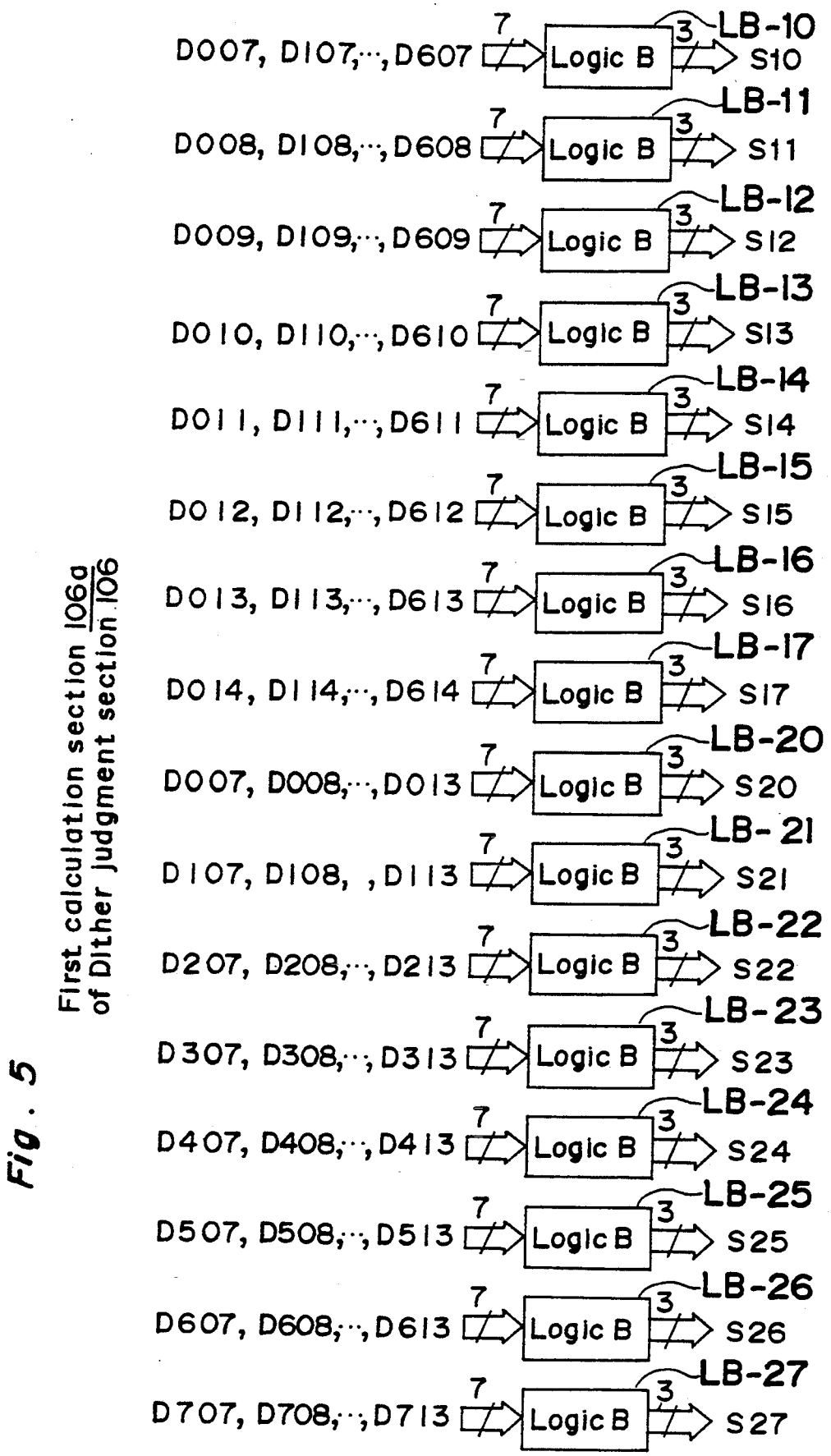
FIG. 5 is a schematic block diagram showing a first calculation section of a dither judgment section shown in FIG. 3.
Figure 6:
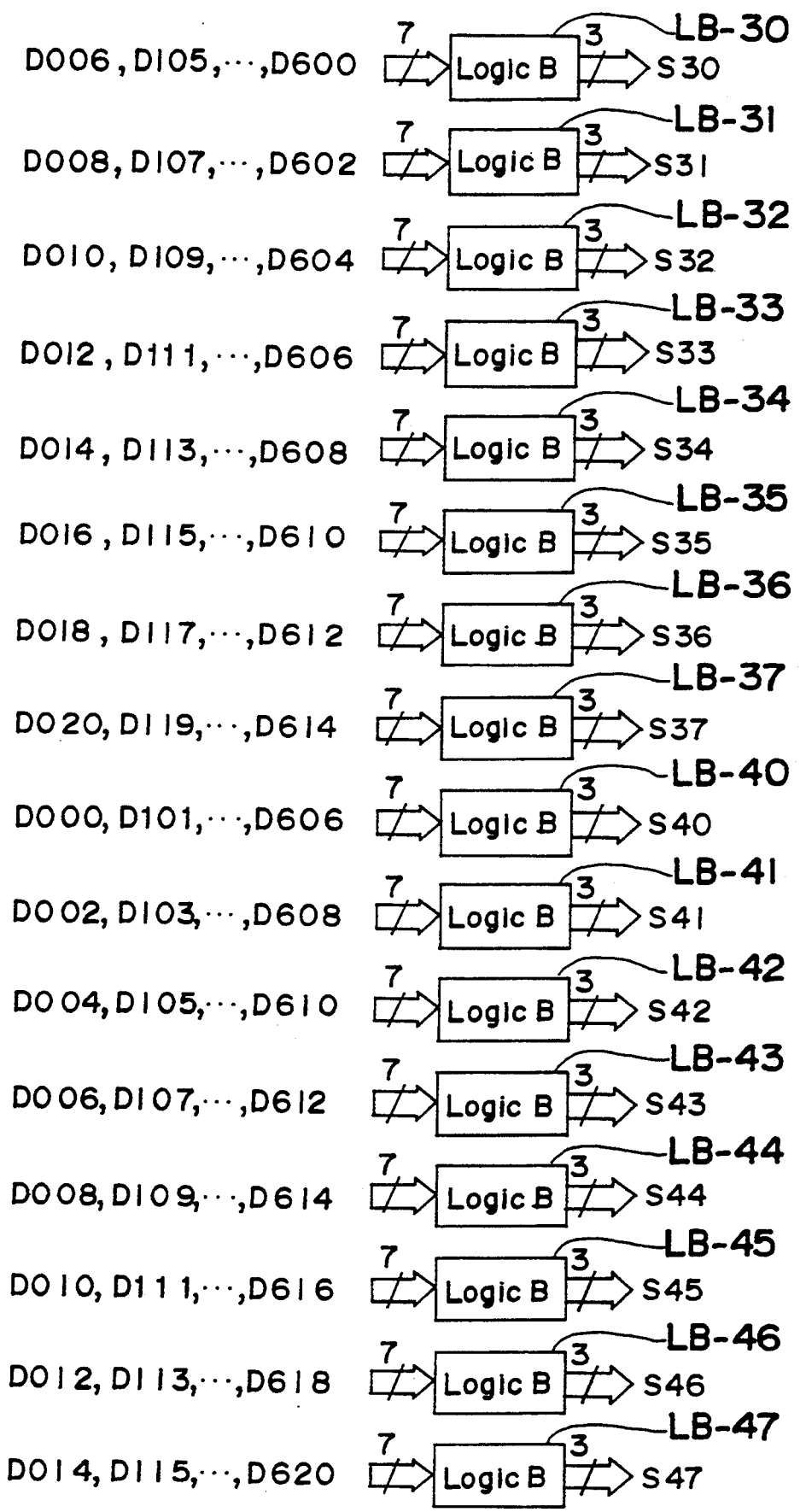
FIG. 6 is a schematic block diagram showing a second calculation section of the dither judgment section shown in FIG. 3.
Figure 8:
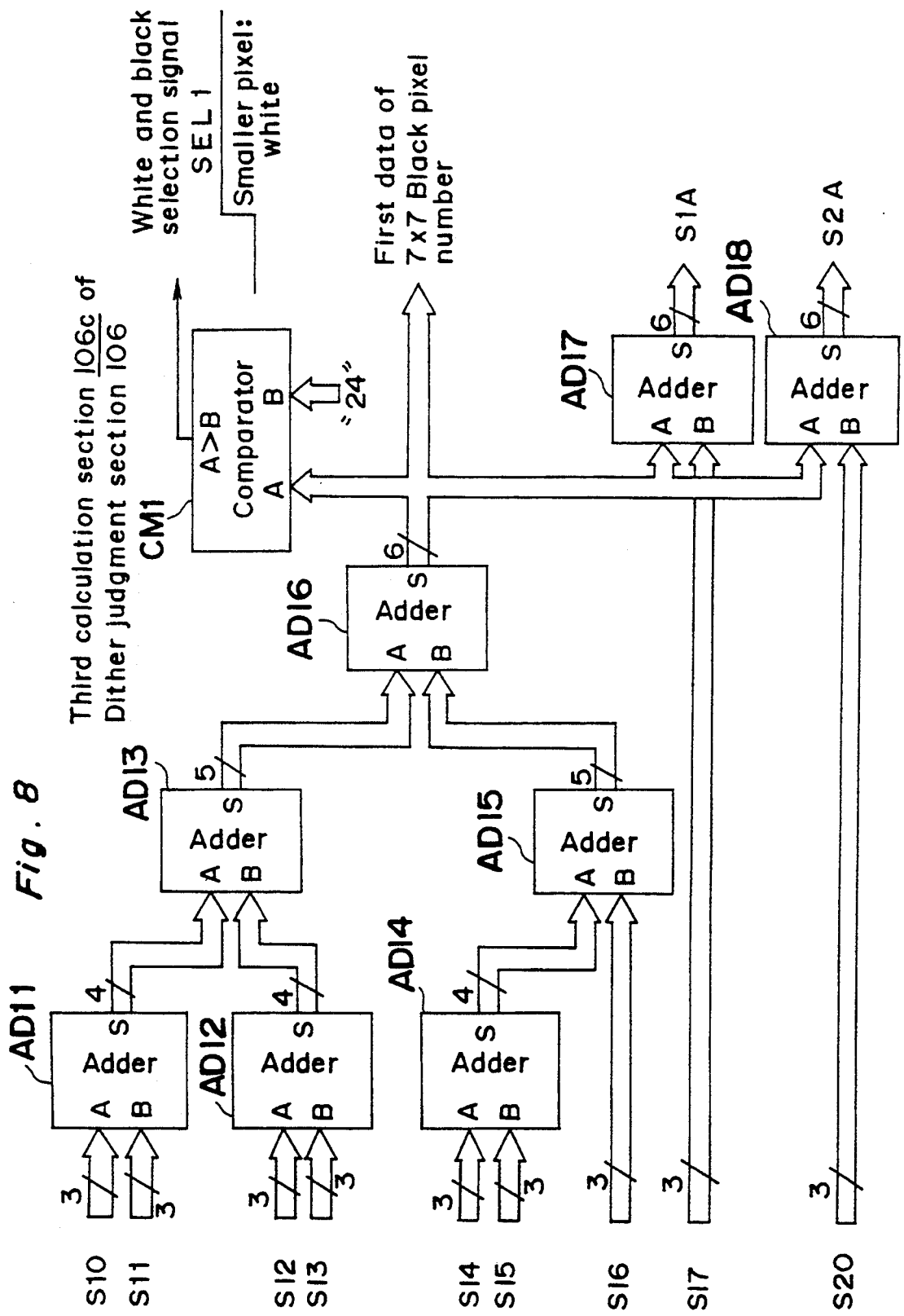
FIG. 8 is a schematic block diagram showing a third calculation section of the dither judgment section shown in FIG. 3.
Figure 9:
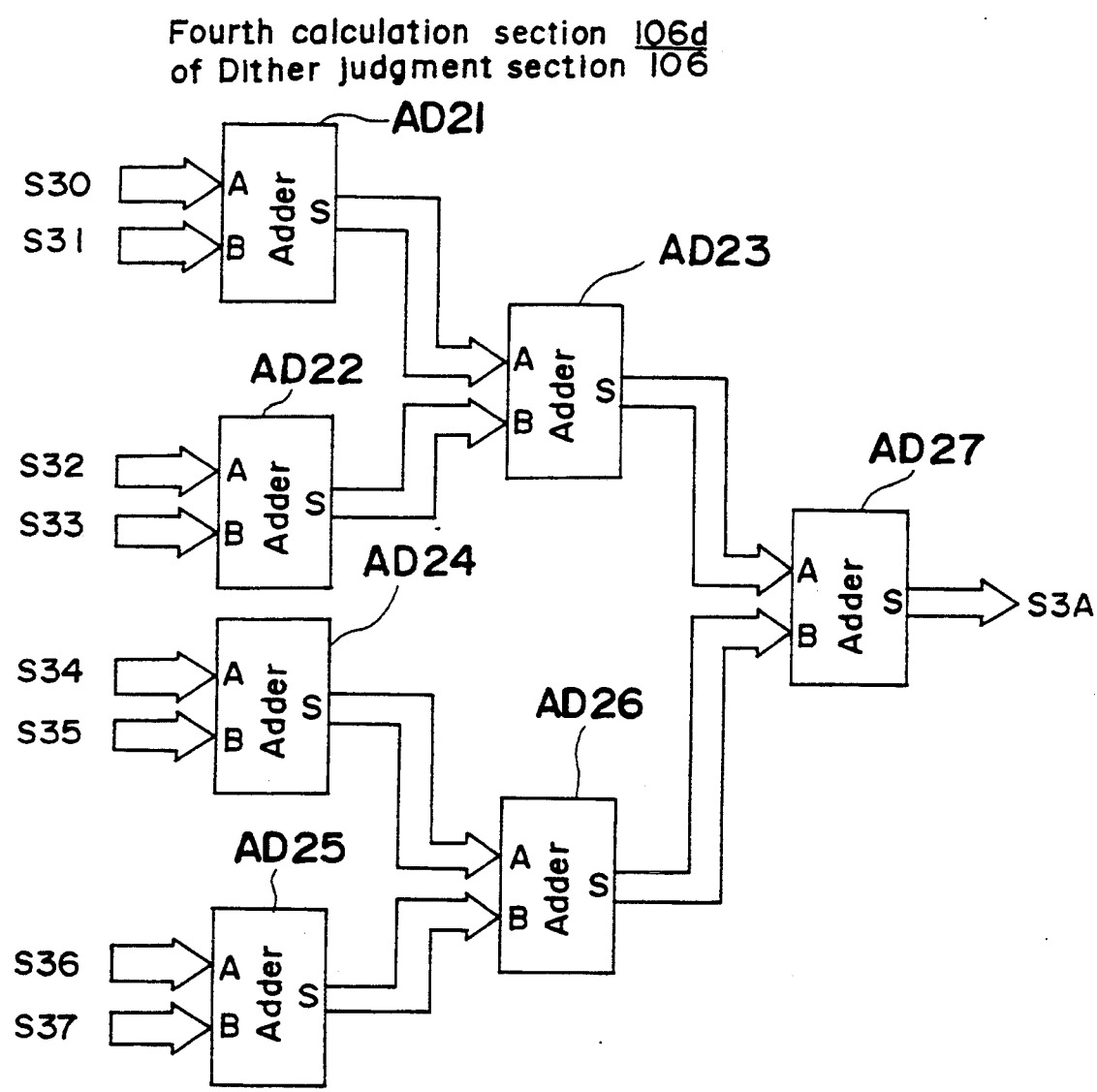
FIG. 9 is a schematic block diagram showing a fourth calculation section of the dither judgment section shown in FIG. 3.
Figure 10:
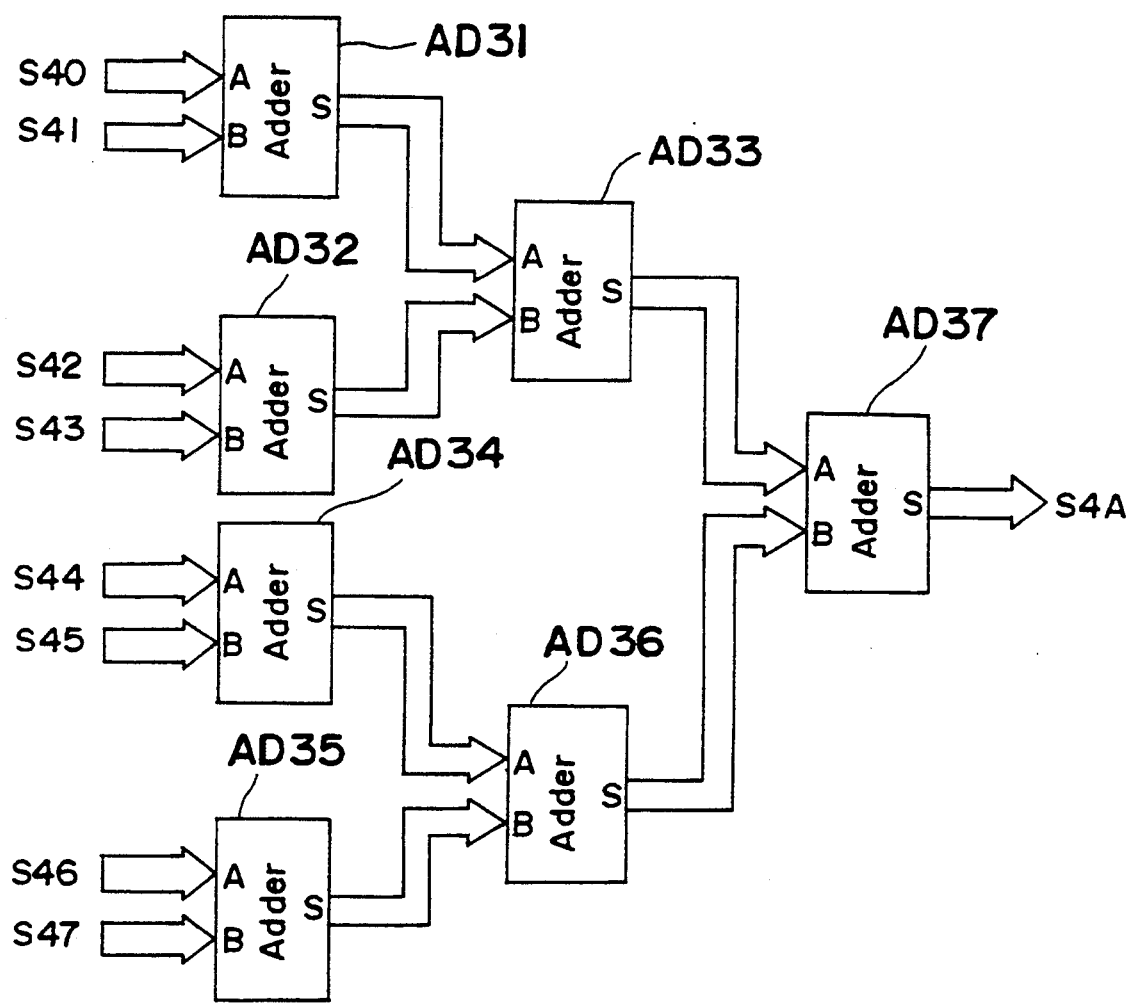
FIG. 10 is a schematic block diagram showing a fifth calculation section of the dither judgment section shown in FIG. 3.
Figure 11:
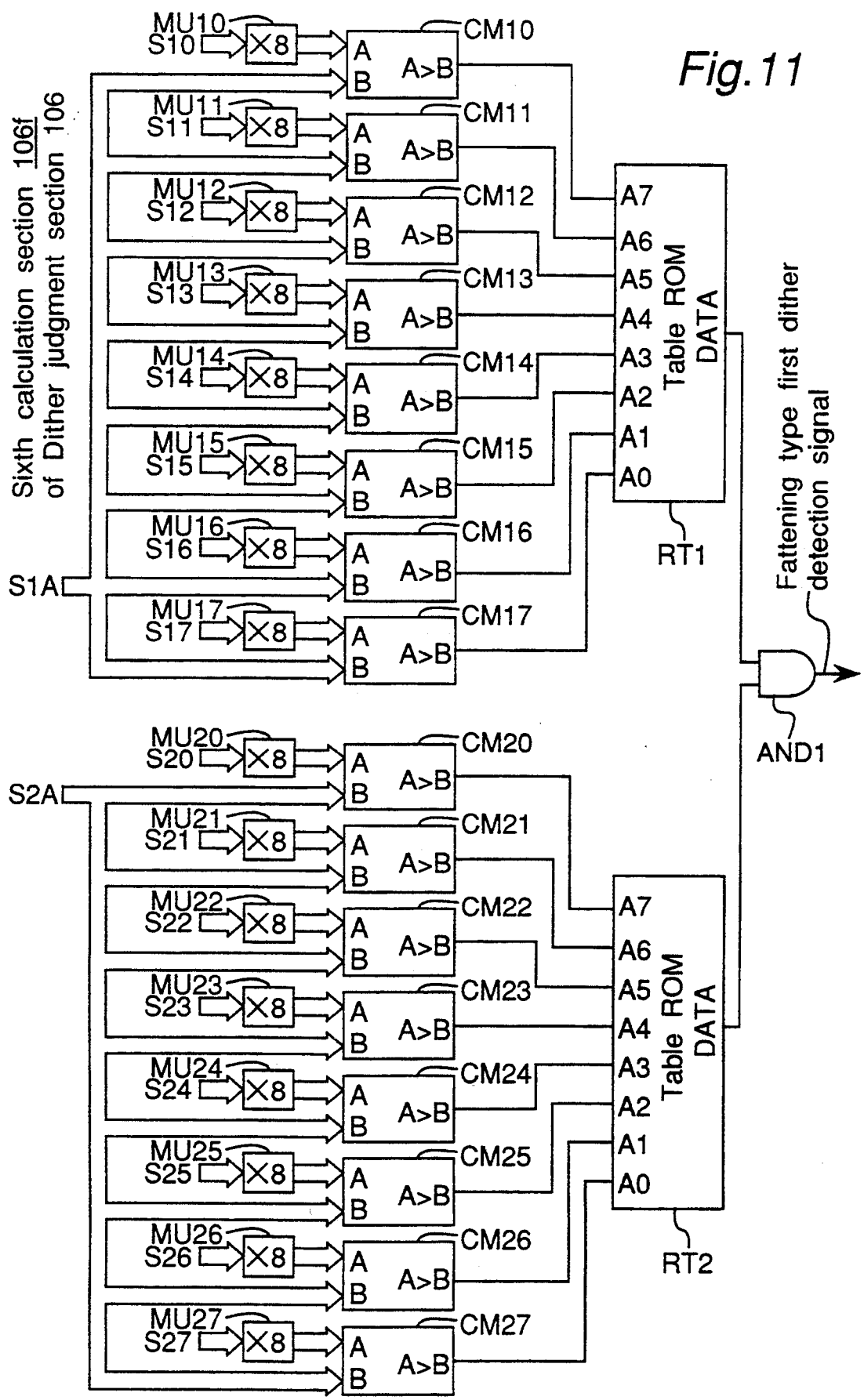
FIG. 11 is a schematic block diagram showing a sixth calculation section of the dither judgment section shown in FIG. 3.
Figure 12:
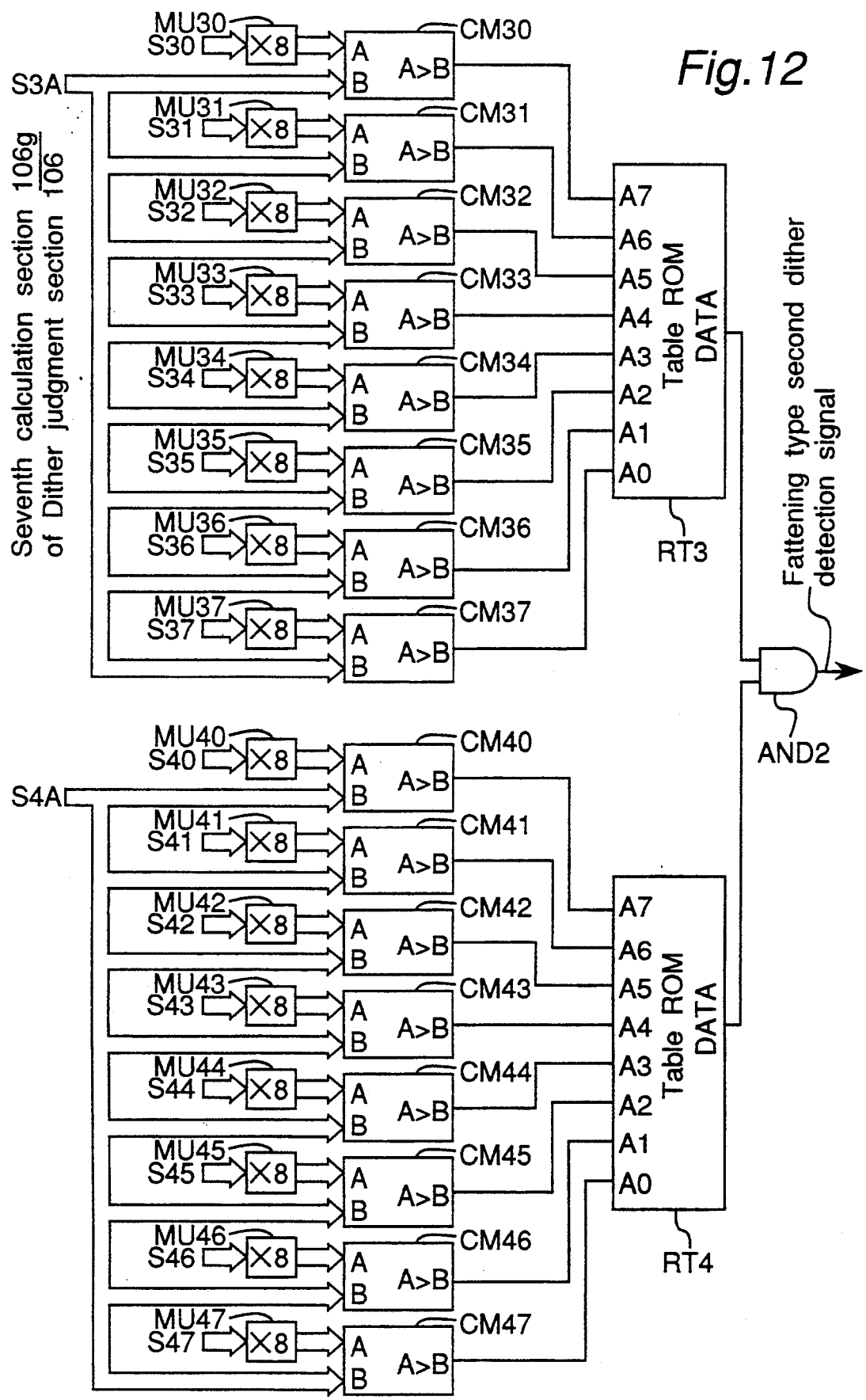
FIG. 12 is a schematic block diagram showing a seventh calculation section of the dither judgment section shown in FIG. 3.

The dither judgment section 106 shown in FIG. 3 comprises a first calculation section 106a shown in FIG. 5, a second calculation section 106b shown in FIG. 6, a third calculation section 106c shown in FIG. 8, a fourth calculation section 106d shown in FIG. 9, a fifth calculation section 106e shown in FIG. 10, a sixth calculation section 106f shown in FIG. 11, and a seventh calculation section 106g shown in FIG. 12. In FIG. 5 and the other FIGS., a number of bits is shown adjacent to data bus, and, for example, 7 (S1) denotes data bus of seven bits including a sign bit of one bit.

FIG. 5 shows the first calculation section 106a of the dither judgment section 106, and FIG. 6 shows the second calculation section 106b of the dither judgment section 106. In the first and second calculation sections 106a and 106b, there are provided 32 logic B circuits LB-10 to LB-17, LB-20 to LB-27, LB-30 to LB-37 and LB-40 to LB-47 each circuit counting a number of black pixels included in inputted pixel data of seven bits, the circuits outputting data S10 to S17, S20 to S27, S30 to S37 and S40 to S47, respectively.

Figure 7:
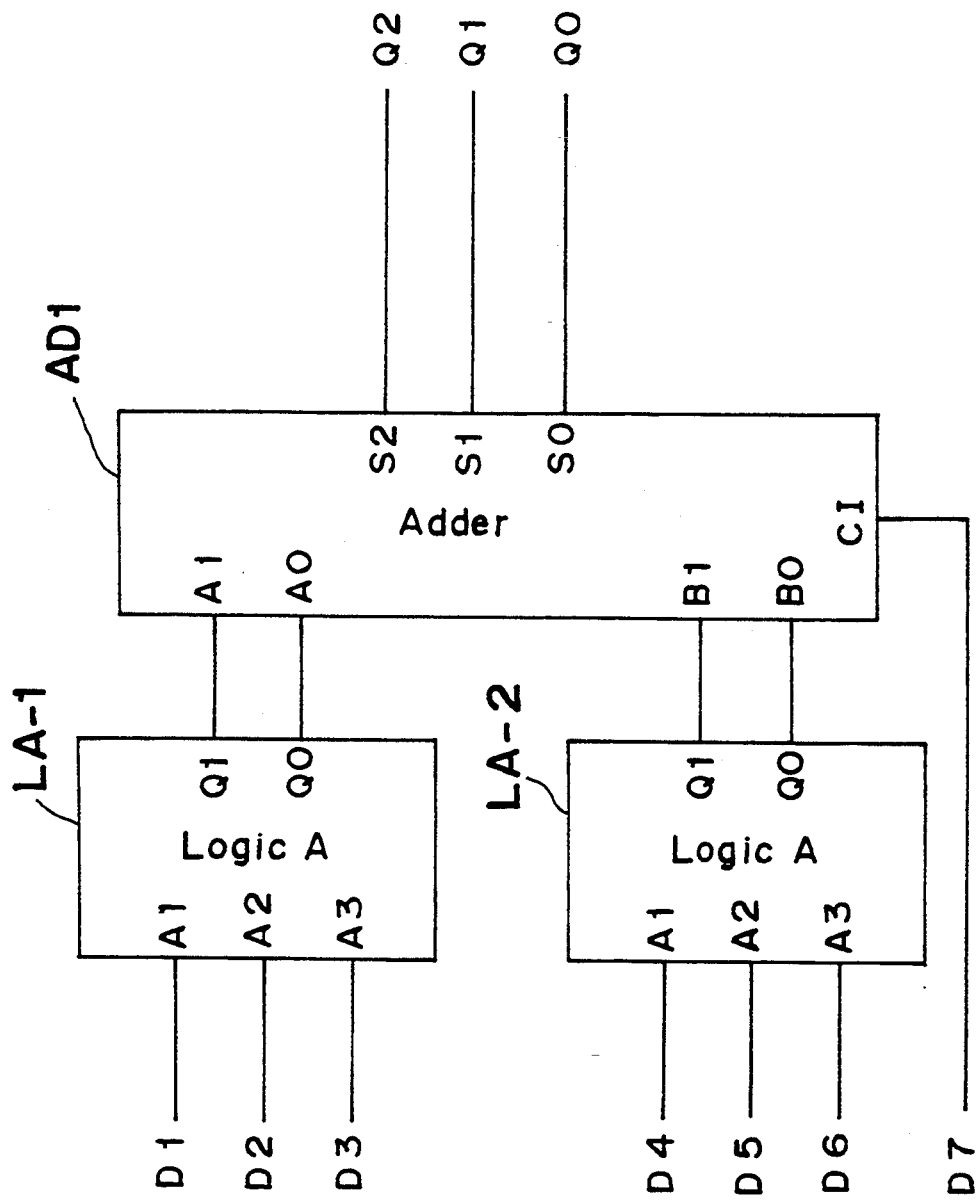
FIG. 7 is a schematic block diagram showing a logic B circuit shown in FIGS. 5, 6, 18 and 20 to 23.

FIG. 7 shows the logic B circuit LB shown in FIG. 5, 6, 18 and 20 to 23.

Referring to FIG. 7, the logic B circuit LB is provided for calculating a predetermined logic B calculation for inputted data of seven bits D1 to D7, and thereafter, outputting data of 3 bits Q1, Q2 and Q3 of the calculation result thereof for representing the number of bits of "1" or a black pixel in the inputted data. The logic B circuit LB comprises two logic A circuits LA-1 and LA-2 for respectively calculating predetermined logic calculations represented by the following equations (2) and (3), and an adder AD1.

$$Q0 = A1 \cdot A2 \cdot A3 \vee \overline{A1} \cdot \overline{A2} \cdot A3 \vee A1 \cdot \overline{A2} \cdot \overline{A3} \over \overline{A1} \cdot A2 \cdot \overline{A3} \quad (2)$$

$$Q1 = \vee A1 \cdot A2 \cdot A3 \vee \overline{A1} \cdot A2 \cdot A3 \vee A1 \cdot \overline{A2} \cdot A3 \quad (3)$$
$$\overline{A1} \cdot A2 \cdot A3$$
$$= A1 \cdot A2 \vee A2 \cdot A3 \vee A3 \cdot A1$$

Data P1 to P3 of the least significant bits (LSB) of 3 bits are inputted to the logic A circuit LA-1, data P4 to P6 of 3 bits higher from the data P1 to P3 are inputted to the logic A circuit LA-2, and data P7 of the MSB of one bit are inputted to a carry-in terminal CI of the adder AD4. After each of the logic A circuits LA-1 and LA-2 performs the logic A calculation for the inputted data of 3 bits, data of 2 bits of the calculation result thereof are outputted to the adder AD1. The adder AD1 adds the inputted two data each data of 2 bits, and outputs data Q1, Q2 and Q3 of 3 bits of the addition result thereof.

FIG. 8 shows the third calculation section 106c of the dither judgment section 106.

Referring to FIG. 8, the data S10 to S16 are added to each other by adders AD11 to AD16, and then, first data of 7×7 black pixel number of the addition results are outputted from the adder AD16 to an input terminal A of a comparator CM1, respective input terminals A of adders AD17 and AD18, and the third calculation section 105c of the adjacent state judgment section 105 shown in FIG. 16. The adder AD17 adds the first data of the 7×7 black pixel number to the data S17, and then, outputs data S1A of the addition result to the sixth calculation section 106f of the dither judgment section 106 shown in FIG. 11. Further, the adder AD18 adds the first data of the 7×7 black pixel number to the data S20, and then, outputs data S2A of the addition result to the sixth calculation section 106f of the dither judgment section 106 shown in FIG. 11. Furthermore, the comparator CM1 compares the above calculated first data of the 7×7 black pixel number with data of 24. When the first data of the 7×7 black pixel number is larger than 24, the comparator CM1 outputs a white and black selection signal SEL1 of a high level representing that smaller pixels are white pixels to the first calculation section 105a of the adjacent state judgment section 105.

On the other hand, when the first data of the 7×7 black pixel number is equal to or smaller than 24, the comparator CM1 outputs thereto the white and black selection signal SEL1 of a low level representing that smaller pixels are black pixels, similarly.

FIG. 9 shows the fourth calculation section 106d of the dither judgment section 106. Referring to FIG. 9, the data S30 to S37 are added to each other by adders AD21 to AD27, and then, data S3A of the addition result are outputted from the adder AD27 to the seventh calculation section 106g of the dither judgment section 106.

FIG. 10 shows the fourth calculation section 106e of the dither judgment section 106. Referring to FIG. 10, the data S40 to S47 are added to each other by adders AD31 to AD37, and then, data S4A of the addition result are outputted from the adder AD37 to the seventh calculation section 106g of the dither judgment section 106.

FIG. 11 shows the sixth calculation section 106f of the dither judgment section 106.

Referring to FIG. 11, the data S10 to S17 are inputted to multipliers MU10 to MU17, respectively, and each data are multiplied by eight. Respective data of multiplication results are outputted to respective input terminals A of comparators CM10 to CM17, respectively. On the other hand, the data S1A are inputted to respective input terminals B of the comparators CM10 to CM17, each of which compares the data inputted to the input terminal A thereof with the data inputted to the input terminal B thereof. When A>B, the comparators CM10 to CM17 output high level signals to respective address terminals A7 to A0 of a table ROM RT1 for judging whether or not the image within the predetermined area is the Fattening first dither image. On the other hand, when A≦B, the comparators CM10 to CM17 output low level signals thereto, similarly. Based on the data inputted to the address terminals, when the table ROM RT1 judges that the image within the predetermined area is the Fattening type first dither image, the table ROM RT1 outputs a high level signal to a first input terminal of an AND gate AND1. On the other hand, when the table ROM RT1 judges that the image within the predetermined area is not the Fattening type first dither image, the table ROM RT1 outputs a low level signal thereto, similarly.

Further, the data S20 to S27 are inputted to multipliers MU20 to MU27, respectively, and each data are multiplied by eight. Respective data of multiplication results are outputted to respective input terminals A of comparators CM20 to CM27, respectively. On the other hand, the data S2A are inputted to respective input terminals B of the comparators CM20 to CM27, each of which compares the data inputted to the input terminal A thereof with the data inputted to the input terminal B thereof. When A>B, the comparators CM20 to CM27 output high level signals to respective address terminals A7 to A0 of a table ROM RT2 for judging whether or not the image within the predetermined area is the Fattening first dither image. On the other hand, when A≦B, the comparators CM20 to CM27 output low level signals thereto, similarly. Based on the data inputted to the address terminals, when the table ROM RT2 judges that the image within the predetermined area is the Fattening type first dither image, and the table ROM RT2 outputs a high level signal to a second input terminal of the AND gate AND1. On the other hand, when the table ROM RT2 judges that the image within the predetermined area is not the Fattening type first dither image, and the table ROM RT2 outputs a low level signal thereto, similarly.

Figure 17:
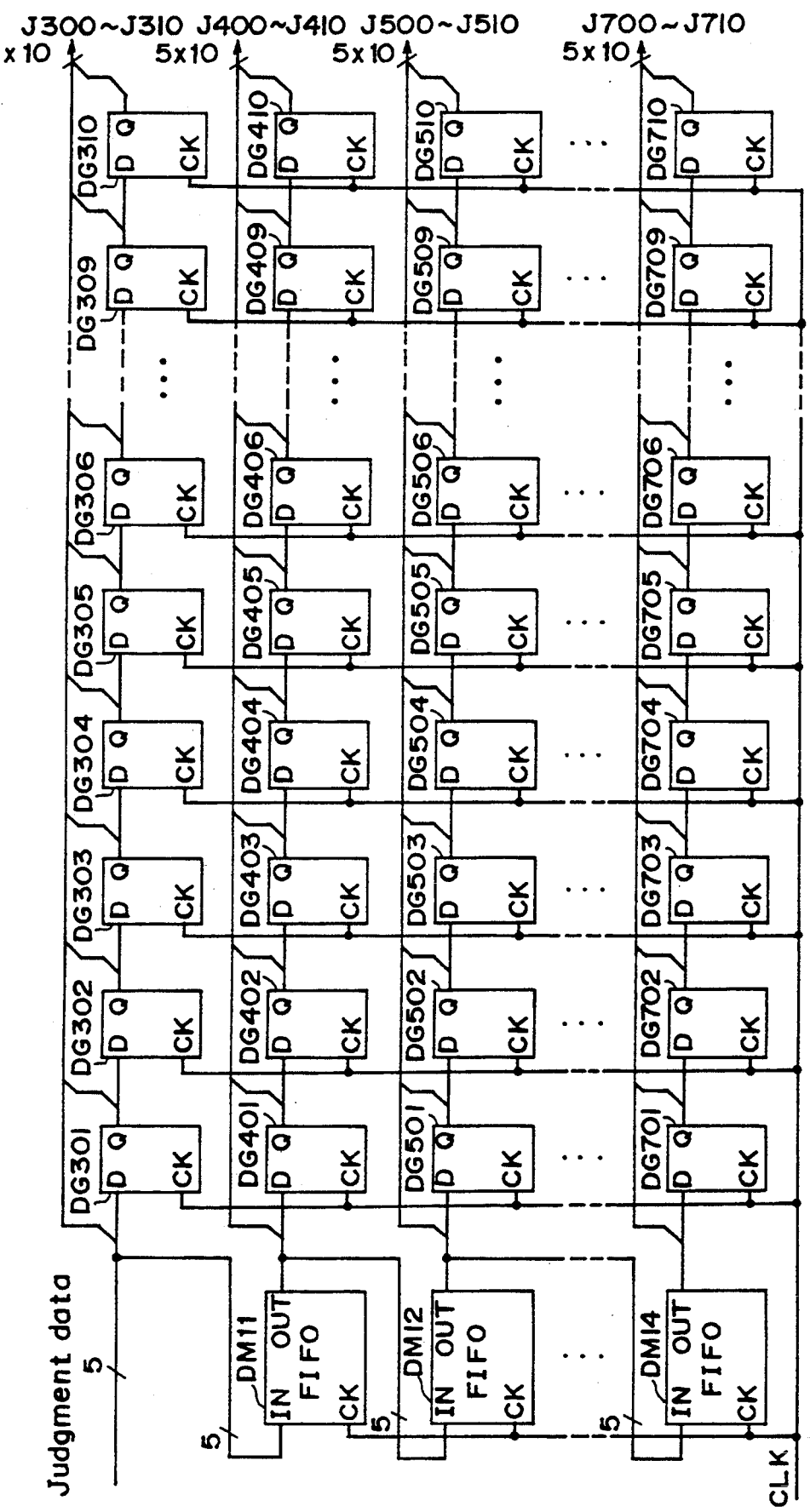
FIG. 17 is a schematic block diagram showing a 5×11 matrix memory shown in FIG. 3.

Further, the AND gates AND1 performs a logical product of the signals inputted to the first and second input terminals thereof, and then, outputs the output signal as the Fattening type first dither detection signal being one of the judgment data to the 5×11 matrix memory 107 shown in FIG. 17.

In the above-mentioned sixth calculation section 106f, the comparisons between the numbers of black pixels within the respective windows shown in FIGS. 38 and 39 and the average value of the numbers of black pixels calculated from these numbers are respectively performed by the comparators CM10 to CM17 and CM20 to CM27, and the data of the comparison results are retrieved by the table ROMs RT1 and RT2 so as to judge whether or not the image within the predetermined area is the Fattening type first dither image in both of the main scan and subscan directions, as described above with reference to the peripheral distribution characteristic shown in FIG. 41. Thereafter, only when the image within the predetermined area is judged as the Fattening type first dither image in both of the main scan and subscan directions, the Fattening type first dither detection signal of the high level is outputted.

FIG. 12 shows the seventh calculation section 106g of the dither judgment section 106.

Referring to FIG. 12, the data S30 to S37 are inputted to multipliers MU30 to MU37, respectively, and each data are multiplied by eight. Respective data of multiplication results are outputted to respective input terminals A of comparators CM30 to CM37, respectively. On the other hand, the data S3A are inputted to respective input terminals B of the comparators CM30 to CM37, each of which compares the data inputted to the input terminal A thereof with the data inputted to the input terminal B thereof. When A>B, the comparators CM30 to CM37 output high level signals to respective address terminals A7 to A0 of a table ROM RT3 for judging whether or not the image within the predetermined area is the Fattening second dither image. On the other hand, when A≦B, the comparators CM30 to CM37 output low level signals thereto, similarly. Based on the data inputted to the address terminals, when the table ROM RT3 judges that the image within the predetermined area is the Fattening type second dither image, and the table ROM RT3 outputs a high level signal to a first input terminal of an AND gate AND2. On the other hand, when the table ROM RT3 judges that the image within the predetermined area is not the Fattening type second dither image, and the table ROM RT2 outputs a low level signal thereto, similarly.

Further, the data S40 to S47 are inputted to multipliers MU40 to MU47, respectively, and each data are multiplied by eight. Respective data of multiplication results are outputted to respective input terminals A of comparators CM40 to CM47, respectively. On the other hand, the data S4A are inputted to respective input terminals B of the comparators CM40 to CM47, each of which compares the data inputted to the input terminal A thereof with the data inputted to the input terminal B thereof. When A>B, the comparators CM40 to CM47 output high level signals to respective address terminals A7 to A0 of a table ROM RT4 for judging whether or not the image within the predetermined area is the Fattening second dither image. On the other hand, when $A \leq B$, the comparators CM40 to CM47 output low level signals thereto, similarly. Based on the data inputted to the address terminals, when the table ROM RT4 judges that the image within the predetermined area is the Fattening type second dither image, and the table ROM RT4 outputs a high level signal to a second input terminal of the AND gate AND2. On the other hand, when the table ROM RT4 judges that the image within the predetermined area is not the Fattening type second dither image, and the table ROM RT4 outputs a low level signal thereto, similarly.

Further, the AND gates AND2 performs a logical product of the signals inputted to the first and second input terminals thereof, and then, outputs the output signal as the Fattening type second dither detection signal being one of the judgment data to the 5×11 matrix memory 107 shown in FIG. 17.

In the above-mentioned seventh calculation section 106g, the comparisons between the numbers of black pixels within the respective windows shown in FIGS. 40 and 41 and the average value of the numbers of black pixels calculated from these numbers are respectively performed by the comparators CM30 to CM37 and CM40 to CM47, and the data of the comparison results are retrieved by the table ROMs RT3 and RT4 so as to judge whether or not the image within the predetermined area is the Fattening type second dither image in both of the first and second oblique directions, as described above with reference to the peripheral distribution characteristic shown in FIG. 41. Thereafter, only when the image within the predetermined area is judged as the Fattening type second dither image in both of the first and second oblique directions, the Fattening type second dither detection signal of the high level is outputted.

(5-3) Adjacent State Judgment Section

Figure 13:
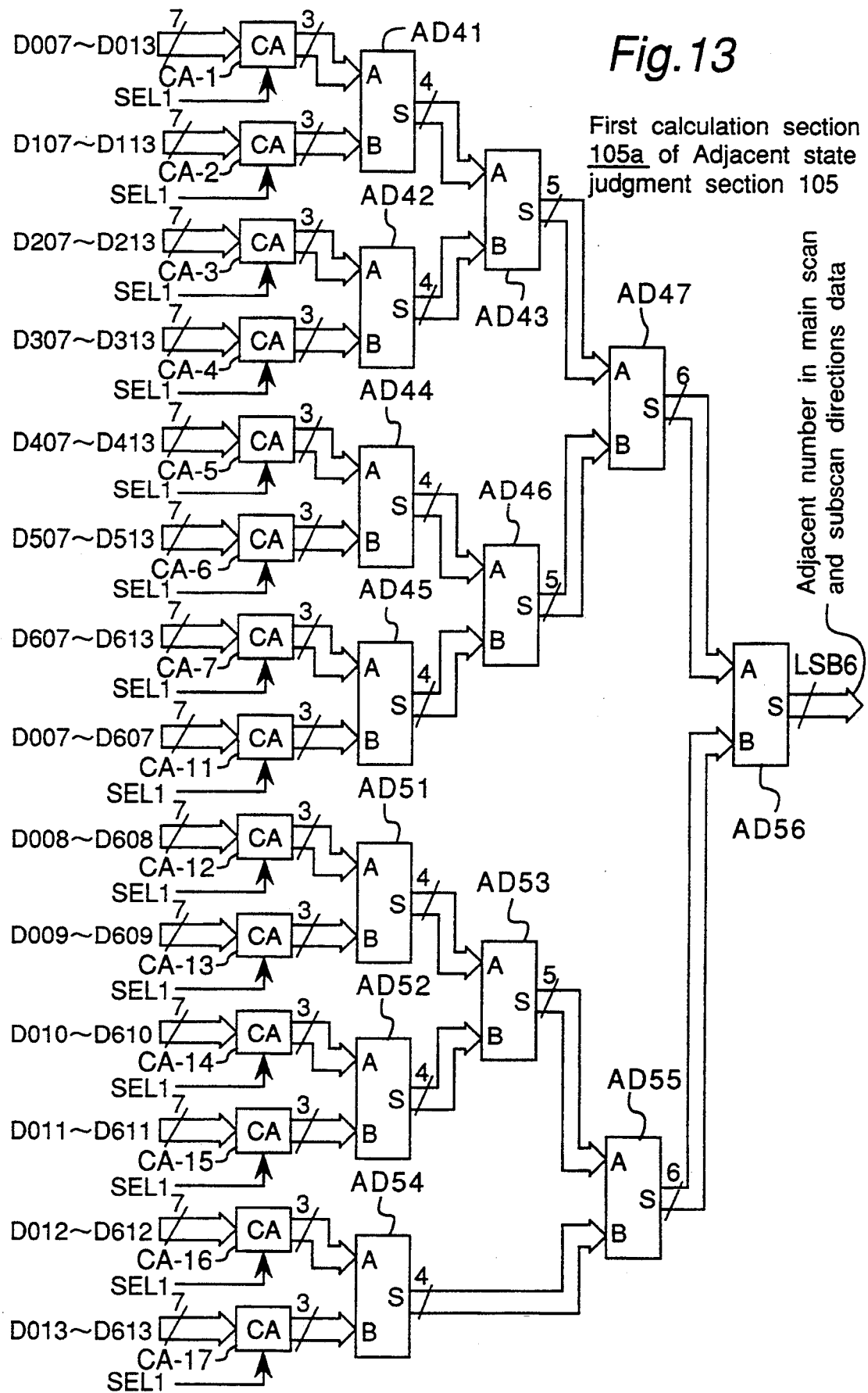
FIG. 13 is a schematic block diagram showing a first calculation section of an adjacent state judgment section shown in FIG. 3.
Figure 15:
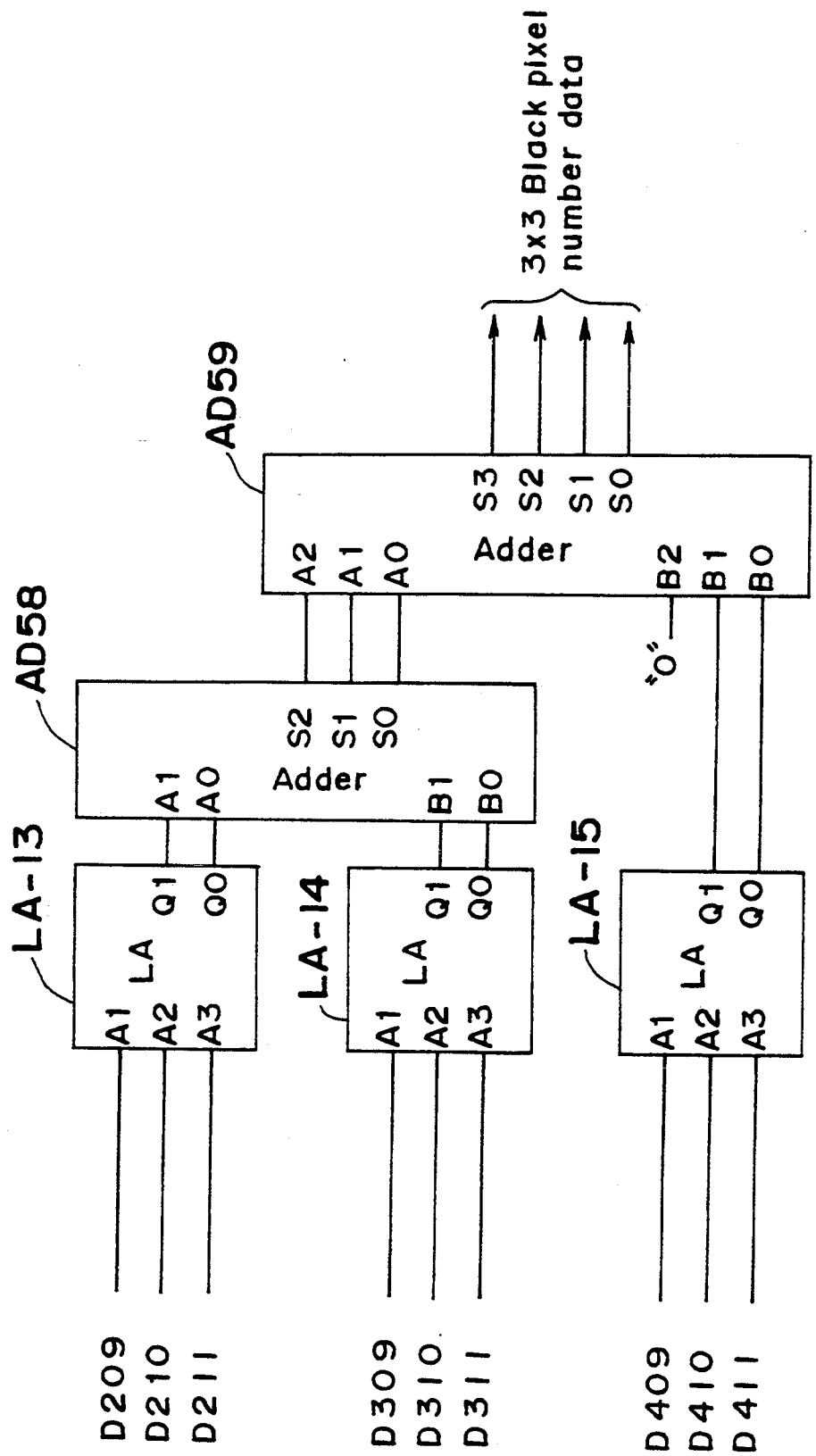
FIG. 15 is a schematic block diagram showing a second calculation section of the adjacent state judgment section shown in FIG. 3.

The adjacent state judgment section 105 shown in FIG. 3 comprises a first calculation section 105a shown in FIG. 13, a second calculation section 105b shown in FIG. 15, and a third calculation section 105c shown in FIG. 16.

Figure 42:
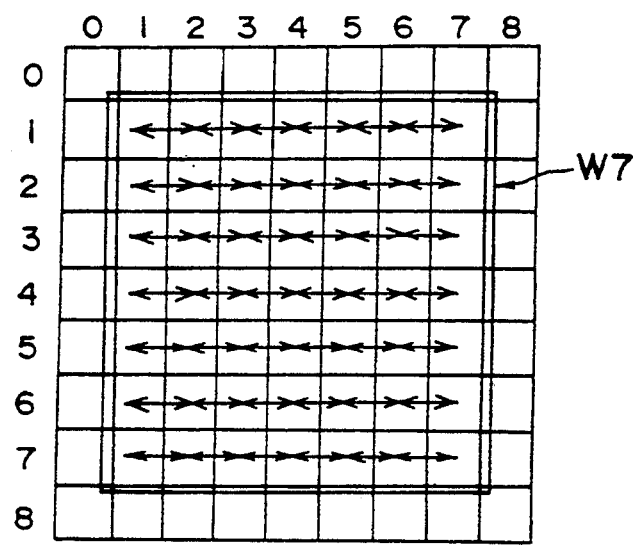
FIG. 42 is a front view showing adjacency in the main scan direction in respective pixels within a 7×7 window W7.
Figure 43:
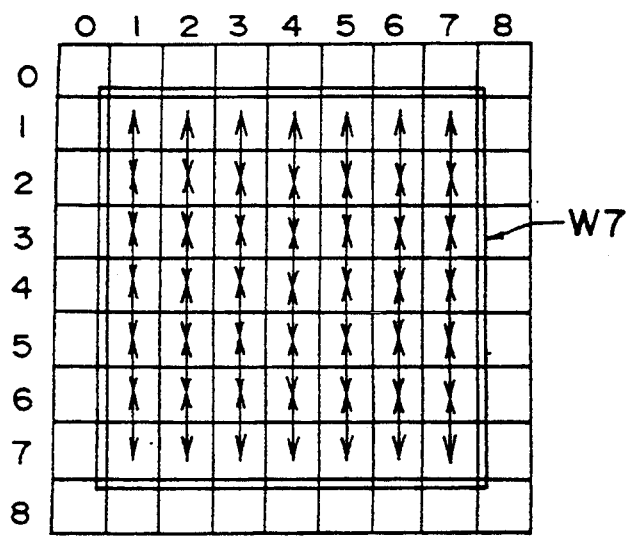
FIG. 43 is a front view showing adjacency in the subscan direction in respective pixels within the 7×7 window W7.

In the present preferred embodiment, the adjacent number of the smaller pixels in the main scan and subscan directions is obtained by counting a number of adjacencies between respective pixels adjacent to each other which are indicated by arrows shown in FIGS. 42 and 43. In order to count the adjacent number on each one scanning line in the main scan direction or the subscan direction, there is used an adjacent number in the main scan and subscan directions counter (referred to as an adjacent number counter hereinafter) CA shown in FIG. 14.

FIG. 13 shows the first calculation section 105a of the adjacent state judgment section 105 shown in FIG. 3.

Referring to FIG. 13, the white and black selection signal SEL1 is inputted to respective adjacent number counters CA-1 to CA-7 and CA-11 to CA-17.

The seven pixel data D007 to D013 continuously aligned in the main scan direction are inputted to the adjacent number counter CA-1, an adjacent number of the smaller pixels is counted, and then, data of the count value of the adjacent number thereof are outputted to an adder AD41. The seven pixel data D107 to D113 continuously aligned in the main scan direction are inputted to the adjacent number counter CA-2, an adjacent number of the smaller pixels is counted, and then, data of the count value of the adjacent number thereof are outputted to an adder AD41. The seven pixel data D207 to D213 continuously aligned in the main scan direction are inputted to the adjacent number counter CA-3, an adjacent number of the smaller pixels is counted, and then, data of the count value of the adjacent number thereof are outputted to an adder AD42. The seven pixel data D307 to D313 continuously aligned in the main scan direction are inputted to the adjacent number counter CA-4, an adjacent number of the smaller pixels is counted, and then, data of the count value of the adjacent number thereof are outputted to an adder AD42. Further, the seven pixel data D407 to D413 continuously aligned in the main scan direction are inputted to the adjacent number counter CA-5, an adjacent number of the smaller pixels is counted, and then, data of the count value of the adjacent number thereof are outputted to an adder AD44. The seven pixel data D507 to D513 continuously aligned in the main scan direction are inputted to the adjacent number counter CA-6, an adjacent number of the smaller pixels is counted, and then, data of the count value of the adjacent number thereof are outputted to an adder AD44. The seven pixel data D607 to D613 continuously aligned in the main scan direction are inputted to the adjacent number counter CA-7, an adjacent number of the smaller pixels is counted, and then, data of the count value of the adjacent number thereof are outputted to an adder AD45.

Furthermore, the seven pixel data D007 to D607 continuously aligned in the subscan direction are inputted to the adjacent number counter CA-11, an adjacent number of the smaller pixels is counted, and then, data of the count value of the adjacent number thereof are outputted to an adder AD45. The seven pixel data D008 to D608 continuously aligned in the subscan direction are inputted to the adjacent number counter CA-12, an adjacent number of the smaller pixels is counted, and then, data of the count value of the adjacent number thereof are outputted to an adder AD51. The seven pixel data D009 to D609 continuously aligned in the subscan direction are inputted to the adjacent number counter CA-13, an adjacent number of the smaller pixels is counted, and then, data of the count value of the adjacent number thereof are outputted to an adder AD51. The seven pixel data D010 to D610 continuously aligned in the subscan direction are inputted to the adjacent number counter CA-14, an adjacent number of the smaller pixels is counted, and then, data of the count value of the adjacent number thereof are outputted to an adder AD52. The seven pixel data D011 to D611 continuously aligned in the subscan direction are inputted to the adjacent number counter CA-15, an adjacent number of the smaller pixels is counted, and then, data of the count value of the adjacent number thereof are outputted to an adder AD52. The seven pixel data D012 to D612 continuously aligned in the subscan direction are inputted to the adjacent number counter CA-16, an adjacent number of the smaller pixels is counted, and then, data of the count value of the adjacent number thereof are outputted to an adder AD54. The seven pixel data D013 to D613 continuously aligned in the subscan direction are inputted to the adjacent number counter CA-17, an adjacent number of the smaller pixels is counted, and then, data of the count value of the adjacent number thereof are outputted to an adder AD54.

The data of the respective adjacent numbers of the smaller pixels counted by the respective adjacent number counters CA-1 to CA-7 and CA-11 to CA-17 are added to each other by adders AD41 to AD47 and AD51 to AD56, data of the adjacent number in the main scan and subscan directions of the addition result thereof are outputted from the adder AD56 to the third calculation section 105c of the adjacent state judgment section 105.

Figure 14:
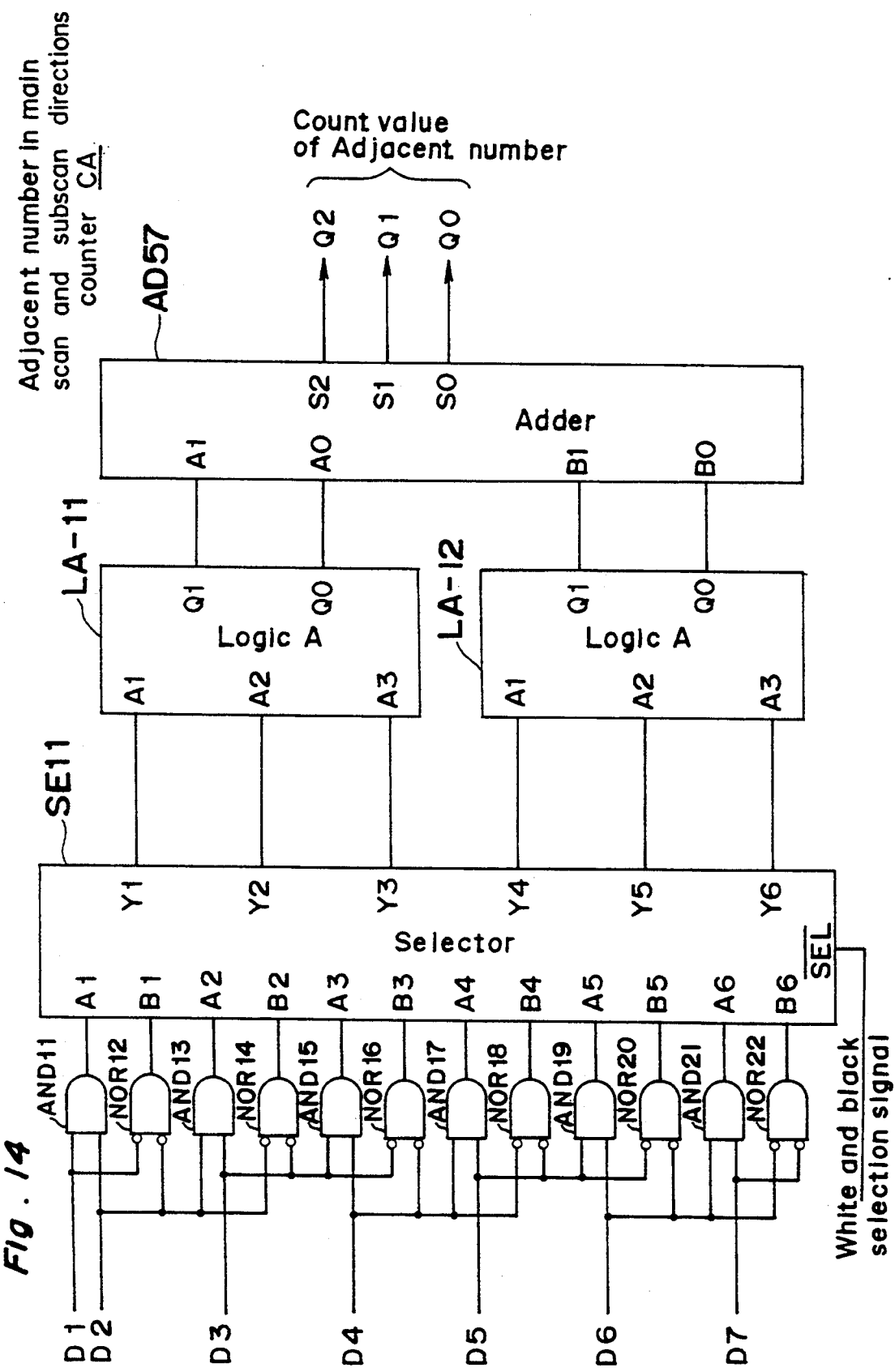
FIG. 14 is a schematic block diagram showing an adjacent number in main scan and subscan directions counter shown in FIG. 13.

FIG. 14 shows the adjacency number counter CA shown in FIG. 13.

Referring to FIG. 14, the first bit data D1 of the inputted data of 7 bits are inputted to a first input terminal of an AND gate AND11 and a first inverted input terminal of a NOR gate NOR12, and also the second bit data D2 thereof are inputted to a second input terminal of the AND gate AND11, a second inverted input terminal of the NOR gate NOR12, a first input terminal of an AND gate AND13, and a first inverted input terminal of a NOR gate NOR14. Further, the third bit data D3 thereof are inputted to a second input terminal of the AND gate AND13, a second inverted input terminal of a NOR gate NOR14, a first input terminal of an AND gate AND15, and a first inverted input terminal of a NOR gate NOR16, and also the fourth bit data D4 thereof are inputted to a second input terminal of the AND gate AND15, a second inverted input terminal of the NOR gate NOR16, a first input terminal of the AND gate AND17, and a first inverted input terminal of a NOR gate NOR18. Further, the fifth data D5 thereof are inputted to a second input terminal of the AND gate AND17, a second inverted input terminal of the NOR gate NOR18, a first input terminal of an AND gate AND9, and a first inverted input terminal of a NOR gate NOR20, and also the sixth bit data D6 thereof are inputted to a second input terminal of the AND gate AND19, a second inverted input terminal of the NOR gate NOR20, a first input terminal of an AND gate AND21, and a first inverted input terminal of a NOR gate NOR22. Furthermore, the seventh bit data D7 thereof are inputted to a second input terminal of the AND gate AND21, and a second inverted input terminal of the NOR gate NOR22.

Signals outputted from the AND gates AND11 to AND21 and the NOR gates NOR12 to NOR22 are inputted to respective input terminals A1 to A6 and B1 to B6 of the selector SE11, respectively. In response to the white and black selection signal SEL1 having the low level, in order to count the adjacency number of the black pixels which are the smaller pixels, the selector SE11 selects the data inputted to the respective input terminals A1 to A6, and outputs the LSB of 3 bits of the selected data from respective output terminals Y1 to Y3 to respective input terminals of the logic A circuit LA-11, and outputs the MSB of 3 bits thereof from respective output terminals Y4 to Y6 to respective input terminals of the logic A circuit LA-12. On the other hand, in response to the white and black selection signal SEL1 having the high level, in order to count the adjacency number of the white pixels which are the smaller pixels, the selector SE11 selects the data inputted to the respective input terminals B1 to B6, and outputs the LSB of 3 bits of the selected data from respective output terminals Y1 to Y3 to respective input terminals of the logic A circuit LA-11, and outputs the MSB of 3 bits thereof from respective output terminals Y4 to Y6 to respective input terminals of the logic A circuit LA-12. The data each of 2 bits outputted from the respective logic A circuit LA-11 and LA-12 are inputted to the adder AD57, and are added to each other by the adder AD57, and then, the data of addition result thereof are inputted as the adjacency number count value in the main scan and subscan directions.

FIG. 15 shows the second calculation section 105b of the adjacent state judgment section 105, which is provided for counting a number of black pixels within the 3×window having the pixel data D310 in the center thereof.

Referring to FIG. 15, the three data D209 to D211 continuously aligned in the main scan direction are inputted to a logic A circuit LA-13, a number of black pixels of the inputted data are counted by the logic A circuit LA-13, and then, data of the count value thereof are outputted to an adder AD58. Further, the three data D309 to D311 continuously aligned in the main scan direction are inputted to a logic A circuit LA-14, a number of black pixels of the inputted data are counted by the logic A circuit LA-14, and then, data of the count value thereof are outputted to an adder AD58. Furthermore, the three data D409 to D411 continuously aligned in the main scan direction are inputted to a logic A circuit LA-15, a number of black pixels of the inputted data are counted by the logic A circuit LA-15, and then, data of the count value thereof are outputted to an adder AD59. Respective data of the count values counted by the respective logic A circuits LA-13 to LA-15 are added to each other by the adders AD58 and AD59, and then, data of the addition result thereof are outputted from the adder AD59 to the third calculation section 105c shown in FIG. 16, as 3×3 black pixel number data.

FIG. 16 shows the third calculation section 105c of the adjacent state judgment section 105.

Referring to FIG. 16, the 3×3 black pixel number data are inputted to respective input terminals B of comparators 150 and 151. On the other hand, data of zero are inputted to an input terminal A of the comparator 150, and data of nine are inputted to an input terminal A of the comparator 151. Only when A=B, the comparator 150 outputs a high level signal to a first input terminal of an AND gate 158. Otherwise, the comparator 150 outputs a low level signal thereto, similarly. Further, only when A=B, the comparator 151 outputs a high level signal to a first input terminal of an AND gate 159. Otherwise, the comparator 151 outputs a low level signal thereto, similarly.

The first data of the 7×7 black pixel number outputted from the third calculation section 106c of the dither judgment section 106 are inputted to not only respective input terminals B of comparators 152 to 155 but also an address terminal of a table ROM 156 for storing a threshold value table for judging whether the image within the predetermined area is included in the half-tone image area or the non-half-tone image area. Threshold value data TJ0 described in detail later are inputted to an input terminal A of the comparator 152, and data of (49-TJ0) are inputted to an input terminal A of the comparator 153. When A>B, the comparator 152 outputs a high level signal to an second input terminal of the AND gate 158. Otherwise, the comparator 152 outputs a low level signal thereto, similarly. Further, when A<B, the comparator 153 outputs a high level signal to a second input terminal of the AND gate 159. Otherwise, the comparator 153 outputs a low level signal thereto, similarly. Respective output signals outputted from the AND gates 158 and 159 are inputted to a NOR gate 160, and an output signal from the NOR gate 160 is inputted to respective input terminals of AND gates 162 and 163.

Data of zero are inputted to an input terminal A of the comparator 154, and data of 49 are inputted to an input terminal A of the comparator 155. When A=B, the comparator 154 outputs a high level signal to a first input terminal of an OR gate 161. Otherwise, the comparator 154 outputs a low level signal thereto, similarly. Further, when A=B, the comparator 155 outputs a high level signal to a second input terminal of the OR gate 161. Otherwise, the comparator 155 outputs a low level signal thereto, similarly. The OR gate 161 outputs a signal of a logical sum of the inputted signals to the 5×11 matrix memory 107, as the all white or all black image detection signal representing that all the pixels within the 7×7 window are white pixel or black pixels.

The threshold value data outputted from the table ROM 156 are inputted to an input terminal A of a comparator 157. On the other hand, data of the adjacent number in the main scan and subscan directions are inputted to an input terminal B of the comparator 157. The comparator 157 is provided for judging whether the image within the 7×7 window is the half-tone image or the non-half-tone image, as described above with reference to FIG. 36. When A>B, the comparator 157 outputs a high level signal to a second input terminal of the AND gate 162. On the other hand, when A<B, the comparator 157 outputs a low level signal thereto, similarly. Further, a signal from the AND gate 162 is outputted to the 5×11 matrix memory 107 as a half-tone image detection signal. Further, a signal from the AND gate 163 is outputted to the 5×11 matrix memory 107, as a non-half-tone image detection signal.

In the third calculation section 105c, based on not only the threshold value data outputted from the table ROM 156 based on the first data of the black pixel number within the 7×7 window but also the counted adjacent number in the main scan and subscan directions, it is judged by the comparator 157 whether the image within the area of the above-mentioned window is the half-tone image or the non-half-tone image. However, in the following two cases, the judgment result is set to "indefiniteness" which represents that the image within the area of the window is not the half-tone image and is not the non-half-tone image:

(a) when the adjacent number in the main scan and subscan directions is equal to the threshold value data, or when the comparator 157 judges that A=B; and (b) when the number of the smaller pixels within the 7×7 window is smaller than the predetermined threshold value TJ0 (either one of such a case that the output signal of the comparator 152 has the high level and such a case that the output signal of the comparator 153 has the high level), and there is no pixel of the same kind as that of the smaller pixels within the 3×3 window having the specified pixel in the center thereof (either one of such a case that the output signal of the comparator 150 has the high level and such a case that the output signal of the comparator 151 has the high level).

In order to set the "indefiniteness" in the above-mentioned case (a), the circuit of the third calculation section 105c is constituted so that the high level signals are not inputted from the comparator 157 to the AND gates 162 and 163. Further, in order to set the "indefiniteness" in the above-mentioned case (b), the low active signal outputted from the NOR gate 160 is inputted to the AND gates 162 and 163.

Figure 45:
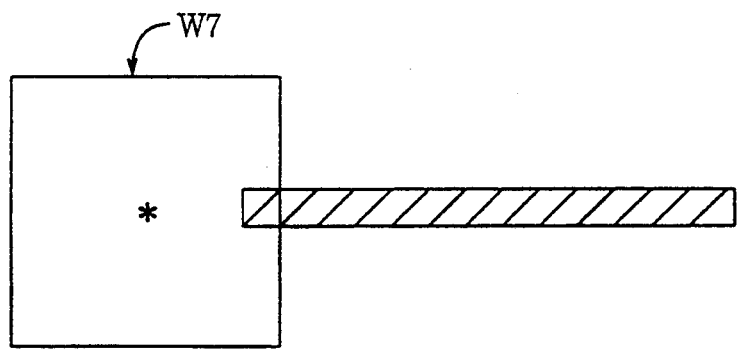
FIG. 45 is a front view showing one example of a case where a line-shaped non-half-tone image reaches a 7×7 window W7.
Figure 46:
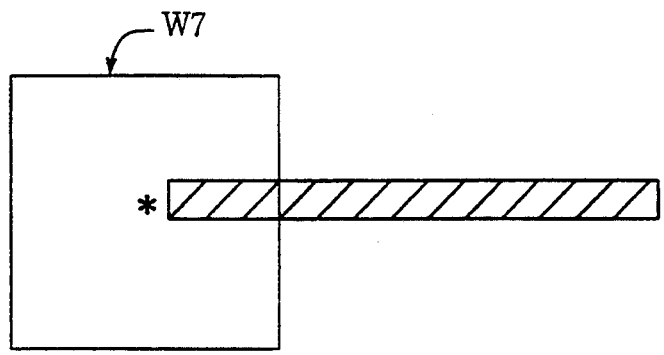
FIG. 46 is a front view showing another example of a case where another line-shaped non-half-tone image reaches a 7×7 window W7.

The reasons why the "indefiniteness" is set in the above-mentioned case (b) are as follows with reference to FIGS. 45 and 46, each of which shows one example in such a case that a line-shaped non-half-tone image reaches a 7×7 window W7. In such a state shown in FIG. 45, since only the end of the line-shaped image enters the window W7, the line-shaped image can not be distinguished from an isolated point. If it is judged whether the image within the area is the half-tone image or the non-half-tone image, it is erroneously judged that it is the half-tone image. In order to the above problem, as shown in FIG. 46, it is the better way to set the judgment result to the "indefiniteness" until the line-shaped image reaches the peripheral area of the specified pixel * so as to become a predetermined distance therebetween. Therefore, the judgment of this condition is performed by judging whether or not there is at least one pixel of the same kind as that of the smaller pixels, within the 3×3 window W3. In this case, of course, it is judged that the number of smaller pixels is smaller than the above-mentioned threshold value TJ0, simultaneously.

Further, in the third calculation section 105c, it is judged by the comparators 154 and 155 whether all the pixels within the 7×7 window W7 are white pixels or black pixels. In such a case, the all white or all black detection signal is set to the high level. The white or all black detection signal is used for judging whether or not the image within the predetermined area is the Fattening type dither image in the judgment data signal generator 114.

Figure 44:
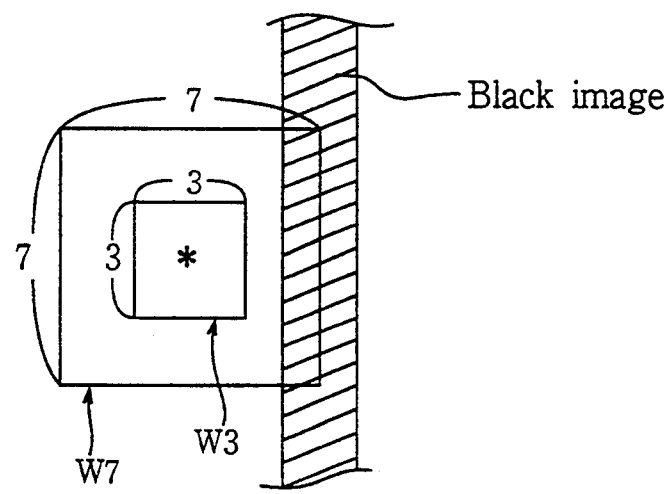
FIG. 44 is a front view showing one example of a case where no smaller pixel is in the periphery of a specified pixel and there are a relatively large number of smaller pixels within a window for judging the adjacency.

Furthermore, the reasons why the threshold value TJ0 is provided in the third calculation section 105c are as follows. For example, as shown in FIG. 44, when there is no pixel of the same kind as that of the smaller pixels in the periphery of the specified pixel, and there is a relatively larger number of smaller pixels within the 7×7 window W7 for the adjacent judgment, it is considered that it can be judged whether the image within the predetermined area is the half-tone image or the non-half-tone image. In the case of FIG. 44, there are seven smaller pixels within the 7×7 window W7 for the adjacent judgment, and then, it is judged that, of course, it is the non-half-tone image. Therefore, it is used as a condition of the "indefiniteness" in the judgment, such a condition that (the number of the smaller pixels within the 7×7 window W7<TJ0) and (there is no pixel of the same kind as that of the smaller pixels within the 3×3 window W3). This condition is satisfied in either one of the following two cases:

(a) the smaller pixels are white pixels and each of the output signals from the comparators 150 and 152 has the high level; and (b) the smaller pixels are black pixels and each of the output signals from the comparators 151 and 153 has the high level.

In the present preferred embodiment, the abovementioned threshold value TJ0 is preferably set to six.

(5-4) 5×11 Matrix Memory

FIG. 17 shows the 5×11 matrix memory 107 shown in FIG. 3. Referring to FIG. 17, the 5×11 matrix memory 107 comprises:

(a) four FIFO memories DM11 to DM14 each delaying the judgment data of five bits composed of the following five detection signals inputted in synchronous with the clock CLK having the same period as that of the transfer clock for the binary image data inputted from the page memory 61 or as that of one dot of the image data after being detected every pixel, by one horizontal scanning interval which is one scanning time in the main scan direction, and outputting them; and (b) 50 delay type flip-flops DG301 to DG310, DG401 to DG410, DG501 to DG510, ..., and DG701 to DG710 each delaying the judgment data of five bits inputted in synchronous with the clock CLK by one period of the clock CLK, and outputting them. In respective circuits of the matrix memory 107, the following judgment data of five bits are processed in parallel:

(a) the Fattening type first dither detection signal (referred to as judgment data A hereinafter) outputted from the sixth calculation section 106f of the dither judgment section 106 shown in FIG. 11;

(b) the Fattening type second dither detection signal (referred to as judgment data B hereinafter) outputted from the seventh calculation section 106g of the dither judgment section 106 shown in FIG. 12;

(c) the half-tone image detection signal (referred to as judgment data C hereinafter) outputted from the third calculation section 105c of the adjacent state judgment section 105 shown in FIG. 16;

(d) the non-half-tone image detection signal (referred to as judgment data D hereinafter) outputted from the third calculation section 105c of the adjacent state judgment section 105 shown in FIG. 16; and (e) the all white or all black image detection signal (referred to as judgment data E hereinafter) outputted from the third calculation section 105c of the adjacent state judgment section 105 shown in FIG. 16.

After the judgment data A to E of five bits outputted from the above-mentioned calculation sections in serial in a direction from the first pixel of the image of each page to the last pixel thereof are inputted to the flip-flop DG301, the inputted judgment data A to E are outputted through the ten flip-flops DG301 to DG310 connected in series with each other. Also, after the judgment data A to E of five bits are inputted to the FIFO memory DM11, they are outputted through the four FIFO memories DM11 to DM14 connected in series with each other. After the judgment data A to E outputted from the FIFO memory DM11 are inputted to the flip-flop DG401, they are outputted through the flip-flops DG401 to DG410 connected in series with each other. Further, after the judgment data A to E outputted from the FIFO memory DM12 are inputted to the flip-flop DG501, they are outputted through the flip-flops DG501 to DG510 connected in series with each other. In a manner similar to that of above, the judgment data A to E of five bits outputted from the respective FIFO memories DM13 and DM14 are inputted to the flip-flops DG601 to DG701, respectively, they are outputted through the flip-flops DG601 to DG610 and DG701 to DG710 respectively connected in series with each other.

In the 5×11 matrix memory 107 constituted as described above, the judgment data A to E of five bits corresponding to the pixel data of one dot are outputted from the flip-flop DG710, and the judgment data A to E then inputted are outputted as judgment data J300. At the same time, respective judgment data J300 to J310 corresponding to the respective pixel data on the main scanning line of i=3 within the 5×11 window are outputted from the respective flip-flops DG301 to DG310, respectively, respective judgment data J400 to J410 corresponding to the respective pixel data on the main scanning line of i=4 within the 5×11 window are outputted from the FIFO memory DM11 and the respective flip-flops DG401 to DG410, respectively, and respective judgment data J500 to J510 corresponding to the respective pixel data on the main scanning line of i=5 within the 5×11 window are outputted from the FIFO memory DM12 and the respective flip-flops DG501 to DG510, respectively. In a manner similar to that of above, respective judgment data J600 to J610 and J700 to J710 are outputted from the respective FIFO memories DM13 and DM14 and the respective flip-flops DG601 to DG710.

Figure 18:
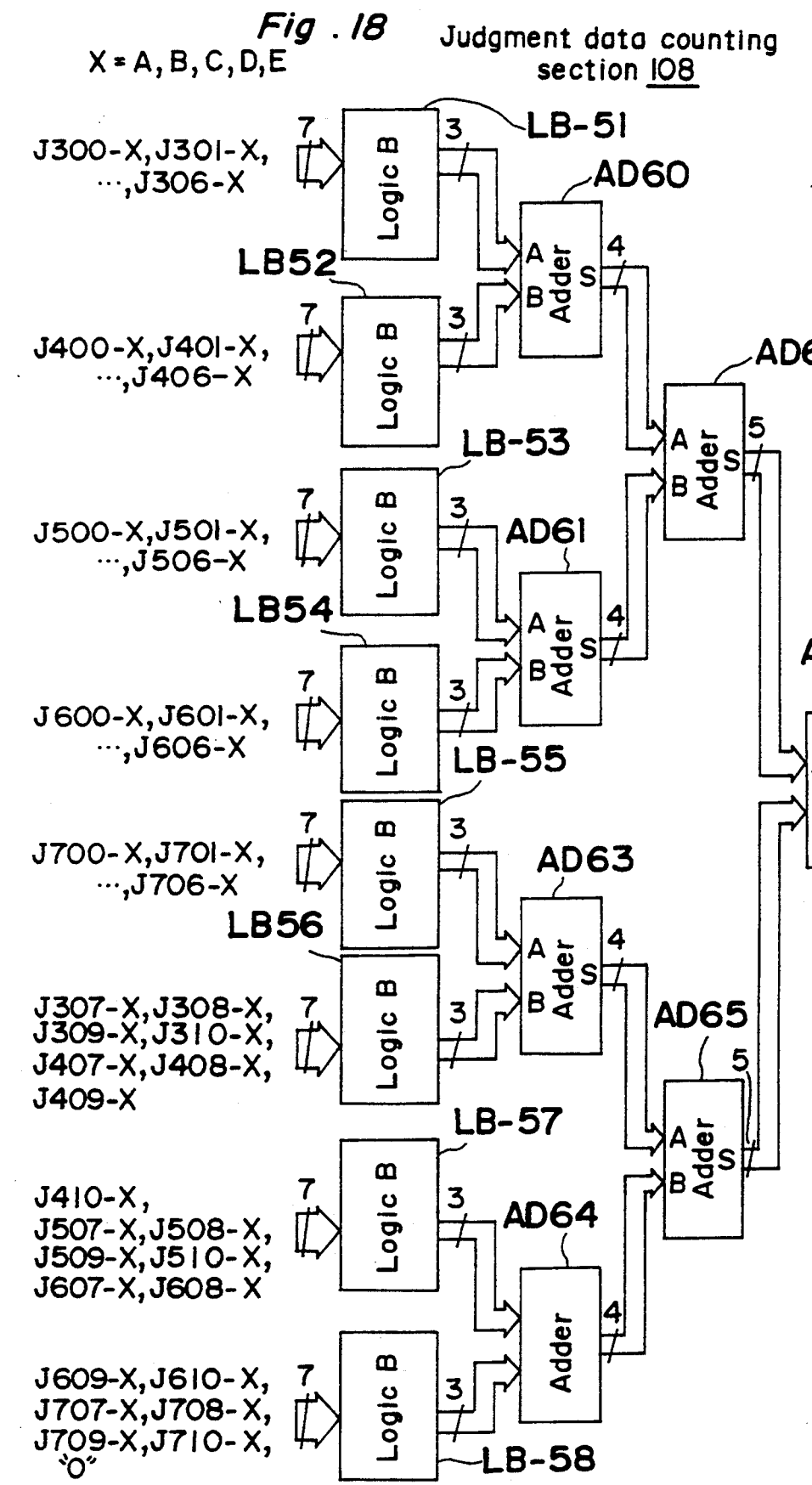
FIG. 18 is a schematic block diagram showing a judgment data counting section shown in FIG. 3.

Accordingly, as shown in FIG. 47, the judgment data A to E of five bits per one pixel corresponding to each pixel (i=3, 4, ..., 7; j=0, 1, 2, ..., 10) located within the 5×11 window are simultaneously outputted from the matrix memory 107 to the judgment data counting section 108 shown in FIG. 18.

(5-5) Judgment Data Generator

FIG. 18 shows the judgment data counting section 108 shown in FIG. 3. In the present preferred embodiment, the five circuits each shown in FIG. 18 are provided corresponding to the judgment data A to E of five bits. In FIG. 18, X=A, B, C, D and E of the judgment data A to E. For example, the judgment data J300 of five bits are represented by J300-X (X=A, B, C, D and E).

Referring to FIG. 18, each of the judgment data A to E outputted from the matrix memory 107 are inputted to eight logic B circuits LB-51 to LB-58, and then, a number of high level signals of "1" inputted to each of the circuits LB-51 to LB-58 is counted by seven bits of each of the judgment data A to E. Data of the count value thereof counted by the circuits LB-51 to LB-58 are added to each other by adders AD60 to AD66, and then, data of the addition result thereof are outputted as a counted value JS-X (X=A, B, C, D and E) of the judgment data. Therefore, each of the judgment data A to E are added to each other within the window shown in FIG. 47, and then, data of the addition result thereof are outputted as the count value JS-X of the judgment data. The count values JS-X (X=A, B, C, D and E) of the judgment data represents the following data corresponding to the above-mentioned judgment data A to E, and these five data are outputted to the judgment data signal generator 114:

(a) the count value JS-A within the window shown in FIG. 47 counted based on the judgment data A, which represents a number of detected pixels of the Fattening type first dither image, and is referred to as a Fattening type first dither image detected pixel number JS-A hereinafter;

(b) the count value JS-B within the window shown in FIG. 47 counted based on the judgment data B, which represents a number of detected pixels of the Fattening type second dither image, and is referred to as a Fattening type second dither image detected pixel number JS-B hereinafter;

(c) the count value JS-C within the window shown in FIG. 47 counted based on the judgment data C, which represents a number of detected pixels of the half-tone image, and is referred to as a half-tone image detected pixel number JS-C hereinafter;

(d) the count value JS-D within the window shown in FIG. 47 counted based on the judgment data D, which represents a number of detected pixels of the non-half-tone image, and is referred to as a non-half-tone image detected pixel number JS-D hereinafter; and (e) the count value JS-E within the window shown in FIG. 47 counted based on the judgment data E, which represents a number of detected pixels of the all white or all black image, and is referred to as an all white or all black image detected pixel number JS-E hereinafter.

(5-6) Judgment Data Signal Generator

Figure 19:
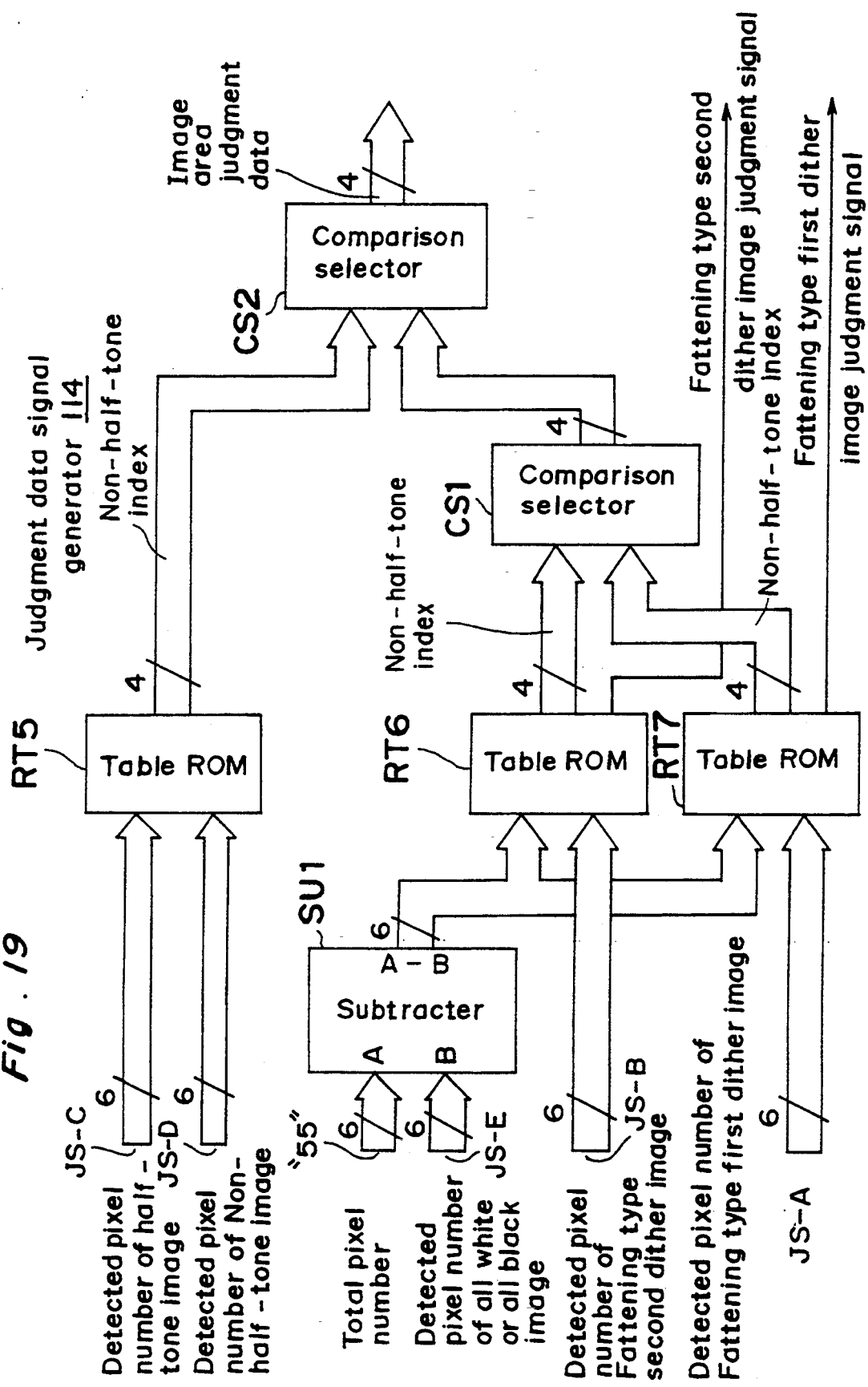
FIG. 19 is a schematic block diagram showing a judgment data signal generator shown in FIG. 3.

FIG. 19 shows the judgment data signal generator 114 shown in FIG. 3.

Referring to FIG. 19, data of the Fattening type first dither detected pixel number JS-A are inputted to a first address terminal of a table ROM RT7 for judging that the image within the predetermined area is the Fattening type first dither image and generating and outputting data of a non-half-tone index and a judgment signal of the Fattening type first dither image, and data of the Fattening type second dither detected pixel number JS-B are inputted to a first address terminal of a table ROM RT6 for judging that the image within the predetermined area is the Fattening type second dither image and generating and outputting data of a non-half-tone index and a judgment signal of the Fattening type second dither image. Further, data of the half-tone image detected pixel number JS-C are inputted to a first address terminal of a table ROM RT5 for generating and outputting data of a non-half-tone index of the Bayer type half-tone image, and data of the non-half-tone image detected pixel number JS-D are inputted to a second address terminal of the table ROM RT5. Furthermore, data of 55 representing the number of all the pixels within the window 5×11 used for the area judgment are inputted to an input terminal A of a subtracter SU1, and data of the all white or all black image detected pixel number JS-E are inputted to an input terminal B of the subtracter SU1. The subtracter SU1 subtracts data inputted to the input terminal B from data inputted to the input terminal A, and outputs data of the subtraction result thereof to respective second address terminals of the table ROMs RT6 and RT7.

Figure 48:
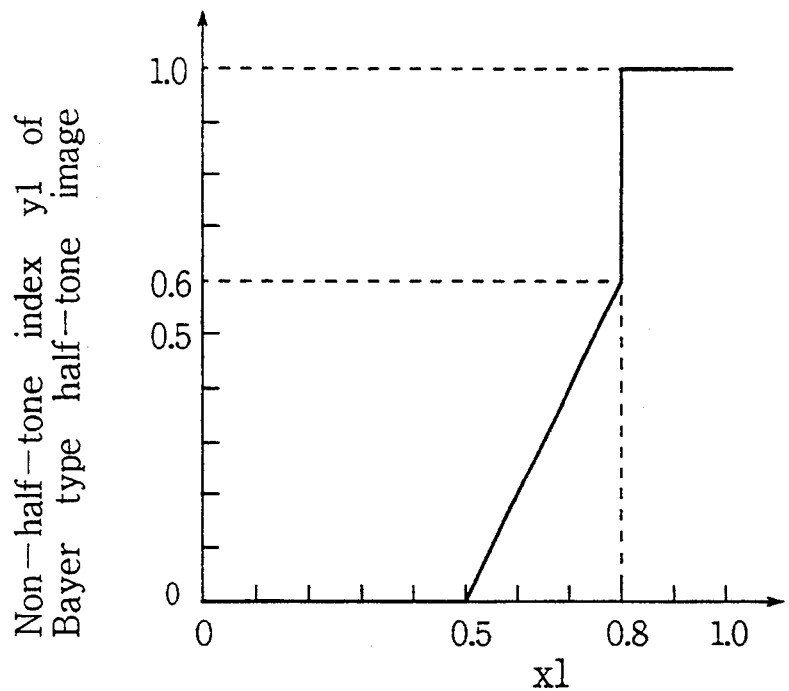
FIG. 48 is a graph showing a non-half-tone index of a Bayer type half-tone image which is stored in a table ROM of the judgment data signal generator shown in FIG. 3.
Figure 49:
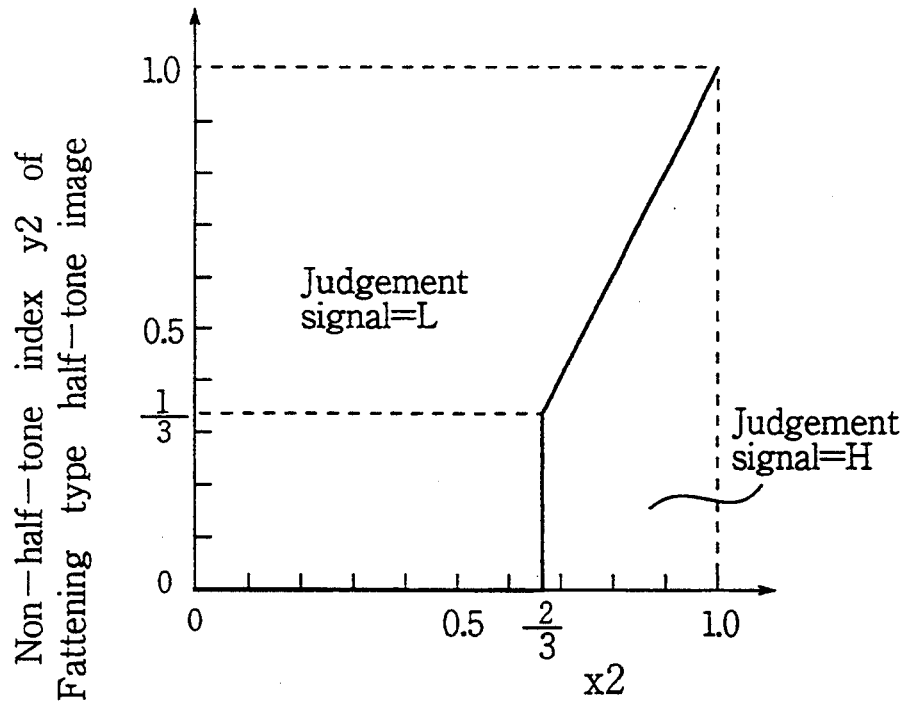
FIG. 49 is a graph showing a non-half-tone index of a Fattening type half-tone image which is stored in another table ROM of the judgment data signal generator shown in FIG. 3.

FIG. 48 is a graph of a non-half-tone image index of the Bayer type half-tone image, data of which are stored in the table ROM RT5, and FIG. 49 is a graph of a non-half-tone image index of the Fattening type half-tone image, data of which are stored in the table ROMs RT6 and RT7, respectively. Data x1 and x2 of the horizontal axes of the graphs shown in FIGS. 48 and 49 are represented by the following equations (4), (5a) and (5b):

$$x1 = \text{(Non-half-tone image detected pixel number)}/ \quad (4)$$

$$\{\text{(Non-half-tone image detected pixel number)} +$$

$$\text{(Half-tone image detected pixel number)}\},$$

$$x2 = \text{(Fattening type first dither image detected pixel number)}/ \quad (5a)$$

$$\{\text{(Number of all the pixels)} - \text{(All white or all black image}$$

$$\text{detected pixel number)}\}.$$

$$x2 = \text{(Fattening type second dither image detected pixel} \quad (5b)$$
$$\text{number)}/$$

$$\{\text{(Number of all the pixels)} -$$

$$\text{(All white or all black image detected pixel number)}\}.$$

The denominator of the data x2 is calculated by the subtracter SU1.

As is apparent from FIG. 48, the non-half-tone index y1 representing the degree of the non-half-tone image of the Bayer type half-tone image has the following value depending on the data x1:

$$y1=0, \text{ for } 0 \leq x1 \leq 0.5; \quad (a)$$

$$y1=2 \times x1-1, \text{ for } 0.5 < x1 \leq 0.8; \quad (b)$$

and $$y1=1, \text{ for } x1>0.8. \quad (c)$$

Further, as is apparent from FIG. 49, the non-half-tone index y2 representing the degree of the non-half-tone image of the Fattening type half-tone image has the following value depending on the data x2:

$$y2=0, \text{ for } 0 \leq x2 \leq \tfrac{2}{3}; \quad (a)$$

$$y2=2 \times x2-1, \text{ for } x2 > \tfrac{2}{3}. \quad (b)$$

As shown in the graph shown in FIG. 49, when $x2 > \tfrac{2}{3}$, it is judged that the Fattening first and second dither images are detected, and then, the Fattening type first dither image judgment signal of the high level and the Fattening type second dither image judgment signal of the high level are outputted from the table ROMs RT7 and RT6, respectively. On the other hand, when $x2 \leq \tfrac{2}{3}$, it is judged that the Fattening first and second dither images are not detected, and then, the Fattening type first dither image judgment signal of the low level and the Fattening type second dither image judgment signal of the low level are outputted from the table ROMs RT7 and RT6, respectively. For a convenience of the explanation, the value of each of the non-half-tone indexes y1 and y2 is in the range from zero to one, however, each of them is represented by data of four bits.

Based on the data JS-C and JS-D inputted to the address terminal, the table ROM RT5 generates and outputs the non-half-tone index of the Bayer type half-tone image using the stored table, to a first input terminal of a comparison selector CS2. Further, based on the data JS-A and the output data from the subtracter SU1 inputted to the address terminal, the table ROM RT7 generates and outputs the non-half-tone index of the Fattening type half-tone image using the stored table, to a first input terminal of a comparison selector CS1, and also generates and outputs the Fattening type first dither image judgment signal to the recovered data calculation section 112 shown in FIG. 28. Furthermore, based on the data JS-B and the output data from the subtracter SU1 inputted to the address terminal, the table ROM RT6 generates and outputs the non-half-tone index of the Fattening type half-tone image using the stored table, to a second input terminal of the comparison selector CS1, and also generates and outputs the Fattening type second dither image judgment signal to the recovered data calculation section 112 shown in FIG. 28.

The comparison selector CS1 selects the maximum data among the inputted data of the half-tone indexes, and outputs the selected data to a second input terminal of the comparison selector CS2. Further, the comparison selector CS2 selects the maximum data among the inputted data of the half-tone indexes, and outputs the selected data as the area judgment data to the data mixing section 104 shown in FIG. 3.

(6) Half-tone Image Recovery Section (6-1) Composition and Action of Respective Sections The half-tone image recovery section 101 shown in FIG. 3 comprises the black pixel within the window counting section 113, the edge area judgment section 109, the smoothed value calculation section 110, the edge emphasis amount calculation section 111, and the recovered data calculation section 112. The features of the actions of the respective calculation sections 109 to 113 will be described.

In the smoothed amount calculation section 110, either one of the spatial filter F11 having the 7×7 window W7 shown in FIG. 50 and the spatial filter F12 having the 9×9 window W9 shown in FIG. 51 is used by selecting or switching over one of them, according to the Fattening type second dither image judgment signal, as described in detail later. As is apparent from both of the spatial filter F11 shown in FIG. 50 and the spatial filter F12 shown in FIG. 51, a weighting coefficient for each pixel within the window W7 or W9 is set to one. Because the image to be recovered in the apparatus of the present preferred embodiment is a pseudo half-tone image binarized by an area gradation method.

Figures 52, 53, 54:
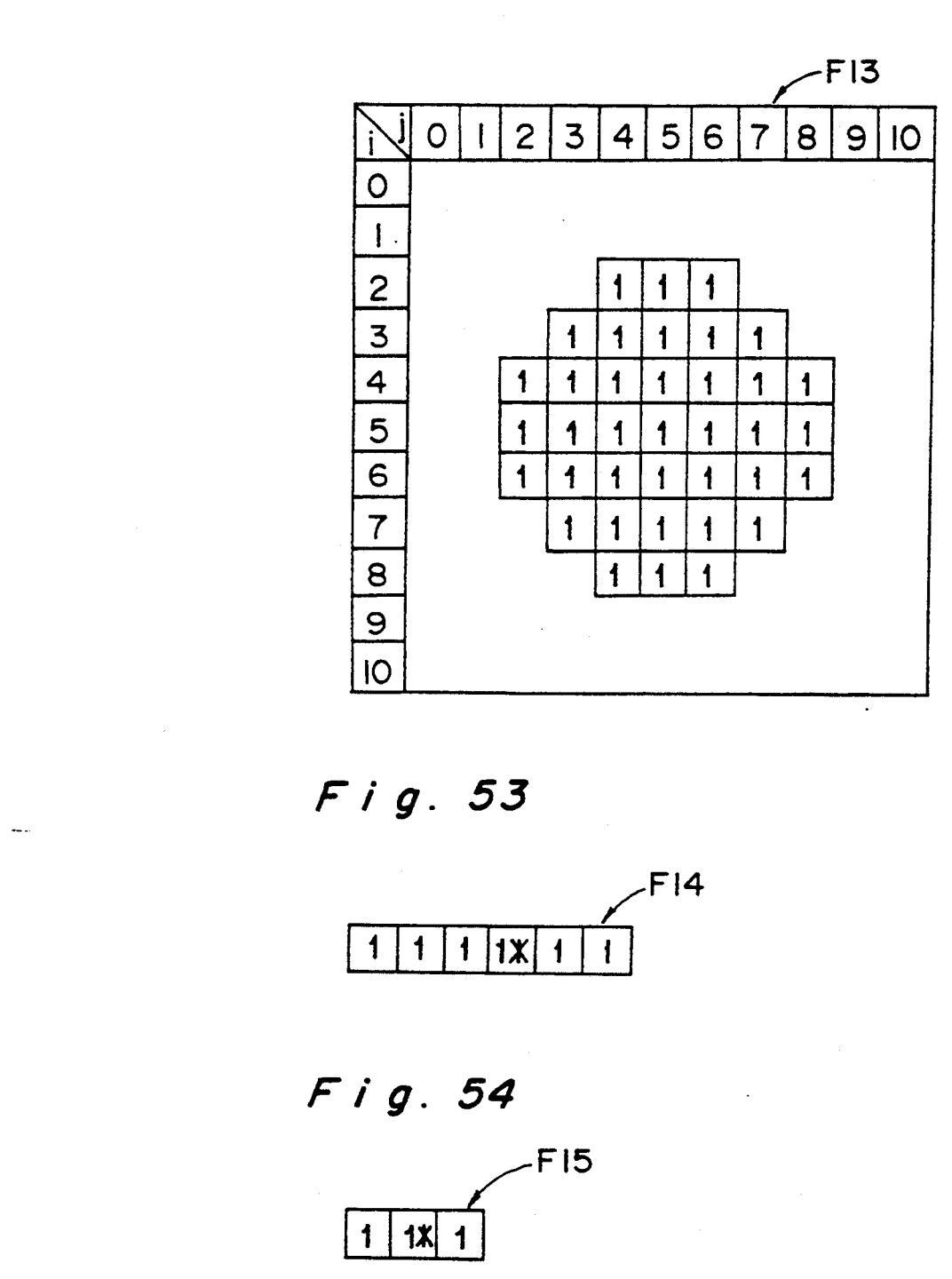

In the present preferred embodiment, each of the windows for calculating the smoothed values has a shape of a square, however, the present invention is not limited to this. As shown in FIG. 52, there may be used the spatial filter F13 having a window where the outer periphery edge between the specified pixel located in the center of the window becomes about a constant.

Next, there will be described a necessity of calculating the edge emphasis amount by the edge emphasis amount calculation section 111.

Figure 55:
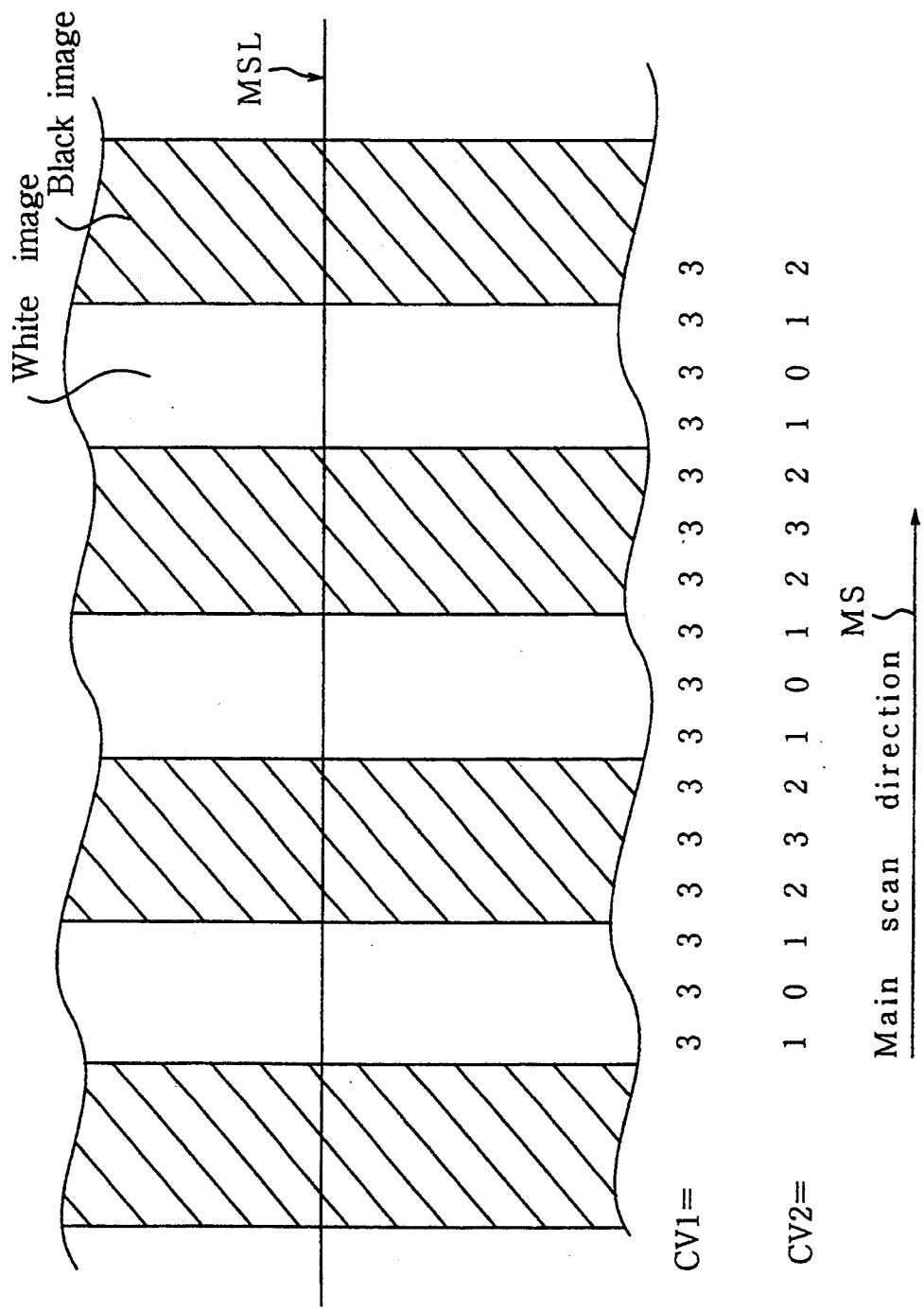
FIG. 55 is a front view showing one example of an image used for explaining a necessity for calculating an edge emphasis amount and respective calculated smoothed values in the main scan direction of the above image which are calculated using the spatial filters shown in FIGS. 53 and 54.

FIG. 55 shows an image where images are repeatedly reversed by three pixels in an order of a white image, a black image, a white image, a black image and so on, in the main scan direction MS. The spatial frequency of the image in the main scan direction MS becomes 1/6 [lp/pixel]. For example, smoothed values CV1 and CV2 respectively calculated when scanning the image shown in FIG. 55 on a scanning line MSL in the main scan direction MS, using a smoothing spatial filter F14 having a 1×6 window shown in FIG. 53 and a smoothing spatial filter F15 having a 1×3 window shown in FIG. 54 are shown in FIG. 55, respectively. As is apparent from the calculation results shown in FIG. 55, when smoothing the image shown in FIG. 55 using the spatial filter F15, the spatial frequency components thereof are maintained. On the other hand, when smoothing the image shown in FIG. 55 using the spatial filter F14, the spatial frequency components thereof are lost. Therefore, it is understood that the smoothing spatial filter having the window whose width in the scan direction is a natural number n of pixels attenuates the spatial frequency components higher than $1/(2n)$ [lp/pixel] when scanning an image using the spatial filter. It is understood from this that the spatial filters F11 and F12 shown in FIGS. 50 and 51 can not satisfactorily recover an image having spatial frequency components higher than 1/14 [lp/pixel] and an image having spatial frequency components higher than 1/18 [lp/pixel], respectively. Further, it is impossible to recover the lost spatial frequency components even though performing an edge emphasis process for the image data for which the smoothing process has been performed. Therefore, in the present preferred embodiment, in order to obtain a smoothed amount and also to recover the spatial frequency components lost by the smoothing process, there is calculated an edge emphasis amount corresponding to an edge component of an image to be processed.

FIGS. 56 to 63 show spatial filters F21 to F28 each calculating an edge emphasis amount, respectively.

The spatial filter F21 shown in FIG. 56 is provided for calculating a difference between numbers of black pixels of a pair of 3×7 windows W37a and W37b each having a width of three pixels in an edge emphasis direction parallel to the subscan direction, and the spatial filter F22 shown in FIG. 57 is provided for calculating a difference between numbers of black pixels of a pair of 3×7 windows W37a and W37c each having a width of three pixels in the edge emphasis direction parallel to the subscan direction. Further, the spatial filter F23 shown in FIG. 58 is provided for calculating a difference between numbers of black pixels of a pair of 7×3 windows W73a and W73b each having a width of three pixels in an edge emphasis direction parallel to the main scan direction, and the spatial filter F24 shown in FIG. 59 is provided for calculating a difference between numbers of black pixels of a pair of 7×3 windows W73a and W73c each having a width of three pixels in the edge emphasis direction parallel to the main scan direction.

Figure 62:
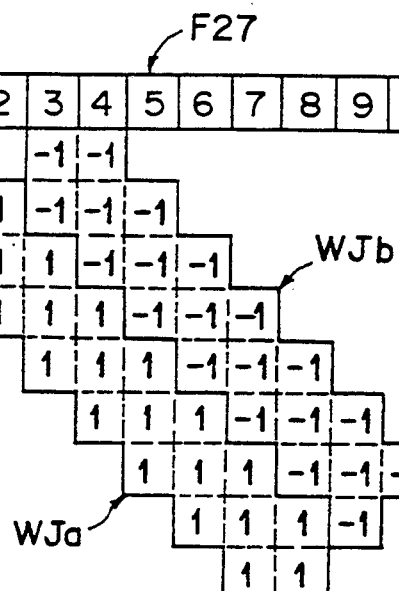
FIG. 62 is a front view showing a spatial filter F27 for calculating an edge emphasis amount which is used in the edge emphasis amount calculation section shown in FIG. 3.
Figure 63:
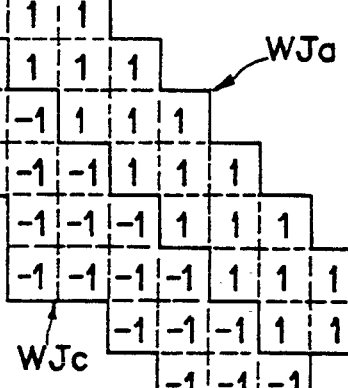
FIG. 63 is a front view showing a spatial filter F28 for calculating an edge emphasis amount which is used in the edge emphasis amount calculation section shown in FIG. 3.

Furthermore, the spatial filter F25 shown in FIG. 60 is provided for calculating a difference between numbers of black pixels of a pair of windows WIa and WIb each having a width of two pixels in an edge emphasis direction parallel to the above-mentioned second oblique direction, and the spatial filter F26 shown in FIG. 61 is provided for calculating a difference between numbers of black pixels of a pair of windows WIa and WIc each having a width of two pixels in the edge emphasis direction parallel to the second oblique direction. Further, the spatial filter F27 shown in FIG. 62 is provided for calculating a difference between numbers of black pixels of a pair of windows WJa and WJb each having a width of two pixels in an edge emphasis direction parallel to the above-mentioned first oblique direction, and the spatial filter F28 shown in FIG. 63 is provided for calculating a difference between numbers of black pixels of a pair of windows WJa and WJc each having a width of two pixels in the edge emphasis direction parallel to the first oblique direction.

Accordingly, the spatial filters F21 to F28 can calculate the edge emphasis amounts in eight directions composed of the four directions of the main scan and subscan directions and the four directions of the first and second oblique directions, from the specified pixel (i=5, j=5).

FIGS. 64 to 71 show spatial filters F31 to F38 corresponding to the above-mentioned spatial filter F21 to F28, each of the spatial filters F31 to F38 calculating an edge emphasis amount of an edge emphasis component having spatial frequency components higher than those of the spatial filters F21 to F28, respectively.

Figures 66, 67:
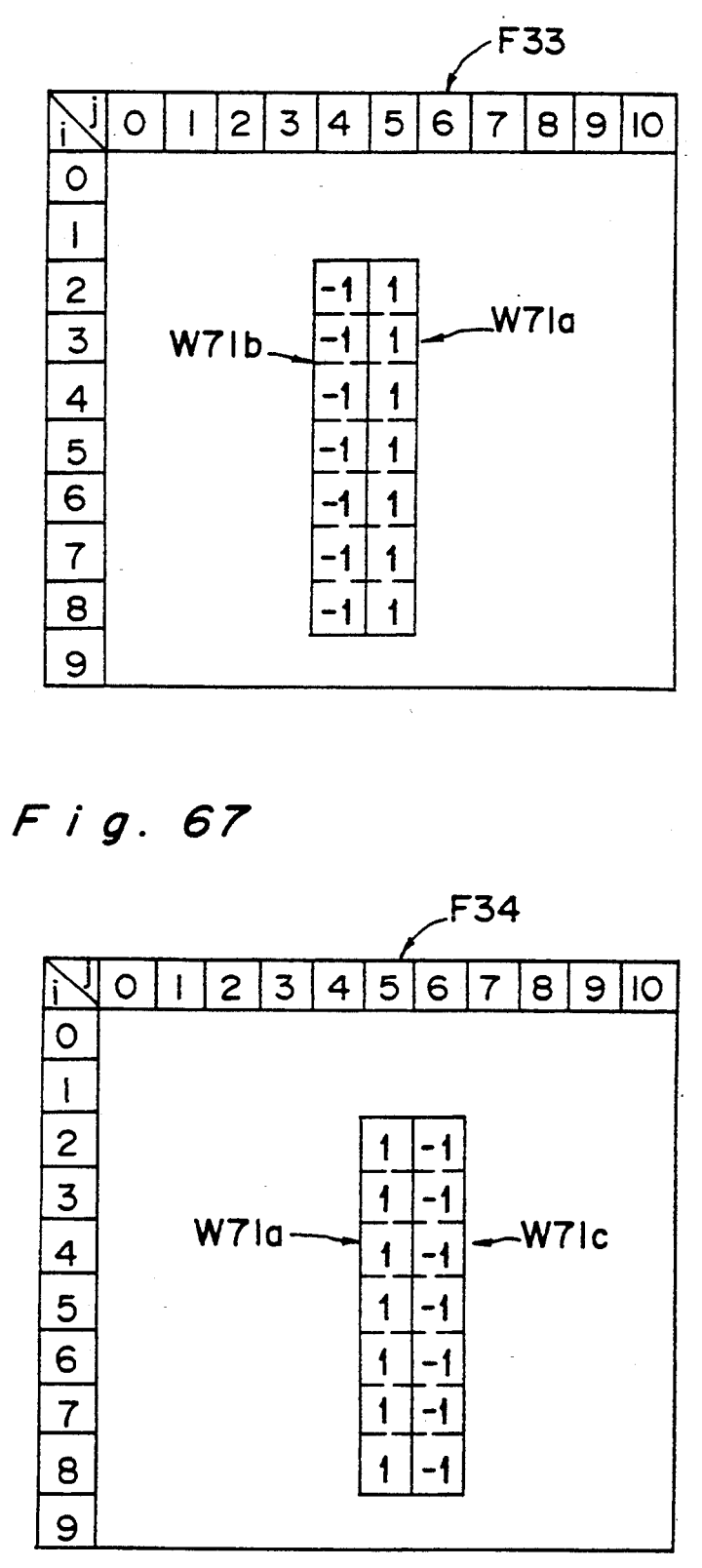

The spatial filter F31 shown in FIG. 64 is provided for calculating a difference between numbers of black pixels of a pair of 1×7 windows W17a and W17b each having a width of one pixel in an edge emphasis direction parallel to the subscan direction, and the spatial filter F32 shown in FIG. 65 is provided for calculating a difference between numbers of black pixels of a pair of 1×7 windows W17a and W17c each having a width of one pixel in the edge emphasis direction parallel to the subscan direction. Further, the spatial filter F33 shown in FIG. 66 is provided for calculating a difference between numbers of black pixels of a pair of 7×1 windows W71a and W71b each having a width of one pixel in an edge emphasis direction parallel to the main scan direction, and the spatial filter F34 shown in FIG. 67 is provided for calculating a difference between numbers of black pixels of a pair of 7×1 windows W71a and W71c each having a width of one pixel in the edge emphasis direction parallel to the main scan direction.

Figures 68, 69:
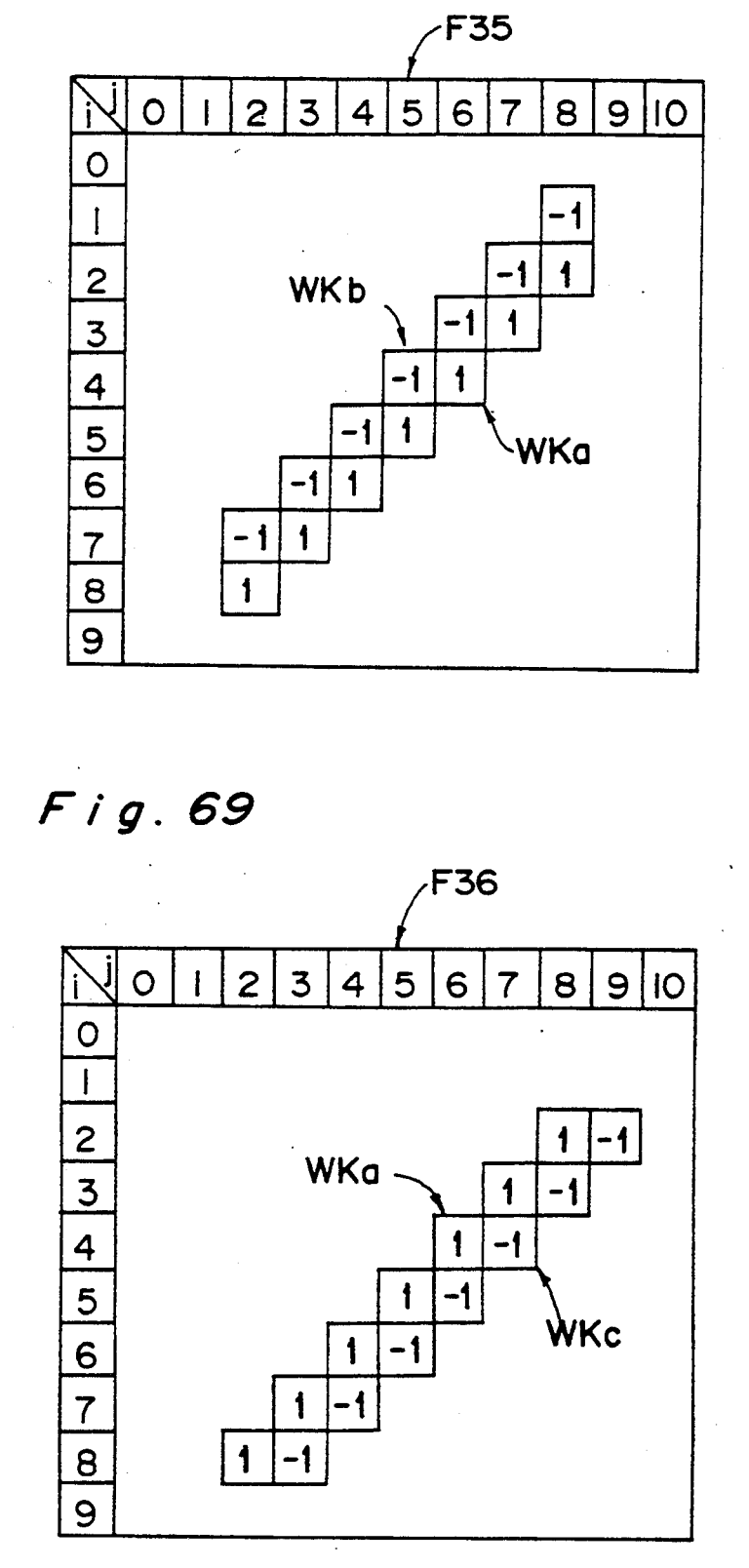

Furthermore, the spatial filter F35 shown in FIG. 68 is provided for calculating a difference between numbers of black pixels of a pair of windows WKa and WKb each having a width of one pixel in an edge emphasis direction parallel to the above-mentioned second oblique direction, and the spatial filter F36 shown in FIG. 69 is provided for calculating a difference between numbers of black pixels of a pair of windows Wka and WKc each having a width of one pixel in the edge emphasis direction parallel to the second oblique direction. Further, the spatial filter F37 shown in FIG. 70 is provided for calculating a difference between numbers of black pixels of a pair of windows WLa and WLb each having a width of one pixel in an edge emphasis direction parallel to the above-mentioned first oblique direction, and the spatial filter F38 shown in FIG. 71 is provided for calculating a difference between numbers of black pixels of a pair of windows WLa and WLc each having a width of one pixel in the edge emphasis direction parallel to the first oblique direction.

In the spatial filters F31 to F38, in order to decrease the influence caused due to a particular image pattern of the pseudo half-tone image, it is necessary to calculate an image density from a larger number of pixel data. Therefore, the width of each window is increased in a direction perpendicular to the edge emphasis direction. However, in order to prevent the above-mentioned particular image pattern of the pseudo half-tone image from being emphasized, there is provided the edge area judgment section 109, and the above-mentioned edge emphasis process is performed only for pixels which are judged that they are within an edge area.

FIGS. 72 to 75 show spatial filters F41 to F44 each calculating an edge area judgment amount used for judging an edge area.

The spatial filter F41 shown in FIG. 72 is provided for calculating a difference between numbers of black pixels of a pair of 4×7 windows W47a and W47b each having a width of four pixels in an edge emphasis direction parallel to the main scan direction, and the spatial filter F42 shown in FIG. 73 is provided for calculating a difference between numbers of black pixels of a pair of 7×4 windows W74a and W74b each having a width of four pixels in an edge emphasis direction parallel to the subscan direction. Further, the spatial filter F43 shown in FIG. 74 is provided for calculating a difference between numbers of black pixels of a pair of windows WMa and WMb each having a width of three pixels in an edge emphasis direction parallel to the second oblique direction, and the spatial filter F44 shown in FIG. 75 is provided for calculating a difference between numbers of black pixels of a pair of windows WMc and WMd each having a width of three pixels in an edge emphasis direction parallel to the first oblique direction.

In order to remove the edge emphasis amount detected by the spatial filter for the edge emphasis process, each of the windows of the spatial filters F41 to F44 each calculating the edge emphasis judgment amount is set that the width thereof in the edge emphasis direction is larger than that of each of the windows of the spatial filters for the edge emphasis processes. It is to be noted that each of the windows of the smoothing spatial filters includes each of the windows of the spatial filters for the edge emphasis processes, and also includes each of the windows of the spatial filters for the edge area judgment processes.

(6-2) Black Pixel within Window Counting Section

Figure 20:
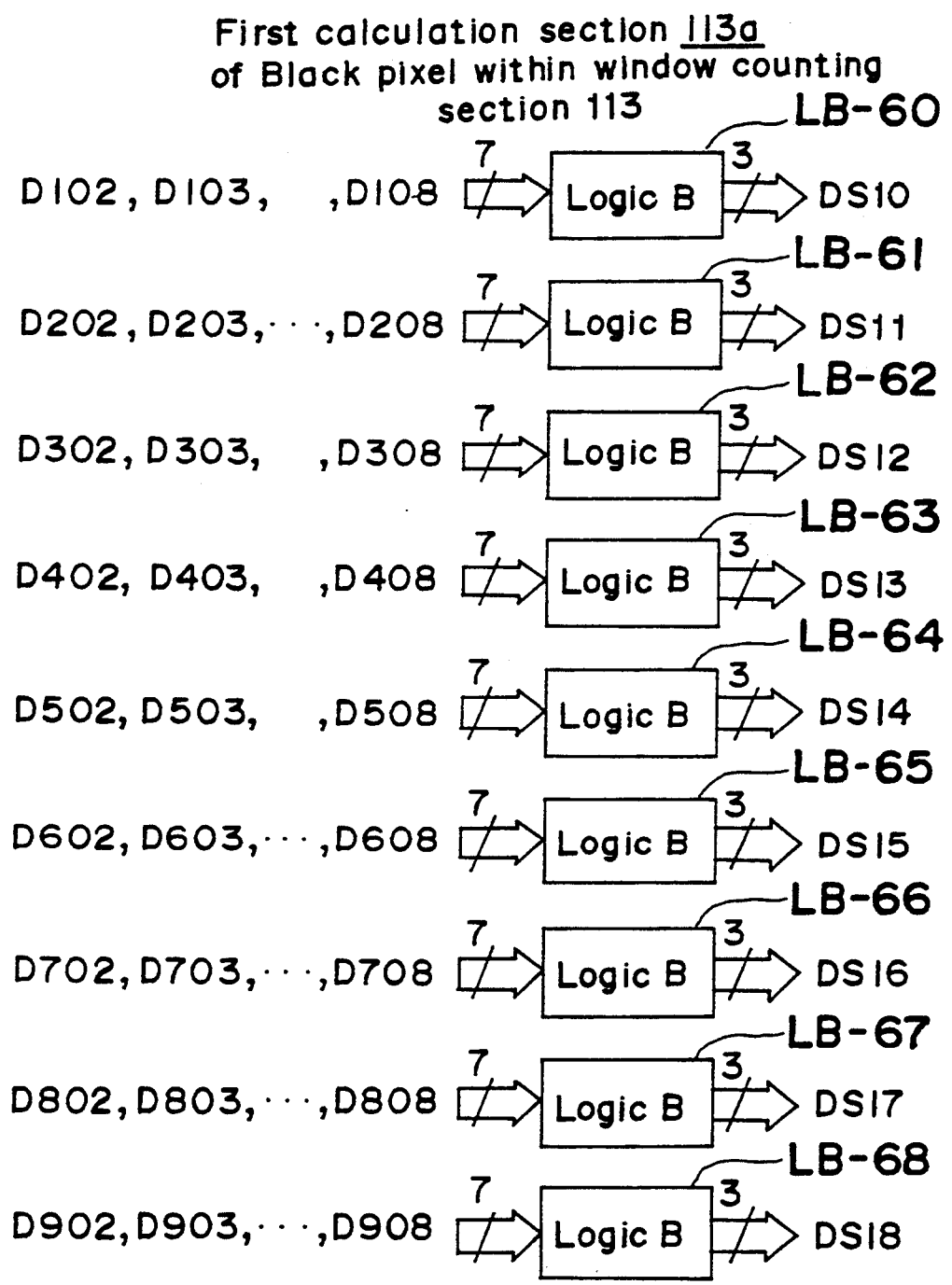
FIG. 20 is a schematic block diagram showing a first calculation section of a black pixel within window counting section shown in FIG. 3.
Figure 23:
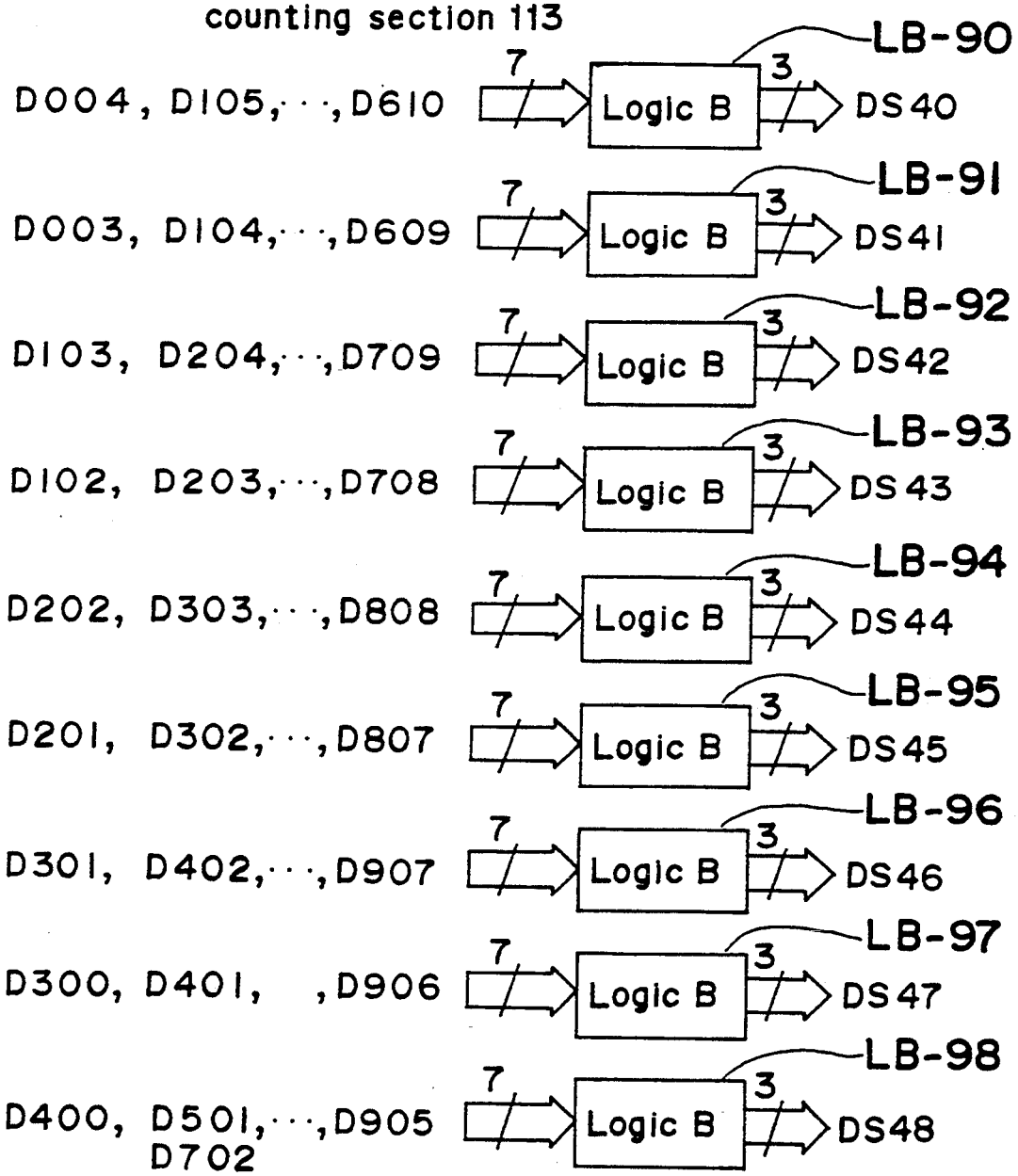
FIG. 23 is a schematic block diagram showing a fourth calculation section of the black pixel within the window counting section shown in FIG. 3.
Figure 24:
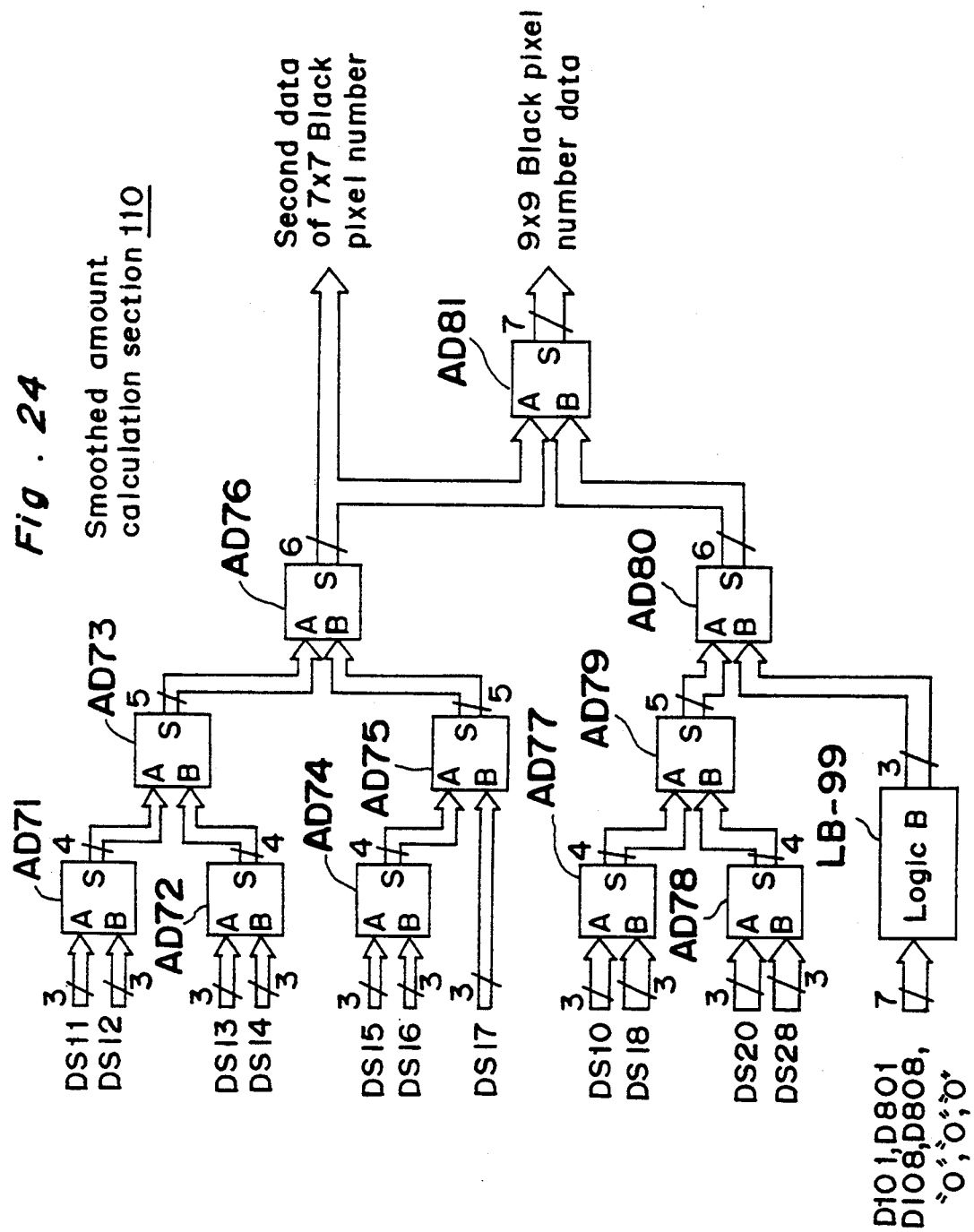
FIG. 24 is a schematic block diagram showing a smoothed amount calculation section shown in FIG. 3.

The black pixel within the window counting section 113 comprises a first calculation section 113a shown in FIG. 20, a second calculation section 113b, a third calculation section 113c shown in FIG. 23, and a fourth calculation section 113d shown in FIG. 24.

FIG. 20 shows the first calculation section 113a of the black pixel within the window counting section 113 for counting number of black pixels among each of seven pixel data continuously aligned in the main scan direction, and the first calculation section 113a comprises nine logic B circuits LB-60 to LB-68.

Referring to FIG. 20, the seven pixel data D102 to D108 continuously aligned in the main scan direction are inputted to the logic B circuit LB-60, a number of black pixels is counted based thereon, and data DS10 of the count value thereof are outputted. Further, the seven pixel data D202 to D208 continuously aligned in the main scan direction are inputted to the logic B circuit LB-61, a number of black pixels is counted based thereon, and data DS11 of the count value thereof are outputted. In a manner similar to that of above, respective seven pixel data D302 to D308, D402 to D408, . . . , and D902 to D908 continuously aligned in the main scan direction with respect to the scanning lines of i=3 to 9 are inputted to the logic B circuits LB-62 to LB-68, respective numbers of black pixels are counted based thereon, and data DS12 to DS18 of the count values thereof are outputted.

Figure 21:
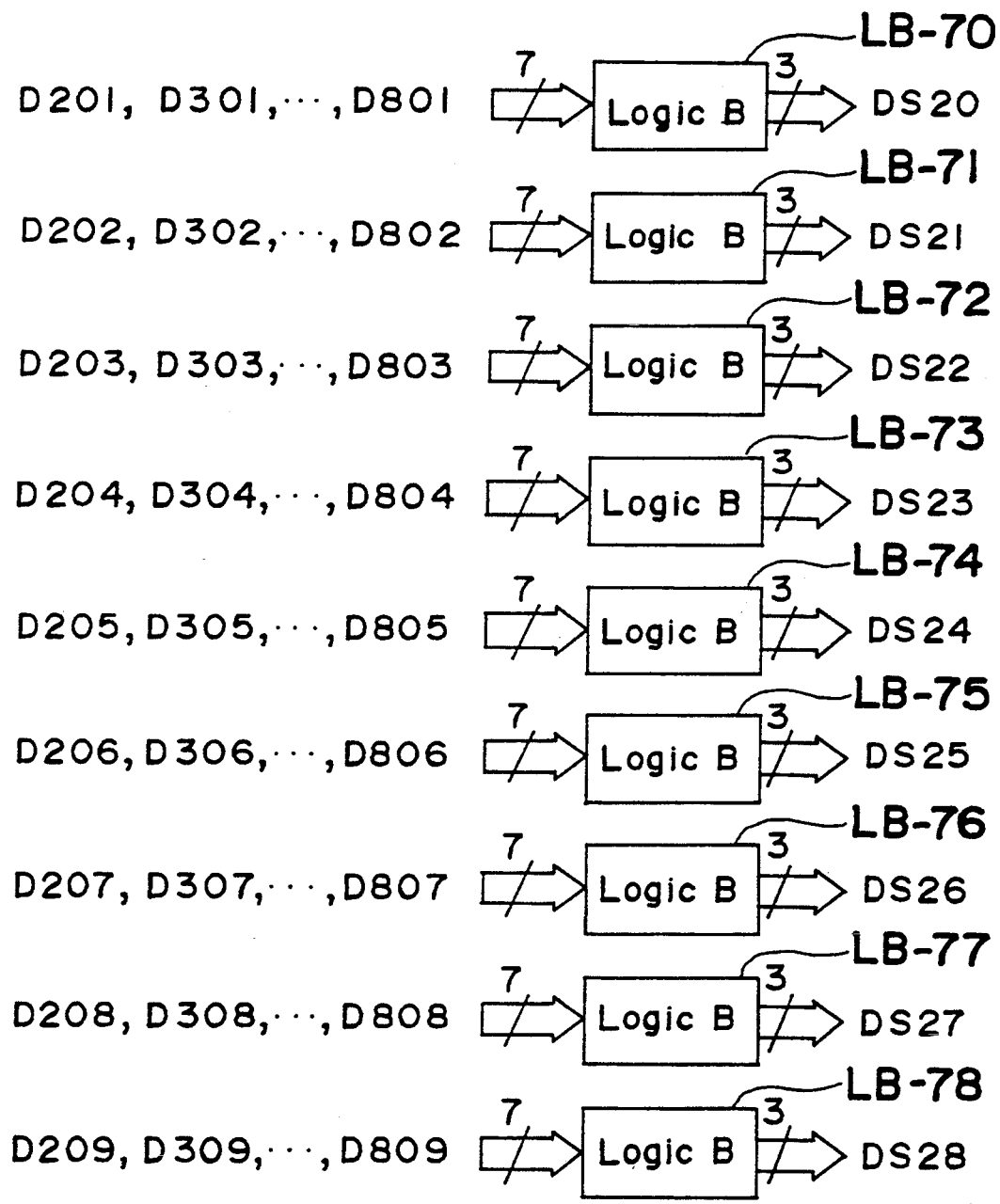
FIG. 21 is a schematic block diagram showing a second calculation section of the black pixel within the window counting section shown in FIG. 3.

FIG. 21 shows the second calculation section 113b of the black pixel within the window counting section 113 for counting number of black pixels among each of seven pixel data continuously aligned in the subscan direction, and the second calculation section 113b comprises nine logic B circuits LB-70 to LB-78.

Referring to FIG. 21, the seven pixel data D201 to D801 continuously aligned in the subscan direction are inputted to the logic B circuit LB-70, a number of black pixels is counted based thereon, and data DS20 of the count value thereof are outputted. Further, the seven pixel data D202 to D802 continuously aligned in the subscan direction are inputted to the logic B circuit LB-71, a number of black pixels is counted based thereon, and data DS21 of the count value thereof are outputted. In a manner similar to that of above, respective seven pixel data D203 to D803, D204 to D804, . . .

, and D209 to D809 continuously aligned in the subscan direction with respect to the scanning lines of j=3 to 9 are inputted to the logic B circuits LB-72 to LB-78, respective numbers of black pixels are counted based thereon, and data DS22 to DS28 of the count values thereof are outputted.

Figure 22:
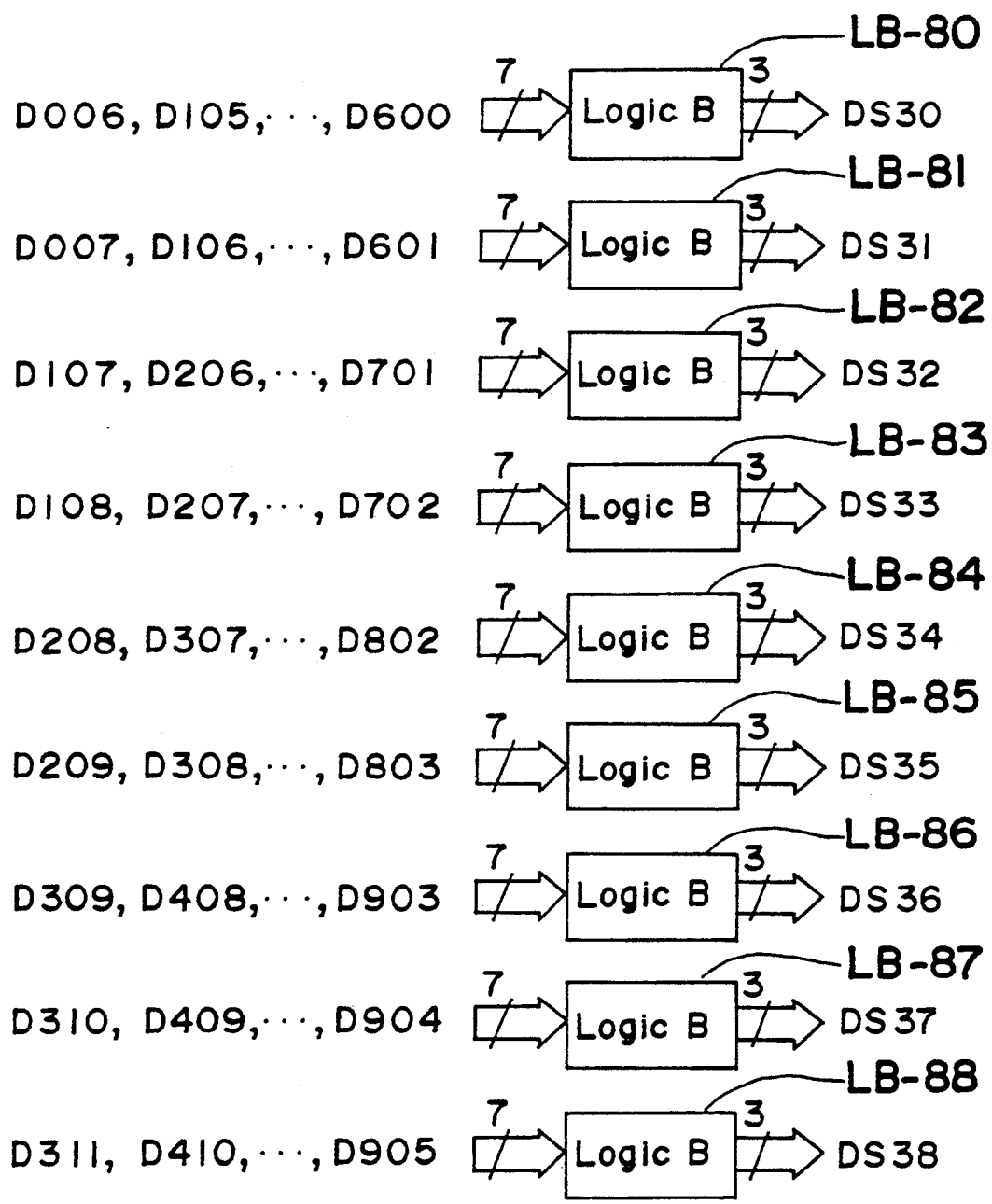
FIG. 22 is a schematic block diagram showing a third calculation section of the black pixel within the window counting section shown in FIG. 3.

FIG. 22 shows the third calculation section 113c of the black pixel within the window counting section 113 for counting number of black pixels among each of seven pixel data continuously aligned in the first oblique direction, and the third calculation section 113c comprises nine logic B circuits LB-80 to LB-88.

Referring to FIG. 22, the seven pixel data D006, D105, ..., and D600 continuously aligned in the first oblique direction are inputted to the logic B circuit LB-80, a number of black pixels is counted based thereon, and data DS30 of the count value thereof are outputted. Further, the seven pixel data D007, D106, ..., and D601 continuously aligned in the first oblique direction are inputted to the logic B circuit LB-81, a number of black pixels is counted based thereon, and data DS31 of the count value thereof are outputted. In a manner similar to that of above, respective seven pixel data D107, D206, ..., D701; D108, D207, ..., D702; ...; D310, D409, ..., D904; D311, D410, ..., D905 continuously aligned in the first oblique direction are inputted to the logic B circuits LB-82 to LB-88, respective numbers of black pixels are counted based thereon, and data DS32 to DS38 of the count values thereof are outputted.

FIG. 23 shows the fourth calculation section 113d of the black pixel within the window counting section 113 for counting number of black pixels among each of seven pixel data continuously aligned in the second oblique direction, and the fourth calculation section 113d comprises nine logic B circuits LB-90 to LB-98.

Referring to FIG. 23, the seven pixel data D004, D105, ..., and D610 continuously aligned in the second oblique direction are inputted to the logic B circuit LB-90, a number of black pixels is counted based thereon, and data DS40 of the count value thereof are outputted. Further, the seven pixel data D003, D104, ..., and D609 continuously aligned in the second oblique direction are inputted to the logic B circuit LB-91, a number of black pixels is counted based thereon, and data DS41 of the count value thereof are outputted. In a manner similar to that of above, respective seven pixel data D103, D204, ..., D709; D102, D203, ..., D708; ...; D300, D401, ..., D906; D400, D501, ..., D905, D702 continuously aligned in the second oblique direction are inputted to the logic B circuits LB-92 to LB-98, respective numbers of black pixels are counted based thereon, and data DS42 to DS48 of the count values thereof are outputted.

(6-3) Smoothed Amount Calculation Section

FIG. 24 shows the smoothed amount calculation section 110 shown in FIG. 3.

Referring to FIG. 24, the data DS11 and DS12 are inputted to an adder AD71, and the data DS13 and DS14 are inputted to an adder AD72. Further, the data DS15 and DS16 are inputted to an adder AD74, and the data DS17 are inputted to an adder AD75. The respective data DS11 to DS17 are added to each other by the six adders AD71 to AD76, and data Of the addition result are outputted from the adder AD76 to the recovered data calculation section 112 and the adder AD81, as the second data of the 7×7 black pixel number which are the calculation result calculated by the spatial filter F11.

Further, the data DS10 and DS18 are inputted to an adder AD77, and the data DS20 and DS28 are inputted to an adder AD78. The pixel data D101, D801, D108 and D808 and three data of zero are inputted to a logic B circuit LB-99, a number of black pixels is counted based thereon, and then, data of the counted value are outputted to an adder AD80. These data DS10, DS18, DS20, DS28, D101, D801, D108 and D808 are added to each other by the adders AD77 to AD80, and data of the addition result are outputted from the adder AD80 to the adder AD81. The adder AD81 adds the respective data inputted thereto, and outputs data of the addition result to the recovered data calculation section 112, as the 9×9 black pixel number data.

(6-4) Edge Emphasis Amount Calculation Section

Figure 25:
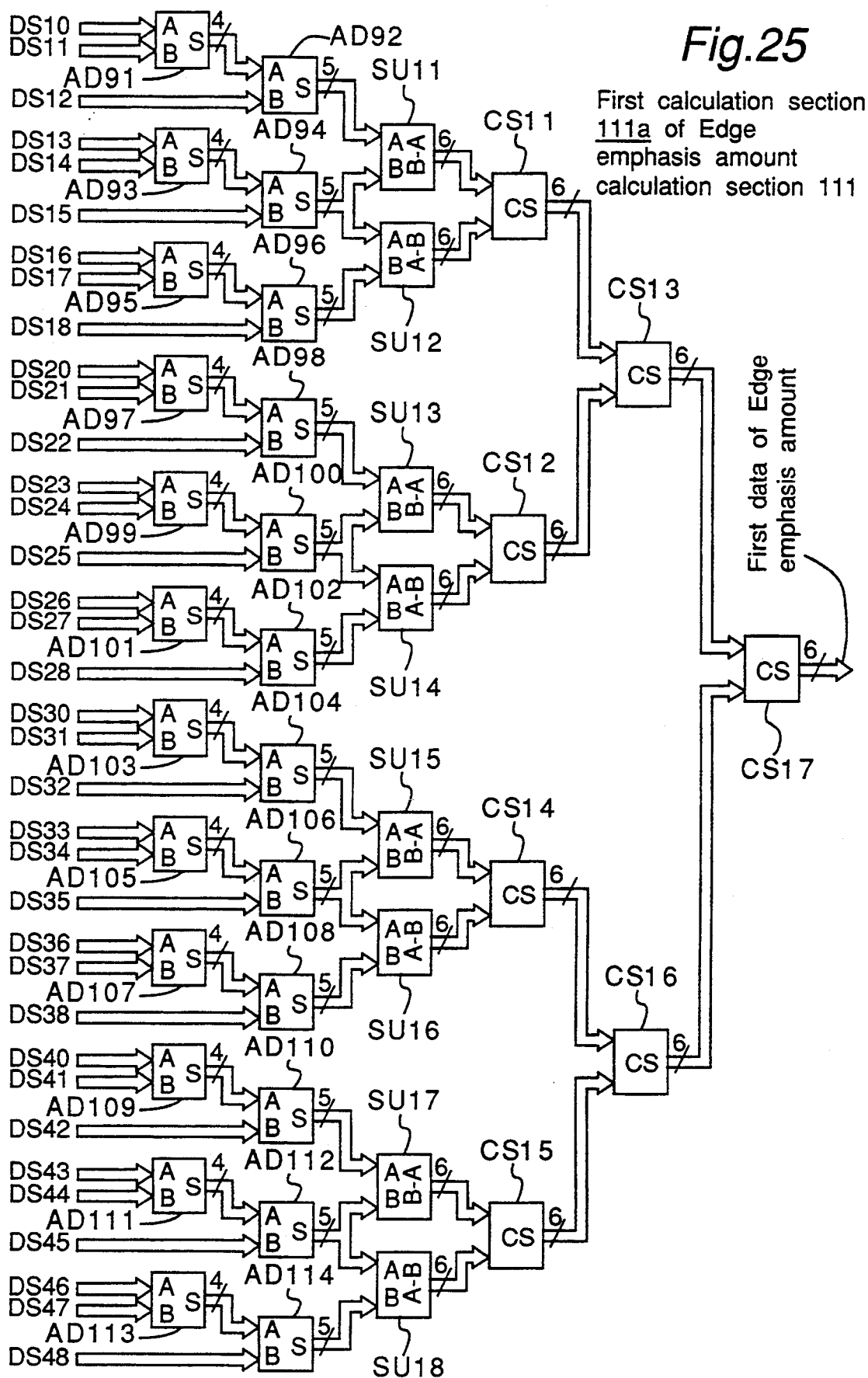
FIG. 25 is a schematic block diagram showing a first calculation section of an edge emphasis amount calculation section shown in FIG. 3.
Figure 26:
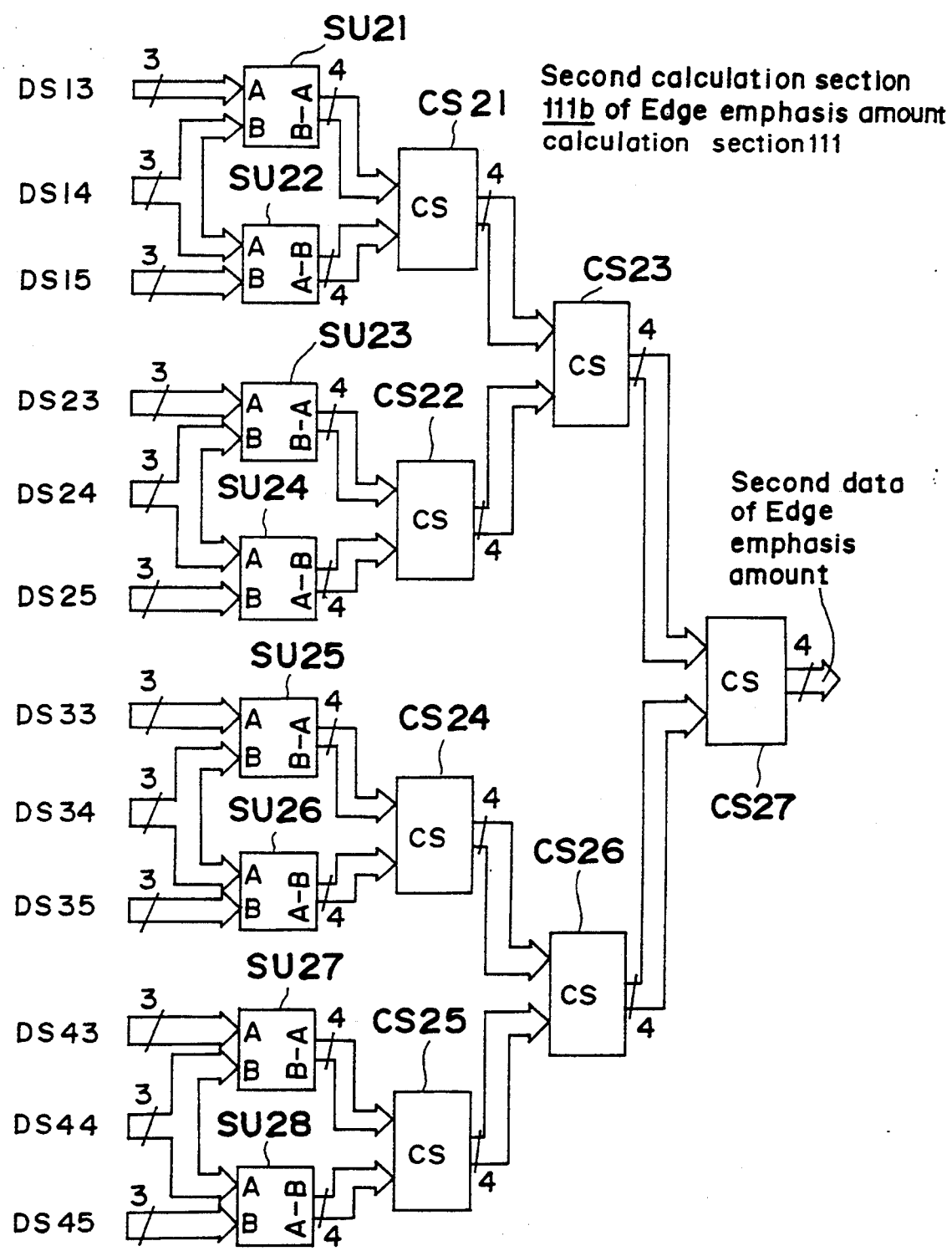
FIG. 26 is a schematic block diagram showing a second calculation section of the edge emphasis amount calculation section shown in FIG. 3.

The edge emphasis amount calculation section 111 comprises a first calculation section 111a shown in FIG. 25 for calculating an edge emphasis amount (referred to as first data of the edge emphasis amount) obtained by selecting the maximum absolute value among respective edge emphasis amounts calculated by the spatial filters F21 to F28, and a second calculation section 111b shown in FIG. 26 for calculating an edge emphasis amount (referred to as second data of the edge emphasis amount) obtained by selecting the maximum absolute value among respective edge emphasis amounts calculated by the spatial filters F31 to F38.

FIG. 25 shows the first calculation section 111a of the edge emphasis amount calculation section 111.

Referring to FIG. 25, the data DS10 to DS12 are added to each other by adders AD91 and AD92, and then, data of the addition result thereof are outputted from the adder AD92 to an input terminal A of a subtracter SU11. Further, the data DS13 to DS15 are added to each other by adders AD93 and AD94, and then, data of the addition result thereof are outputted from the adder AD94 to an input terminal B of the subtracter SU11 and an input terminal A of a subtracter SU12. Furthermore, the data DS16 to DS18 are added to each other by adders AD95 and AD96, and then, data of the addition result thereof are outputted from the adder AD96 to an input terminal B of the subtracter SU12. The subtracter SU11 subtracts the data inputted to the input terminal A thereof from the data inputted to the input terminal B thereof, and then, outputs data of the subtraction result thereof to a comparison selector CS11, as data of the calculation result calculated by the spatial filter F21. Further, the subtracter SU12 subtracts the data inputted to the input terminal B thereof from the data inputted to the input terminal A thereof, and then, outputs data of the subtraction result thereof to the comparison selector CS11, as data of the calculation result calculated by the spatial filter F22. In response to these inputted data, the comparison selector CS11 selects data having the maximum absolute value among the respective inputted data, and outputs the selected data to the comparison selector CS13.

The data DS20 to DS22 are added to each other by adders AD97 and AD98, and then, data of the addition result thereof are outputted from the adder AD98 to an input terminal A of a subtracter SU13. Further, the data DS23 to DS25 are added to each other by adders AD99 and AD100, and then, data of the addition result thereof are outputted from the adder AD100 to an input terminal B of the subtracter SU13 and an input terminal A of a subtracter SU14. Furthermore, the data DS26 to DS28 are added to each other by adders AD101 and AD102, and then, data of the addition result thereof are outputted from the adder AD102 to an input terminal B of the subtracter SU14. The subtracter SU13 subtracts the data inputted to the input terminal A thereof from the data inputted to the input terminal B thereof, and then, outputs data of the subtraction result thereof to a comparison selector CS12, as data of the calculation result calculated by the spatial filter F23. Further, the subtracter SU14 subtracts the data inputted to the input terminal B thereof from the data inputted to the input terminal A thereof, and then, outputs data of the subtraction result thereof to the comparison selector CS12, as data of the calculation result calculated by the spatial filter F24. In response to these inputted data, the comparison selector CS12 selects data having the maximum absolute value among the respective inputted data, and outputs the selected data to the comparison selector CS13.

The data DS30 to DS32 are added to each other by adders AD103 and AD104, and then, data of the addition result thereof are outputted from the adder AD104 to an input terminal A of a subtracter SU15. Further, the data DS33 to DS35 are added to each other by adders AD105 and AD106, and then, data of the addition result thereof are outputted from the adder AD106 to an input terminal B of the subtracter SU15 and an input terminal A of a subtracter SU16. Furthermore, the data DS36 to DS38 are added to each other by adders AD107 and AD108, and then, data of the addition result thereof are outputted from the adder AD108 to an input terminal B of the subtracter SU16. The subtracter SU15 subtracts the data inputted to the input terminal A thereof from the data inputted to the input terminal B thereof, and then, outputs data of the subtraction result thereof to a comparison selector CS14, as data of the calculation result calculated by the spatial filter F25. Further, the subtracter SU16 subtracts the data inputted to the input terminal B thereof from the data inputted to the input terminal A thereof, and then, outputs data of the subtraction result thereof to the comparison selector CS14, as data of the calculation result calculated by the spatial filter F26. In response to these inputted data, the comparison selector CS14 selects data having the maximum absolute value among the respective inputted data, and outputs the selected data to the comparison selector CS16.

The data DS40 to DS42 are added to each other by adders AD109 and AD110, and then, data of the addition result thereof are outputted from the adder AD110 to an input terminal A of a subtracter SU17. Further, the data DS43 to DS45 are added to each other by adders AD111 and AD112, and then, data of the addition result thereof are outputted from the adder AD112 to an input terminal B of the subtracter SU17 and an input terminal A of a subtracter SU18. Furthermore, the data DS46 to DS48 are added to each other by adders AD113 and AD114, and then, data of the addition result thereof are outputted from the adder AD114 to an input terminal B of the subtracter SU18. The subtracter SU17 subtracts the data inputted to the input terminal A thereof from the data inputted to the input terminal B thereof, and then, outputs data of the subtraction result thereof to a comparison selector CS15, as data of the calculation result calculated by the spatial filter F27. Further, the subtracter SU18 subtracts the data inputted to the input terminal B thereof from the data inputted to the input terminal A thereof, and then, outputs data of the subtraction result thereof to the comparison selector CS15, as data of the calculation result calculated by the spatial filter F28. In response to these inputted data, the comparison selector CS15 selects data having the maximum absolute value among the respective inputted data, and outputs the selected data to the comparison selector CS16.

The comparison selector CS13 selects data having the maximum absolute value among the respective inputted data, and outputs the selected data to the comparison selector CS17. Further, the comparison selector CS16 selects data having the maximum absolute value among the respective inputted data, and outputs the selected data to the comparison selector CS17. In response to these inputted data, the comparison selector CS17 selects data having the maximum absolute value among the respective inputted data, and outputs the selected data to the recovered data calculation section 112, as the first data of the edge emphasis amount.

FIG. 26 shows the second calculation section 111$b$ of the edge emphasis amount calculation section 111.

Referring to FIG. 26, the data DS13 are inputted to an input terminal A of a subtracter SU21, the data DS14 are inputted to an input terminal B of the subtracter SU21 and a first input terminal A of a subtracter SU22, and the data DS15 are inputted to an input terminal B of the subtracter SU22. The subtracter SU21 subtracts the data inputted to the input terminal A thereof from the data inputted to the input terminal B thereof, and then, outputs data of the subtraction result thereof to the comparison selector CS21, as data of the calculation result calculated by the spatial filter F31. Further, the subtracter SU22 subtracts the data inputted to the input terminal B thereof from the data inputted to the input terminal A thereof, and then, outputs data of the subtraction result thereof to the comparison selector CS21, as data of the calculation result calculated by the spatial filter F32. In response to these inputted data, the comparison selector CS21 selects data having the maximum absolute value among the respective inputted data, and outputs the selected data to the comparison selector CS23.

The data DS23 are inputted to an input terminal A of a subtracter SU23, the data DS24 are inputted to an input terminal B of the subtracter SU23 and a first input terminal A of a subtracter SU24, and the data DS25 are inputted to an input terminal B of the subtracter SU24. The subtracter SU23 subtracts the data inputted to the input terminal A thereof from the data inputted to the input terminal B thereof, and then, outputs data of the subtraction result thereof to the comparison selector CS22, as data of the calculation result calculated by the spatial filter F33. Further, the subtracter SU24 subtracts the data inputted to the input terminal B thereof from the data inputted to the input terminal A thereof, and then, outputs data of the subtraction result thereof to the comparison selector CS22, as data of the calculation result calculated by the spatial filter F34. In response to these inputted data, the comparison selector CS22 selects data having the maximum absolute value among the respective inputted data, and outputs the selected data to the comparison selector CS23.

The data DS33 are inputted to an input terminal A of a subtracter SU25, the data DS34 are inputted to an input terminal B of the subtracter SU25 and a first input terminal A of a subtracter SU26, and the data DS35 are inputted to an input terminal B of the subtracter SU26.

The subtracter SU25 subtracts the data inputted to the input terminal A thereof from the data inputted to the input terminal B thereof, and then, outputs data of the subtraction result thereof to the comparison selector CS24, as data of the calculation result calculated by the spatial filter F35. Further, the subtracter SU26 subtracts the data inputted to the input terminal B thereof from the data inputted to the input terminal A thereof, and then, outputs data of the subtraction result thereof to the comparison selector CS24, as data of the calculation result calculated by the spatial filter F36. In response to these inputted data, the comparison selector CS24 selects data having the maximum absolute value among the respective inputted data, and outputs the selected data to the comparison selector CS26.

The data DS43 are inputted to an input terminal A of a subtracter SU27, the data DS44 are inputted to an input terminal B of the subtracter SU27 and a first input terminal A of a subtracter SU28, and the data DS45 are inputted to an input terminal B of the subtracter SU28. The subtracter SU27 subtracts the data inputted to the input terminal A thereof from the data inputted to the input terminal B thereof, and then, outputs data of the subtraction result thereof to the comparison selector CS25, as data of the calculation result calculated by the spatial filter F37. Further, the subtracter SU28 subtracts the data inputted to the input terminal B thereof from the data inputted to the input terminal A thereof, and then, outputs data of the subtraction result thereof to the comparison selector CS25, as data of the calculation result calculated by the spatial filter F38. In response to these inputted data, the comparison selector CS25 selects data having the maximum absolute value among the respective inputted data, and outputs the selected data to the comparison selector CS26.

The comparison selector CS23 selects data having the maximum absolute value among the respective inputted data, and outputs the selected data to the comparison selector CS27. Further, the comparison selector CS26 selects data having the maximum absolute value among the respective inputted data, and outputs the selected data to the comparison selector CS27. In response to these inputted data, the comparison selector CS27 selects data having the maximum absolute value among the respective inputted data, and outputs the selected data to the recovered data calculation section 112 as the second data of the edge emphasis amount.

The reasons why the edge emphasis amount having the maximum absolute value is selected among the edge emphasis amounts calculated by the respective spatial filters in the above-mentioned edge emphasis amount calculation section 111 are as follows. Namely, the edge components in all the directions are added to each other in the edge emphasis process for the multi-value image data. On the other hand, in the edge emphasis process for the binary image data, there is often outputted a minute edge emphasis amount in the case of a particular image pattern of a pseudo half-tone image. This minute edge emphasis amount has relatively low reliability, and the above-mentioned addition processes may lead to relatively larger error.

Figure 27:
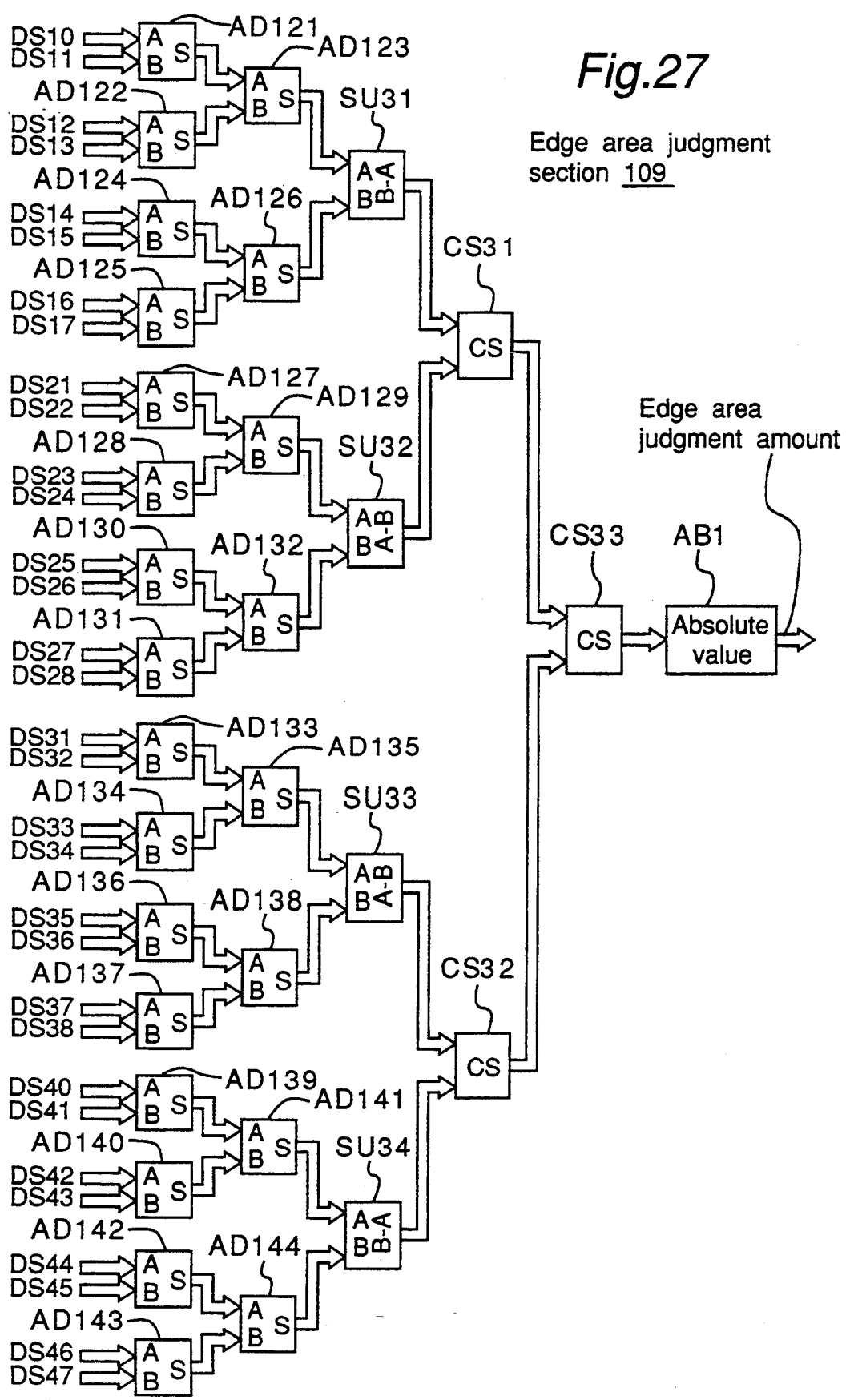
FIG. 27 is a schematic block diagram showing an edge area judgment section shown in FIG. 3.

FIG. 27 shows the edge area judgment section 109 shown in FIG. 3.

Referring to FIG. 27, the data DS10 to DS13 are added to each other by adders AD121 to AD123, and then, data of the addition result thereof are outputted from the adder AD123 to an input terminal A of a subtracter SU31. Further, the data DS14 to DS17 are added to each other by adders AD124 to AD126, and then, data of the addition result thereof are outputted from the adder AD126 to an input terminal B of the subtracter SU31. The subtracter SU31 subtracts the data inputted to the input terminal A thereof from the data inputted to the input terminal B thereof, and then, outputs data of the subtraction result thereof to a comparison selector CS31, as data of the calculation result calculated by the spatial filter F41.

The data DS21 to DS24 are added to each other by adders AD127 to AD129, and then, data of the addition result thereof are outputted from the adder AD129 to an input terminal A of a subtracter SU32. Further, the data DS25 to DS28 are added to each other by adders AD130 to AD132, and then, data of the addition result thereof are outputted from the adder AD132 to an input terminal B of the subtracter SU32. The subtracter SU32 subtracts the data inputted to the input terminal B thereof from the data inputted to the input terminal A thereof, and then, outputs data of the subtraction result thereof to a comparison selector CS31, as data of the calculation result calculated by the spatial filter F42.

The data DS31 to DS34 are added to each other by adders AD133 to AD135, and then, data of the addition result thereof are outputted from the adder AD135 to an input terminal A of a subtracter SU33. Further, the data DS35 to DS38 are added to each other by adders AD136 to AD138, and then, data of the addition result thereof are outputted from the adder AD138 to an input terminal B of the subtracter SU33. The subtracter SU33 subtracts the data inputted to the input terminal B thereof from the data inputted to the input terminal A thereof, and then, outputs data of the subtraction result thereof to a comparison selector CS32, as data of the calculation result calculated by the spatial filter F43.

The data DS40 to DS43 are added to each other by adders AD139 to AD141, and then, data of the addition result thereof are outputted from the adder AD141 to an input terminal A of a subtracter SU34. Further, the data DS44 to DS47 are added to each other by adders AD142 to AD144, and then, data of the addition result thereof are outputted from the adder AD144 to an input terminal B of the subtracter SU34. The subtracter SU34 subtracts the data inputted to the input terminal A thereof from the data inputted to the input terminal B thereof, and then, outputs data of the subtraction result thereof to a comparison selector CS32, as data of the calculation result calculated by the spatial filter F44.

The comparison selector CS31 selects data having the maximum absolute value among the respective inputted data, and outputs the selected data to the comparison selector CS33, and the comparison selector CS32 selects data having the maximum absolute value among the respective inputted data, and outputs the selected data to the comparison selector CS33. In response to these inputted data, the comparison selector CS33 selects data having the maximum absolute value among the respective inputted data, and outputs the selected data to an absolute value calculation circuit AB1, which calculates an absolute value of the inputted data and outputs data thereof to the recovered data calculation section 112, as the edge area judgment amount.

The reason why the data of the absolute value are outputted as the edge area judgment amount from the edge area judgment section 109 is that the information of the edge component corresponding to a positive or negative edge component amount is not necessary in the recovered data calculation section 112.

(6-6) Recovery Data Calculation Section

Figure 28:
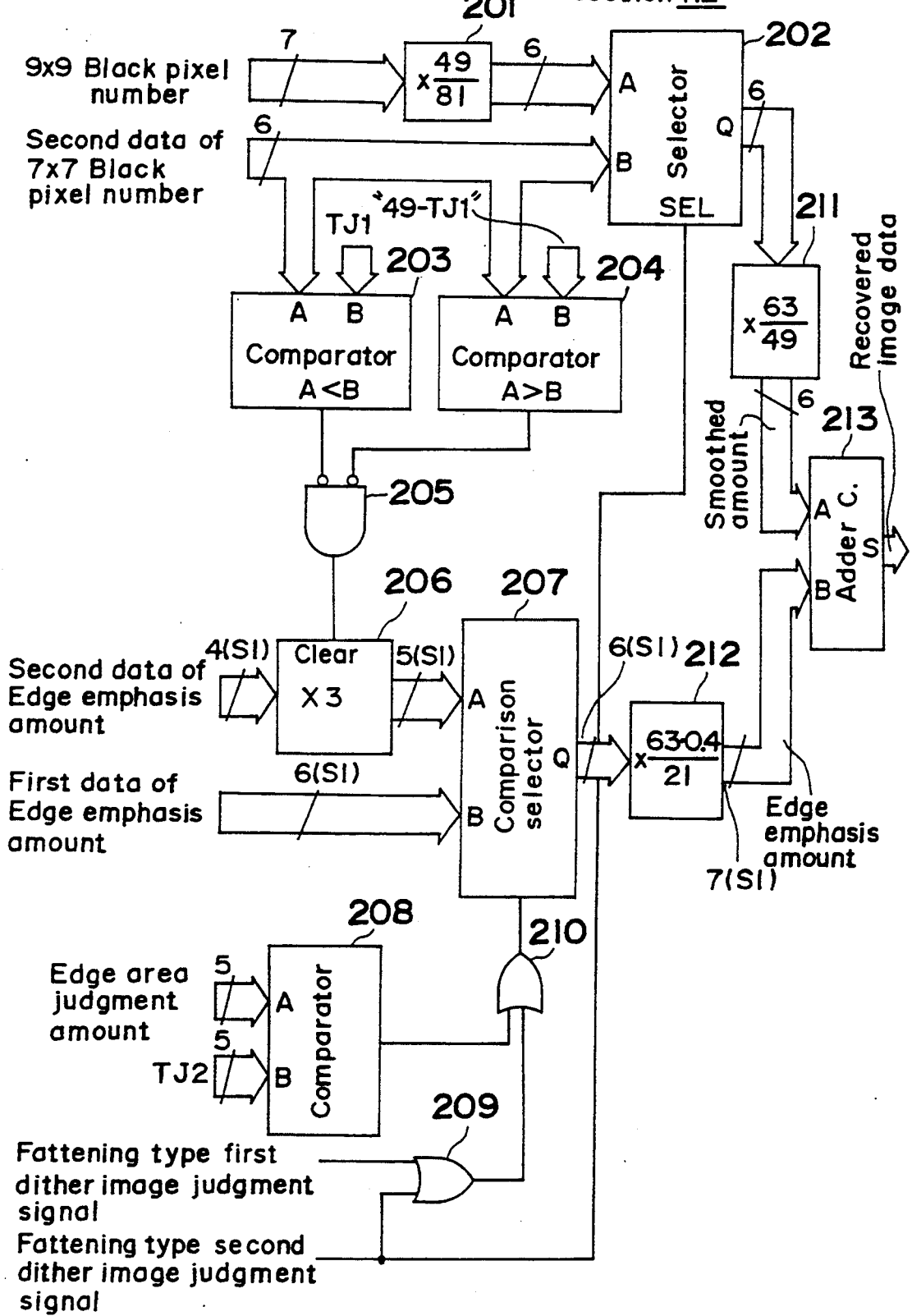
FIG. 28 is a schematic block diagram showing a recovered data calculation section shown in FIG. 3.

FIG. 28 shows the recovery data calculation section 112 shown in FIG. 3.

Referring to FIG. 28, the data of the 9×9 black pixel number are inputted to a multiplier 201, and then, inputted data are multiplied by 49/81 in order to convert the inputted data so as to estimate them in the same weighting amount in the image density between all the number of pixels located within the 9×9 window W9 and all the number of pixels located within the 7×7 window W7. Thereafter, data of the multiplication result thereof are outputted from the multiplier 201 to an input terminal A of a selector 202. Further, the second data of the 7×7 black pixel number are inputted to not only respective input terminals A of comparators 203 and 204 but also an input terminal B of the selector 202. Data of a predetermined threshold value TJ1 are inputted to an input terminal B of the comparator 203. When A<B, the comparator 203 outputs a high level signal through a NOR gate 205 to a clear terminal of a multiplier 206. Otherwise, the comparator 203 outputs a low level signal thereto, similarly. Further, data of (49-TJ1) are inputted to an input terminal B of the comparator 204. When A>B, the comparator 204 outputs a high level signal through the NOR gate 205 to the clear terminal of the multiplier 206. Otherwise, the comparator 204 outputs a low level signal thereto, similarly.

The Fattening type first-dither image judgment signal is inputted through an OR gate 209 and an OR gate 210 to a clear terminal of a comparator 207, and the Fattening type second dither image judgment signal is inputted through the OR gate 209 and the OR gate 210 to the clear terminal of the comparator 207, and a selection terminal SEL of the selector 202.

When the Fattening type second dither image judgment signal of the high level is inputted to the selection terminal SEL of the selector 202, the selector 202 selects the data inputted to the input terminal A thereof, and outputs the selected data to a multiplier 211. On the other hand, when the Fattening type second dither image judgment signal of the low level is inputted to the selection terminal SEL of the selector 202, the selector 202 selects the data inputted to the input terminal B thereof, and outputs the selected data to the multiplier 211. The multiplier 211 is provided for converting the edge emphasis amount of 50 gradation steps into that of 64 gradation steps, multiplies the inputted data by 63/49, and then, outputs data of the multiplication result to an input terminal A of an adder circuit 213 as the smoothed amount.

The first data of the edge emphasis amount are inputted to an input terminal B of a comparison selector 207, and the second data of the edge emphasis amount are inputted to the multiplier 206, which is provided for converting the first and second data thereof so as to estimate them in the same weighting amount of the image density therebetween, namely, so as to estimate them in the same size of the window between the each window of each spatial filter used for calculating the first data of the edge emphasis amount and the each window of each spatial filter used for calculating the second data of the edge emphasis amount. The multiplier 206 multiplies the inputted data by three, and outputs data of the multiplication result thereof to an input terminal A of the comparison selector 207. When the high level signal is inputted to the clear terminal of the multiplier 206, the output data of the multiplier 206 is cleared to zero.

The data of the edge area judgment amount are inputted to an input terminal A of a comparator 208, and data of a predetermined threshold value TJ2 are inputted to an input terminal B of the comparator 208. When A<B, the comparator 208 outputs a high level signal through the OR gate 210 to the clear terminal of the comparison selector 207. Otherwise, the comparator 208 outputs a low level signal thereto, similarly. When the low level signal is inputted to the clear terminal of the comparison selector 207, the comparison selector 207 selects the data having the maximum absolute value among the inputted data, and outputs the selected data to a multiplier 212. On the other hand, when the high level signal is inputted to the clear terminal of the comparison selector 207, the comparison selector 207 clears the output data thereof into zero, and outputs data of zero to the multiplier 212. In order to mix an appropriate amount of the edge emphasis mount with the smoothed amount, the multiplier 212 multiplies the inputted data by a multiplication coefficient of (63×0.4/21), and outputs the data of the multiplication result thereof to an input terminal B of an adder circuit 213, as the edge emphasis amount. Further, the adder circuit 213 adds the data of the smoothed amount inputted to the input terminal A thereof to the data of the edge emphasis amount inputted to the input terminal B, as described in detail later, and then, outputs the data of the addition result thereof to the data mixing section 104, as half-tone recovered image data.

In the recovery data calculation section 112 constituted as described above, the selector 202 selects either one of the data corresponding to the 9×9 black pixel number and the second data of the 7×7 black pixel number, according to the Fattening type second data image judgment signal. In the above-mentioned Fattening type first dither image, there is a density change of one period by four dots in the main scan and subscan directions. Therefore, in order to calculate the smoothed amount, it is necessary to provide a window larger than the 4×4 window. In the present preferred embodiment, the 7×7 window W7 is used. On the other hand, in the above-mentioned Fattening type second dither image, there is a density change of one period by four dots in the oblique directions. Therefore, in order to calculate the smoothed amount, it is necessary to provide a window larger than a $(4\sqrt{2})\times(4\sqrt{2})$ window. In the present preferred embodiment, there is used the 9×9 window W9, taking a margin into consideration. It is to be noted that there is used the 7×7 window W7 in order to calculate the smoothed amount of the Bayer type half-tone image.

In order to prevent a Moire from being generated, there is preferably used a window having a size of an integer times the period of the dither. Therefore, in order to calculate the smoothed amount of the Fattening type first dither image, there is more preferably used a 4×4 window or a 8×8 window. Further, in order to calculate the smoothed amount of the Fattening type second dither image, a 8×8 window having the sides thereof parallel to the main scan and subscan directions is inclined by 45 degrees from the main scan and subscan directions, and then, the inclined 8×8 obtained then is preferably used.

Further, in the recovery data calculation section 112, in order to judge whether or not a specified pixel is included in an edge area, there are used the Fattening type first and second dither image judgment signals. When the edge area judgment amount is smaller than the threshold value TJ2 or the output signal of the comparator 208 has the high level, or when either one of the Fattening type first and second dither image judgment signals has the high level or the output signal of the OR gate 209 has the high level, the output terminal of the OR gate 210 becomes the high level. Then, the output data of the comparison selector 207 are cleared to zero, and then, the edge emphasis amount becomes zero. In this case, no edge emphasis process is performed. The reason why this process is performed is that there is a possibility of outputting such an edge judgment amount that the edge area judgment section 109 provided for detecting the Bayer type half-tone image may erroneously judge that an image within the predetermined area to be judged is included in an edge area since the spatial frequency of the dither pattern of the area of the Fattening type first or second dither image is relatively low. In the present preferred embodiment, the above-mentioned threshold value TJ2 is set preferably to four.

Further, the multiplier 206 is provided for converting the first and second data of the edge emphasis amounts so as to estimate them in the same size of the window between the each window of each spatial filter used for calculating the first data of the edge emphasis amount and the each window of each spatial filter used for calculating the second data of the edge emphasis amount. It is necessary to set the multiplication coefficient of the multiplication 206 so that an edge emphasis amount to be calculated using one window is selected for an image having a spatial frequency of the window.

Further, when the number of the smaller pixels is equal to or larger than the predetermined threshold value TJ1 or both the output signals of the comparators 203 and 204 have the low levels, respectively, the data converted from the second data of the edge emphasis amount by the multiplier 206 are cleared to zero, since the second data of the edge emphasis amount are obtained by calculating them for a line-shaped image having a width of one and the number of the smaller pixels is relatively small as described above. When the number of the smaller pixels increases due to the above-mentioned process, the particular image pattern of the pseudo half-tone image can be prevented from being emphasized. It is to be noted that the above-mentioned threshold value TJ1 is preferably eight in the present preferred embodiment.

Figure 29:
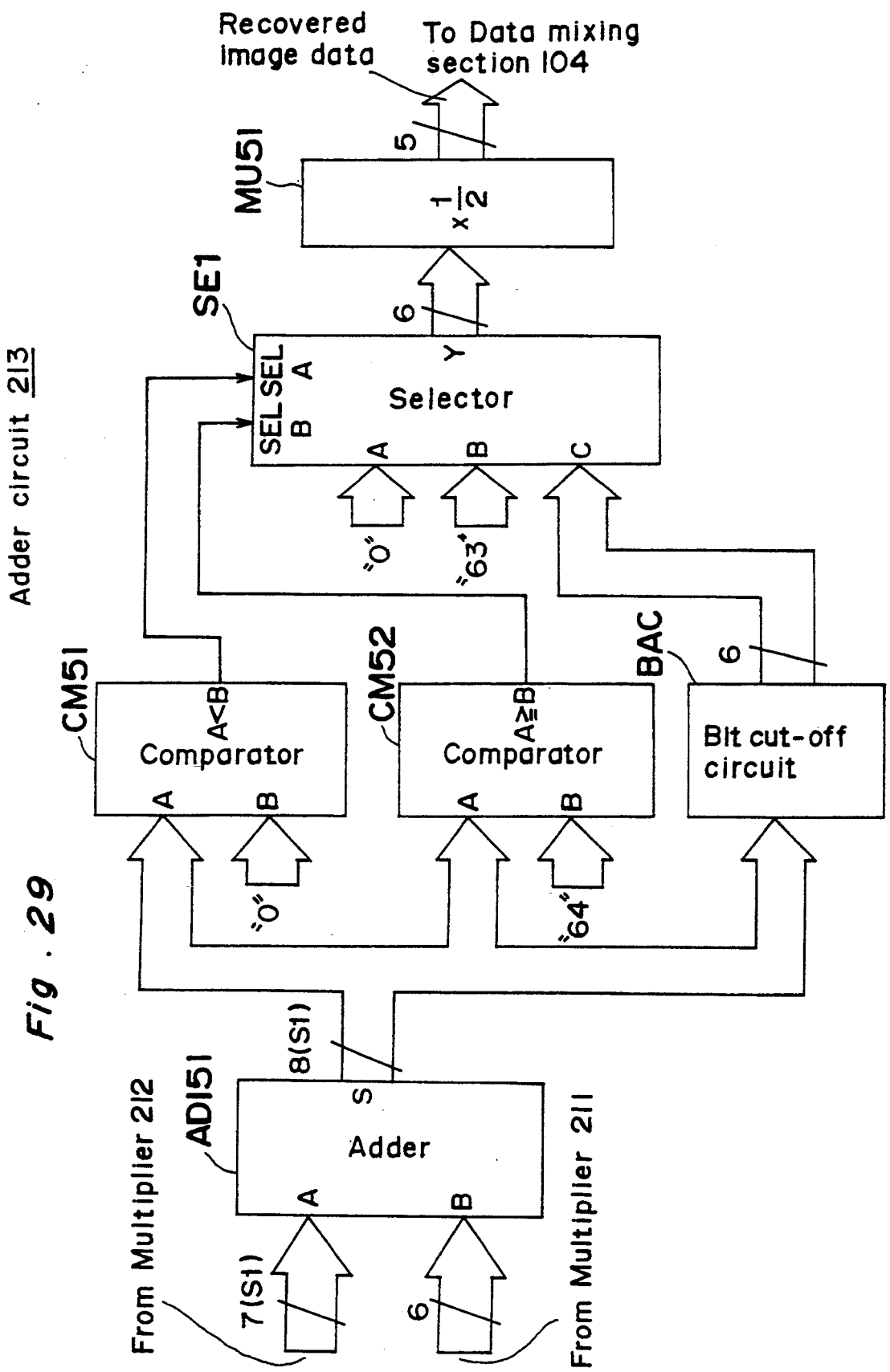
FIG. 29 is a schematic block diagram showing an adder circuit shown in FIG. 28.

FIG. 29 shows the adder circuit 213 shown in FIG. 28. The adder circuit 213 is provided for adding the edge emphasis amount of 7 bits including one sign bit and the smoothed value of 6 bits, and comprises an adder AD151, comparators CM51 and CM52, a bit cut-off circuit BAC for outputting cutting-off one sign bit and the MSB of one bit, a selector SE1, and a multiplier MU51 for multiplying the inputted data by a multiplication coefficient of ½ and outputting half the inputted data.

The data of the edge emphasis amount outputted from the multiplier 212 and the data of the smoothed value outputted from the multiplier 211 are inputted to the adder AD151. The data of 8 bits including one sign bit outputted from the adder AD151 are outputted to respective input terminals A of the selectors CM51 and CM52, and then, are outputted through the bit cut-off circuit BAC to the selector SE1. Data of zero are inputted to an input terminal B of the comparator CM51, and the comparator CM51 compares data inputted to the input terminal A thereof with data inputted to the input terminal B thereof.

When the data inputted to the input terminal A thereof are smaller than the data inputted to the input terminal B thereof, the comparator CM51 outputs a comparison result signal having the high level to an selection signal input terminal SELA of the selector SE1. On the other hand, when the data inputted to the input terminal A thereof are equal to or larger than the data inputted to the input terminal B thereof, the comparator CM51 outputs a comparison result signal having the low level to the selection signal input terminal SELA of the selector SE1. Further, data of 64 are inputted to an input terminal B of the comparator CM52, and the comparator CM52 compares data inputted to the input terminal A thereof with data inputted to the input terminal B thereof. When the data inputted to the input terminal A thereof are equal to or larger than the data inputted to the input terminal B thereof, the comparator CM52 outputs a comparison result signal having the high level to a selection signal input terminal SELB of the selector SE1. On the other hand, when the data inputted to the input terminal A thereof are smaller than the data inputted to the input terminal B thereof, the comparator CM52 outputs the comparison result signal having the low level to the selection signal input terminal SELB of the selector SE1. When the signal inputted to the selection signal input terminal SELA of the selector SE1 has the high level, the selector SE1 outputs data of zero inputted to the input terminal A thereof. Further, when the signal inputted to the selection signal input terminal SELB of the selector SE1 has the high level, the selector SE1 outputs data of 64 inputted to the input terminal A thereof. When both of the signals inputted to the selection signal input terminals SELA and SELB have the low level, respectively, the selector SE1 outputs the data of 6 bits inputted to the input terminal C thereof. The data outputted from the selector SE1 are outputted through the multiplier MU51 to the data mixing section 104 as the recovered multi-value image data of the half-tone image.

The adder circuit 213 constituted as described above adds the edge emphasis amount to the smoothed value, rounds off the sum of the addition result thereof so as to convert data of the sum smaller than zero into zero and data of the sum equal to or larger than 64 into 63, cuts off the LSB of one bit, calculates data of 5 bits having a value in range from zero to 31, and outputs the data of the calculation result thereof as the recovered multi-value of the half-tone image to the data mixing section 104.

(7) Other Preferred Embodiment

In the above preferred embodiment, the Fattening type half-tone image is detected based on the change in the peripheral distribution shown in FIG. 41. However, the present invention is not limited to this, and a pattern matching method using five windows W4a to W4e shown in FIG. 76 may be used.

Figure 76:
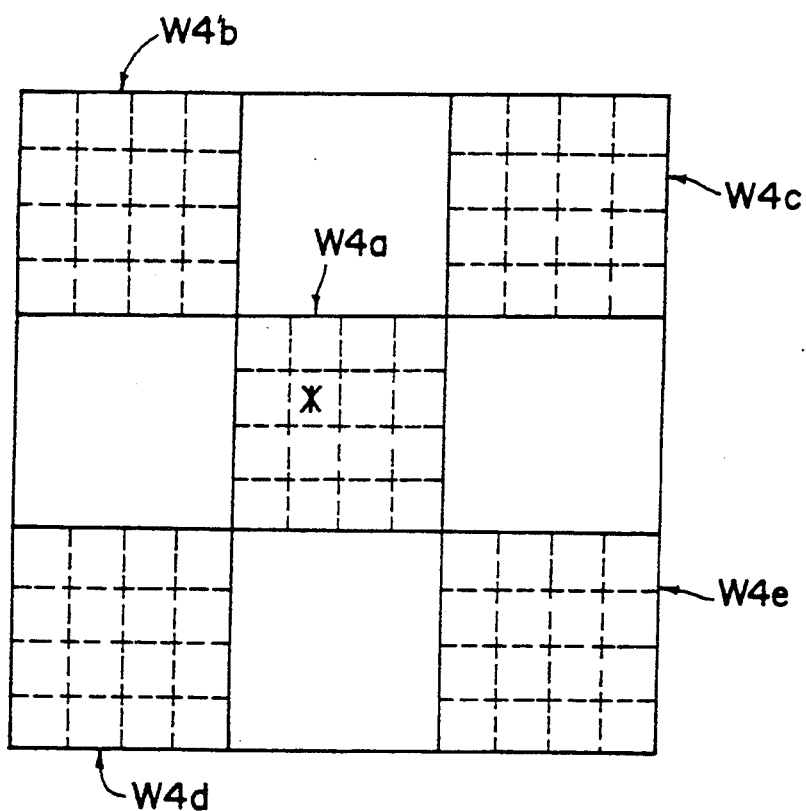
FIG. 76 is a front view showing five windows W4a to W4e for a pattern matching process which is provided for explaining a pattern matching method of a modification for calculating a half-tone index of a Fattening type half-tone image.

As shown in FIG. 76, between the window W4a and each of the 4×4 four widows W4b to W4d located adjacent to the window W4a in the first and second oblique directions, the matching process of the image patterns is performed. The judgment value of the half-tone image for the Fattening type half-tone image can be obtained by calculating a number of pixels, respective data of which are not matched to each other. It is to be noted that the above-mentioned four windows W4b to W4e are used in order to simultaneously correspond to two kinds of Fattening type ordered dither image with screen angles of zero degree and 45 degrees.

Figure 77:
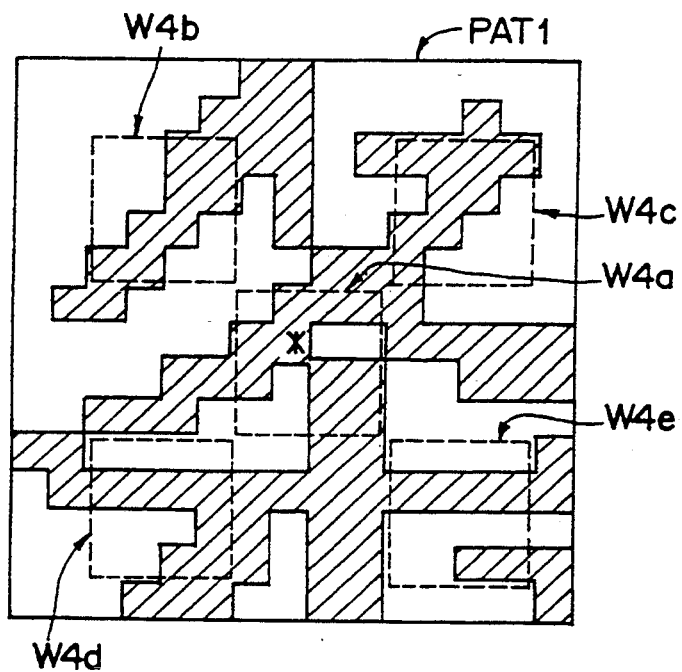
FIG. 77 is a front view showing a first image pattern PAT1 used for showing a calculation result obtained by the pattern matching method which is performed using the window for the pattern matching process shown in FIG. 76.
Figure 78:
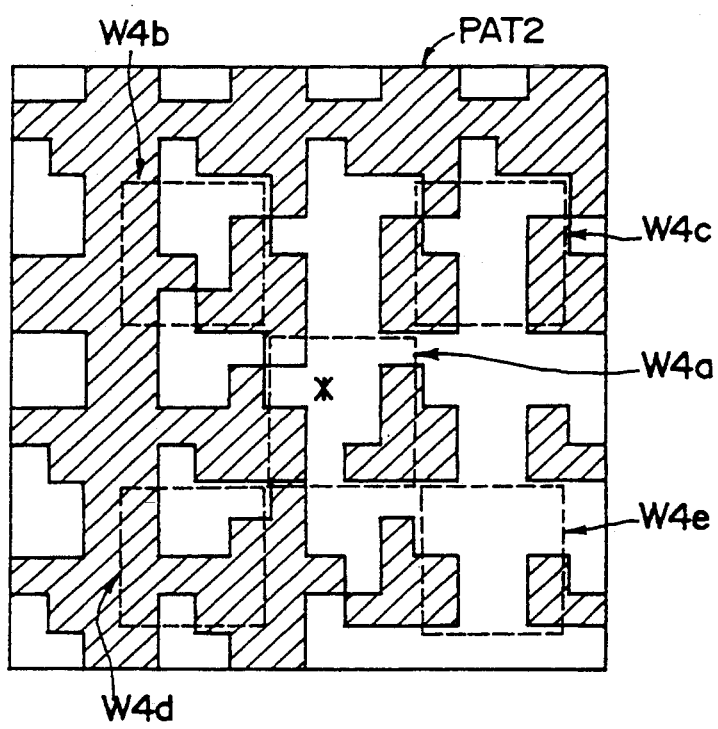
FIG. 78 is a front view showing a second image pattern PAT2 used for showing a calculation result obtained by the pattern matching method which is performed using the window for the pattern matching process shown in FIG. 76.
Figure 79:
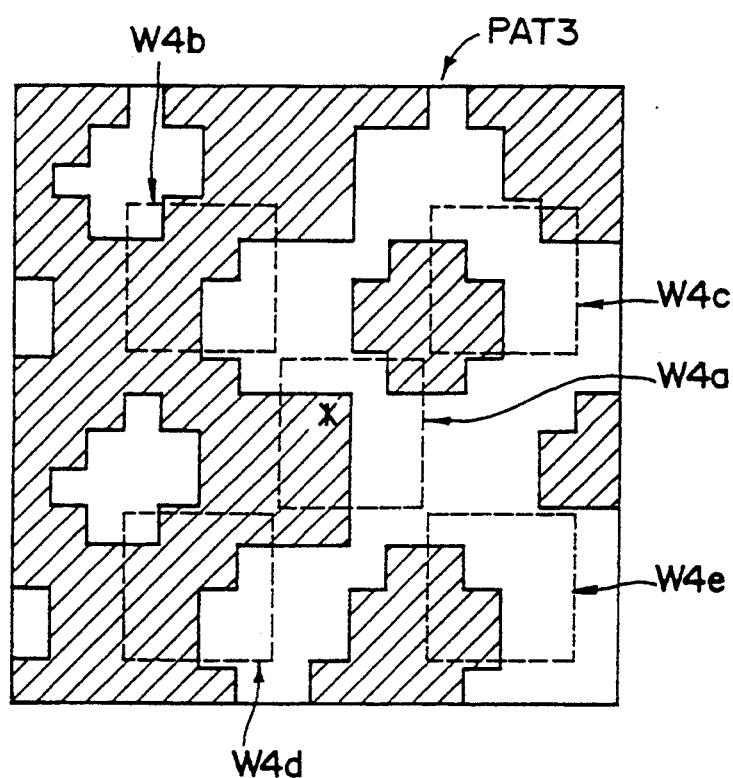
FIG. 79 is a front view showing a third image pattern PAT3 used for showing a calculation result obtained by the pattern matching method which is performed using the window for the pattern matching process shown in FIG. 76.

Table 1 shows a result obtained by counting a number of non-matching pixels using the above-mentioned pattern matching method for, for example, an image pattern PAT1 shown in FIG. 77, an image pattern PAT2 shown in FIG. 78 and an image pattern PAT3 shown in FIG. 79.

As is apparent from Table 1, in the case of the image pattern PAT1 shown in FIG. 77 which is an image pattern of a non-half-tone image, the number of the non-matching pixel is relatively large. As a result, it is confirmed that the above-mentioned pattern matching method can be applied to the present invention.

In the above preferred embodiments, the facsimile apparatuses are described above. However, the present invention is not limited to this. The present invention can be applied to a filing apparatus, a printer controller, an electronic sorter, or the like, wherein the electronic sorter stores image data composed of a plurality pieces of document images and sorts them. When the recovery technique according to the present invention is used, image data can be stored in a format of binary image data, and the stored image data can be outputted in a format of multi-value image data.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

TABLE 1

| Image Pattern | Windows for a matching process | Number of Non-matched pixels Between Windows | Total number |
|---|---|---|---|
| Image pattern PAT1 shown in FIG. 77 | W4a and W4b | 12 | |
| | W4a and W4c | 9 | 36 |
| | W4a and W4d | 7 | |
| | W4a and W4e | 8 | |
| Image pattern PAT2 shown in FIG. 78 | W4a and W4b | 2 | |
| | W4a and W4c | 1 | 9 |
| | W4a and W4d | 3 | |
| | W4a and W4e | 3 | |
| Image pattern PAT3 shown in FIG. 79 | W4a and W4b | 3 | |
| | W4a and W4c | 1 | 9 |
| | W4a and W4c | 2 | |
| | W4a and W4e | 3 | |

What is claimed is:

1. An image processing apparatus for processing inputted binary image data including a pseudo half-tone area in which data are binarized by a pseudo half-tone binarizing method and a non-half-tone area in which data are binarized using a predetermined threshold value, comprising:

image area judgment means for performing an image area judgment process for judging whether each pixel of said inputted binary image data is included in said pseudo half-tone area or said non-half-tone area, based on said binary image data located in a predetermined first area including a plurality of pixels which include a specified pixel and a plurality of pixels located in the periphery of said specified pixel and which are selected among said inputted binary image data;

first judgment means for judging what is the kind of minor pixels in said first area based on said binary image data located in said first area;

second judgment means for judging whether or not at least one of the minor pixels judged by said first judgment means is included in a predetermined second area which is located within said first area and which is smaller than said first area; and control means for invalidating result data of said image area judgment process with respect to said specified pixel when said second judgment means judges that none of the minor pixels is included in said second area.

2. An image processing apparatus for processing inputted binary image data including a pseudo half-tone area in which data are binarized by a pseudo half-tone binarizing method and a non-half-tone area in which data are binarized using a predetermined threshold value, comprising:

image area judgment means for performing an image area judgment process for judging whether each pixel of said inputted binary image data is included in said pseudo half-tone area or said non-half-tone area based on said binary image data;

first detection means for detecting adjacent states between respective pixels located in a predetermined area including at least a plurality of pixels located in the periphery of a specified pixel; and second detection means for detecting whether or not binary image data of said specified pixel are binary pseudo half-tone image data binarized by a Fattening type dither binarizing method;

wherein said image area judgment means performs said image area judgment process with respect to said specified pixel based on said adjacent states detected by said first detection means, and judges said binary image data of said specified pixel to be binary image data of the pseudo half-tone image independent of said detection result of said first detection means when said second detection means detects that said binary image data of said specified pixel are binary pseudo half-tone image data binarized by the Fattening type dither binarizing method.

3. The apparatus as claimed in claim 2, wherein said second detection means detects whether or not said binary image data located in a second area has a predetermined periodicity in a predetermined direction, said second area including at least a plurality of pixels located in the periphery of said specified pixel, and judges that said binary image data of said specified pixel are binary pseudo half-tone image data binarized by the Fattening type dither binarizing method when detecting that said binary image data located in said second area have the predetermined periodicity in the predetermined direction.

4. An image processing apparatus for recovering inputted binary image data, pixels of which are composed of white pixels and black pixels, into multi-value image data, comprising:

edge emphasis means for performing an edge emphasis process for emphasizing a density difference between a specified pixel and each of a plurality of pixels located in the periphery of said specified pixel; and prohibition means for prohibiting said edge emphasis process from being performed by said edge emphasis means, when a ratio of a number of white pixels to a number of black pixels which are located in a predetermined area including said specified pixel is larger than a first threshold value smaller than one and is smaller than a second threshold value larger than one.

5. An image processing apparatus for recovering inputted binary image data, pixels of which are composed of white pixels and black pixels, into multi-value image data, comprising:

first calculating means for calculating a first edge emphasis amount between a specified pixel and each of a plurality of pixels located in the periphery of said specified pixel based on binary image data located in a predetermined first area including at least a plurality of pixels located in the periphery of said specified pixel which are selected among said inputted binary image data;

second calculating means for calculating a second edge emphasis amount between said specified pixel and a plurality of pixels located in the periphery of said specified pixel based on binary image data located in a predetermined second area including at least a plurality of pixel located in the periphery of said specified pixel, said second area being set to be smaller than said predetermined first area;

edge emphasis means for performing an edge emphasis process for emphasizing a density difference between said specified pixel and each of a plurality of pixels located in the periphery of said specified pixel based on larger one of said first and second edge emphasis amounts; and control means for prohibiting said edge emphasis means from performing said edge emphasis process based on said second edge emphasis amount and for enabling said edge emphasis means to perform said edge emphasis process based on said first edge emphasis amount, when a ratio of a number of white pixels to a number of black pixels which are located in a predetermined third area including said specified pixel is larger than a first threshold value smaller than one and is smaller than a second threshold value larger than one.

6. An image processing apparatus for processing inputted binary image data including a pseudo half-tone area in which data are binarized by a pseudo half-tone binarizing method and a non-half-tone area in which data are binarized using a predetermined threshold value, comprising:

image area judgment means for performing an image area judgment process for judging whether each pixel of said inputted binary image data is included in said pseudo half-tone area or said non-half-tone area, based on said inputted binary image data located in a predetermined area including at least a plurality of pixels located in the periphery of a specified pixel;

recovery means for recovering binary image data judged as being included in said pseudo half-tone area by said image area judgment means, into multi-value image data;

edge emphasis means for performing an edge emphasis process for emphasizing a density difference between said specified pixel and each of said plurality of pixels located in the periphery of said specified pixel;

dither judgment means for judging whether or not said binary image data of said specified pixel are binary pseudo half-tone image data binarized by a Fattening type dither binarizing method; and prohibition means for prohibiting said edge emphasis process from being performed by said edge emphasis means when said dither judgment means judges that said binary image data of said specified pixel are binary pseudo half-tone image data binarized by the Fattening type dither binarizing method.

7. An image processing apparatus for processing inputted binary image data including a pseudo half-tone area in which data are binarized by a pseudo half-tone binarizing method and a non-half-tone area in which data are binarized using a predetermined threshold value, comprising:

judgment means for calculating a judgment value representing at least one of a degree of a predetermined pseudo half-tone image and a degree of a predetermined non-half-tone image of each specified pixel of said inputted binary image data based on said binary image data;

first recovery means for recovering binary image data of said specified pixel into multi-value image data using a first recovery process for said predetermined pseudo half-tone image;

second recovery means for recovering binary image data of said specified pixel into multi-value image data using a second recovery process for said predetermined non-half-tone image based on said inputted binary image data; and mixing means for mixing said multi-value image data recovered by said first recovery means with said multi-value image data recovered by said second recovery means with a mixing ratio corresponding to said judgment value calculated by said judgment means and outputting said mixed multi-value image data.

8. The apparatus as claimed in claim 7, wherein said judgment means comprises:

first judgment means for judging whether each specified pixel is included in said pseudo half-tone area or said non-half-tone area; and second judgment means for calculating the judgment value representing at least one of the degree of said predetermined pseudo half-tone image and the degree of said predetermined non-half-tone image of each specified pixel of said inputted binary image data based on a plurality of judgment results with respect to a predetermined first area judged by said first judgment means.

9. The apparatus as claimed in claim 7, wherein said judgment means comprises:

third judgment means for calculating a judgment value representing a degree of a Bayer type pseudo half-tone image based on said inputted binary image data;

fourth judgment means for calculating a judgment value representing a degree of a Fattening type pseudo half-tone image based on said inputted binary image data; and comparison selection means for comparing the judgment value calculated by said third judgment means with the judgment value calculated by said fourth judgment means, selecting the maximum value among the compared judgment values, as the judgment value.

10. An image processing apparatus for processing inputted binary image data including a pseudo half-tone area in which data are binarized by a pseudo half-tone binarizing method and a non-half-tone area in which data are binarized using a predetermined threshold value, comprising:

image area judgment means for performing an image area judgment process for judging whether each pixel of said inputted binary image data is included in said pseudo half-tone area or said non-half-tone area, based on said binary image data;

first judgment means for judging what is the kind of minor pixels in a predetermined first area based on said binary image data located in said first area, said first area including at least a plurality of pixels located in the periphery of a specified pixel;

second judgment means for judging whether or not at least one of the minor pixels judged by said first judgment means is included in a predetermined second area which is located within said first area and which is smaller than said first area; and control means for invalidating result data of said image area judgment process with respect to said specified pixel when said second judgment means judges that none of the minor pixels is included in said second area.

11. An image processing apparatus for processing inputted binary image data including a pseudo half-tone area in which data are binarized by a pseudo half-tone binarizing method and a non-half-tone area in which data are binarized using a predetermined threshold value, comprising:

judgment means for calculating a judgment value representing at least one of a degree of a predetermined pseudo half-tone image and a degree of a predetermined non-half-tone image of each specified pixel of said inputted binary image data based on said binary image data located in a predetermined first area including at least a plurality of pixels located in the periphery of a specified pixel which are selected among said inputted binary image data;

first recovery means for recovering binary image data of said specified pixel into multi-value image data using a first recovery process based on binary image data located in a predetermined second area including at least a plurality of pixels located in the periphery of said specified pixel;

second recovery means for recovering binary image data of said specified pixel into multi-value image data using a second recovery process; and mixing means for mixing said multi-value image data recovered by said first recovery means with said multi-value image data recovered by said second recovery means with a mixing ratio corresponding to said judgment value calculated by said judgment means and outputting said mixed multi-value image data.

* * * * *